(12) United States Patent
Brook et al.

(10) Patent No.: US 7,432,940 B2
(45) Date of Patent: Oct. 7, 2008

(54) INTERACTIVE ANIMATION OF SPRITES IN A VIDEO PRODUCTION

(75) Inventors: John Charles Brook, Stanhope Gardens (AU); Rupert William Galloway Reeve, Redfern (AU); Lena Qian, Marsfield (AU); Choi Chi Evelene Ma, Ashfield (AU); Julian Frank Andrew Magarey, Cremorne (AU); Michael Jan Lawther, Burwood (AU); Julie Rae Kowald, Newport (AU)

(73) Assignee: Canon Kabushiki Kaisha, Tokyo (JP)

(*) Notice: Subject to any disclaimer, the term of this patent is extended or adjusted under 35 U.S.C. 154(b) by 779 days.

(21) Appl. No.: 10/268,778

(22) Filed: Oct. 11, 2002

(65) Prior Publication Data

US 2003/0146915 A1 Aug. 7, 2003

(30) Foreign Application Priority Data

Oct. 12, 2001 (AU) ................ PR8241
Oct. 12, 2001 (AU) ................ PR8247

(51) Int. Cl.
G09G 5/00 (2006.01)
(52) U.S. Cl. .............................. 345/629; 715/726
(58) Field of Classification Search ........... 345/629; 715/716, 719–726
See application file for complete search history.

(56) References Cited

U.S. PATENT DOCUMENTS

| | | | | |
|---|---|---|---|---|
| 4,580,165 A | | 4/1986 | Patton et al. | 358/148 |
| 4,587,577 A | * | 5/1986 | Tsunoda | 386/69 |
| 4,667,802 A | | 5/1987 | Verduin et al. | 194/217 |
| 5,065,345 A | * | 11/1991 | Knowles et al. | 715/202 |
| 5,140,435 A | * | 8/1992 | Suzuki et al. | 360/72.1 |
| 5,511,153 A | | 4/1996 | Azarbayejani et al. | 395/119 |
| 5,590,262 A | | 12/1996 | Isadore-Barreca | 395/806 |
| 5,610,653 A | | 3/1997 | Abecassis | 348/110 |
| 5,699,442 A | | 12/1997 | Fellinger | 382/103 |
| 5,801,685 A | * | 9/1998 | Miller et al. | 715/500.1 |
| 5,802,361 A | * | 9/1998 | Wang et al. | 382/217 |
| 5,867,166 A | * | 2/1999 | Myhrvold et al. | 345/419 |

(Continued)

FOREIGN PATENT DOCUMENTS

AU A-19107/97 10/1997

(Continued)

OTHER PUBLICATIONS

G. Ozsoyoglu, et.al., "Electronic Books in Digital Libraries," IEEE Proceedings, ADL 2000. pp. 1-10, 0-7695-0659-3.

*Primary Examiner*—Kee M. Tung
*Assistant Examiner*—David H Chu
(74) *Attorney, Agent, or Firm*—Fitzpatrick, Cella, Harpe & Scinto

(57) ABSTRACT

A method of animating a sprite in a video production comprising a plurality of sequential video frames is disclosed. The method comprises the steps of selecting (2004) a feature, with which the sprite is to be juxtaposed, in one of said video frames, applying (2006) a feature tracking process to the video production to thereby output (2008), for a series of said plurality of video frames containing the feature, a temporal-spatial record for the feature across the plurality of video frames, and compositing (2010), with the series of said plurality of video frames, a corresponding series of instantiations of the sprite dependent upon the temporal-spatial record.

5 Claims, 35 Drawing Sheets

U.S. PATENT DOCUMENTS

| | | | |
|---|---|---|---|
| 5,867,584 A * | 2/1999 | Hu et al. | 382/103 |
| 5,923,365 A * | 7/1999 | Tamir et al. | 348/169 |
| 5,943,445 A * | 8/1999 | Dufaux | 382/236 |
| 6,014,183 A * | 1/2000 | Hoang | 348/702 |
| 6,052,492 A * | 4/2000 | Bruckhaus | 382/284 |
| 6,052,508 A | 4/2000 | Mincy et al. | 386/96 |
| 6,064,393 A * | 5/2000 | Lengyel et al. | 345/427 |
| 6,125,229 A * | 9/2000 | Dimitrova et al. | 386/69 |
| 6,185,538 B1 * | 2/2001 | Schulz | 704/278 |
| 6,188,777 B1 | 2/2001 | Darrell et al. | 382/103 |
| 6,198,833 B1 * | 3/2001 | Rangan et al. | 382/103 |
| 6,226,388 B1 * | 5/2001 | Qian et al. | 382/103 |
| 6,233,007 B1 * | 5/2001 | Carlbom et al. | 348/157 |
| 6,243,104 B1 | 6/2001 | Murray | 345/439 |
| 6,268,864 B1 | 7/2001 | Chen et al. | 345/428 |
| 6,278,466 B1 | 8/2001 | Chen | 345/473 |
| 6,295,367 B1 * | 9/2001 | Crabtree et al. | 382/103 |
| 6,400,378 B1 * | 6/2002 | Snook | 715/716 |
| 6,414,679 B1 * | 7/2002 | Miodonski et al. | 345/420 |
| 6,418,424 B1 * | 7/2002 | Hoffberg et al. | 706/21 |
| 6,430,357 B1 * | 8/2002 | Orr | 386/69 |
| 6,442,538 B1 * | 8/2002 | Nojima | 707/1 |
| 6,507,410 B1 | 1/2003 | Robertson et al. | 358/1.18 |
| 6,674,955 B2 * | 1/2004 | Matsui et al. | 386/52 |
| 6,678,413 B1 * | 1/2004 | Liang et al. | 382/181 |
| 6,724,915 B1 * | 4/2004 | Toklu et al. | 382/103 |
| 6,738,100 B2 * | 5/2004 | Hampapur et al. | 348/702 |
| 6,774,908 B2 * | 8/2004 | Bates et al. | 345/589 |
| 6,778,224 B2 * | 8/2004 | Dagtas et al. | 348/586 |
| 6,795,567 B1 * | 9/2004 | Cham et al. | 382/103 |
| 6,813,313 B2 * | 11/2004 | Xu et al. | 375/240.08 |
| 6,813,622 B2 * | 11/2004 | Reber et al. | 707/104.1 |
| 6,819,797 B1 * | 11/2004 | Smith et al. | 382/181 |
| 6,917,692 B1 * | 7/2005 | Murching et al. | 382/103 |
| 7,075,591 B1 * | 7/2006 | Jun et al. | 348/700 |
| 2001/0048753 A1 * | 12/2001 | Lee et al. | 382/103 |
| 2002/0141615 A1 * | 10/2002 | Mcveigh et al. | 382/103 |
| 2003/0011713 A1 * | 1/2003 | Kastelic | 348/589 |
| 2003/0034997 A1 * | 2/2003 | McKain et al. | 345/723 |
| 2004/0141635 A1 * | 7/2004 | Liang et al. | 382/110 |
| 2004/0141636 A1 * | 7/2004 | Liang et al. | 382/110 |
| 2005/0278618 A1 * | 12/2005 | Ogikubo | 715/513 |

FOREIGN PATENT DOCUMENTS

| | | |
|---|---|---|
| AU | 200243487 | 1/2002 |
| AU | 200026411 A1 | 11/2002 |
| WO | WO 97/39452 | 10/1997 |
| WO | WO 98/06098 | 2/1998 |
| WO | WO 01/27876 A1 | 4/2001 |
| WO | WO 01/35056 A1 | 5/2001 |
| WO | WO 01/82624 A2 | 11/2001 |
| WO | WO 01/98888 A2 | 12/2001 |
| WO | WO 02/054377 A1 | 7/2002 |

\* cited by examiner

INTERACTIVE ANIMATION OF SPRITES IN A VIDEO PRODUCTION

TRADEMARKS

This specification may include words which are, or are asserted to be, proprietary names or trademarks. Their inclusion does not imply that they have acquired, for legal purposes, a non-proprietary or generic significance. Furthermore, no judgement is implied concerning their legal status. In cases where it is considered that proprietary rights may attach to a word, this is indicated by a $^{propr}$ superscript, noting that this does not imply a legal judgement concerning the legal status of such words.

TECHNICAL FIELD

The present invention relates generally to user interfaces, and, in particular, to Graphical User Interfaces (GUIs) as applied to video cameras and other recording and capture devices for media items.

BACKGROUND

With the proliferation of digital video camcorders (DVCs), there is a growth in the number of DVC users who wish to edit and process their captured video images, and also to communicate the product of their efforts to others. DVCs can capture video data, audio data, and in some cases, still images as well. These various types of data are referred to in this specification as "media data" and items of data are referred to as "media items" or "media clips" or the like. Technological elements associated with this editing activity include the editing interface, hardware accessories and editing software required, as well as communication hardware and software.

Digital Disc reCording devices (DDCs), ie digital video recording devices which utilise magnetic or magneto-optical discs (MODs) as a recording medium, offer even greater flexibility to users wishing to edit, process and communicate their media data, however greater flexibility typically exacerbates the problems facing enthusiastic yet technically untutored users.

A generic DDC system architecture comprises a number of different functional and/or structural elements. One such element is communication, both between intra-system elements, and between the system and external devices and data. Another element is infrastructure for supporting editing and incorporation of effects. A user wishing to effectively edit and process captured "media data" thus has a relatively complex system to manipulate.

Users who do edit media data typically wish to improve on the internal DDC recording, editing and effect-adding features, however very few consumers actually edit media data with software or specialised hardware. This derives in part from the fact that typical consumer users of digital video devices find it difficult to interconnect the various elements, both hardware and software, in a system architecture. This hinders the growth of DDC architectures, which inherently offer advantageous editing and processing capabilities. Furthermore, very few users attempt to gain skills in media data capture, editing or post-production. Even those consumers who do attempt to master the technology find that this is not enough, because media data editing and post-production is an art, and the required hardware and/or software is typically expensive.

Many basic editing techniques are time consuming and repetitive. Although software packages can provide assistance in the form of interactive GUIs, the tedium remains of acquiring familiarisation with the media and making edit decisions.

In some instances, a fully edited video may have tens, or hundreds of clips each clip having typically 25 to 30 frames per second. Even for a professional using high-end equipment, the task of editing such a video can take many hours or days. For a consumer video photographer, performance of this task is prohibitive in time, expensive in money terms and demanding in skill terms.

In a typical editing task, once selection of clips has been performed from the raw footage, the clips are placed in sequence. Current tools available for this process include software that provides a linear time-line, or alternatively, hardware such as dual Video Cassette Recorders (VCRs) for sequencing from the original source to another. This again is a time consuming task, involving manually slotting each video clip into place in the sequence. The current dual-VCR or camera-and-VCR solutions are slow and tediously technical for a consumer to control, and should the consumer want to amend any part of the video, the whole process must often be started again. Although some of the aforementioned process can be substituted by more capable hardware and software, the dual-VCR, or camera-and-VCR process is still used by many consumers.

Transitions such as dissolves or cross-fades are often beyond the capability of consumers' equipment unless they can use computer software. The actual implementation of video transitions and effects often places heavy storage and processing demands on editing computer resources, including requiring capture and export format decoding and encoding hardware attached to a consumer's computer. Consumer video photographers typically do not have a basic appreciation of the nature of transitions, or where they should be used. This typically results in incorrect or excessive use thereof, which constitutes a drain on resources, and results in less than pleasing results.

Consumers generally have high expectations of video because of the general availability of high-quality television programs. Home video production rarely comes close to the quality of professionally-made television programs, and this is evident in the disdain with which the general public generally holds home videos. It is very difficult for consumers to compete with the quality of professional television programs when producing their home videos. For instance, generating titles and correctly placing them in order to produce an entertaining result requires typographical and animation skills often lacking in consumers. It is also not fully appreciated that unprofessionally made titles often spoil the result of many hours of editing. Specialised software and/or additional title-generation resources are often required, thereby adding to the final cost of the production.

Current methods of sound editing are highly specialised, and the principles governing the process of embellishing a final edited rhythm with beat synchronisation is well beyond the scope of most consumer video makers. The time required to analyse the wave form of a chosen sound track in order to synchronise video cuts is prohibitive, and the cost of equipment is unjustified for most consumers. These techniques are typically unavailable in the dual-VCR editor context.

Video typically contains much content that is rarely if ever used, often being being viewed only once. Users typically capture more content than is ultimately of interest to them. Finding and viewing the content that is of interest can be carried out in various ways.

Considering an analog tape deck system, the user must shuttle through the linear tape, log the timecode of a frame sequence of interest, and/or record these segments to another tape. Logging timecode is generally only a practice of professional video editors. The practice generates log sheets, which constitute a record of locations of useful content on the tape. The case of Tape-to-digital capture is similar. Here, the user shuttles through the content marking the timecode via a keyboard and mouse using a computer software application. The interesting/useful segments are then digitised to a hard disk. It is apparent that in both above cases, the user makes a duplicate record of desired footage.

Once the content is used in an edited production, further trimming takes place. Should the user want to use the interesting content in another, different production, the analog tape deck system commands the user to carry out the same rewriting to tape process. Any content captured to disk requires that the user search through the files system, to find the relevant shots. Once again, the final edited production consists of trimmed down, interesting sequences of frames.

A large number of video editing packages are available for Personal Computer users. High-end products are available, these being intended for professional video editing users, and such products have high functionality and high complexity. Low-end packages are also available, these having limited functionality, but typically retaining considerable complexity, intended for video camera enthusiasts or even children. A common need of video Editors (the term "Editor" denoting a person performing the editing function), be they professionals or enthusiastic consumers, is to trim the length of video clips that they wish to include in any current editing project. High-end and low-end video editing products take differing approaches to this clip-trimming task, but both approaches have significant usability failings.

Low-end video editors (the term "editor" denoting a product or a device), such as Apple iMovie$^{propr}$ typically provide clip-trimming facilities only in the edit-timeline or storyline through the use of some kind of time-unit marker referenced to the apparent length of a clip in the timeline. Alternately, a numerical start time, and either a clip duration measure or a stop time entered into a dialogue box in units of frames or seconds or similar is used. This user-interface facility does not allow actual concurrent viewing of the clip while trimming in and out points.

High-end video editors typically provide a trimming viewer that combines the ability to play or step a clip at the whim of a user, often using a "scrubber" or slider control, while also allowing setting of in and out trim points at desired locations of the clip. The trim points are often displayed and controlled in a summary bar which represents the original length, or duration of the clip, and the trim markers appearing in this summary bar represent proportional positions of the actual trim points set by the user relative to the original clip duration. The scrubber or slider control also represents a proportional position within the clip length, this time of the viewed frame or heard audio.

High-end video editors often provide a trimming window that is disconnected from the information held within the edit timeline. Thus, any clip already imported to a timeline must be dragged, or otherwise imported into the trimming window where it may be potentially modified by the user. It is the norm that such modifications have no effect on the edit timeline during or after performance of the modifications by the user, until the user explicitly exports the trimmed clip back into the timeline. In this event, the trimmed clip is understood by the timeline portion of the editing application not to be the same clip as was originally imported into the trimmer. This identification of two separate clips adds to the list of workflow and usability problems for a user, even if that user is an expert. Exemplary high-end applications include Apple's Final Cut Pro$^{propr}$, and Adobe Premiere$^{propr}$.

The types of usability problems encountered by a user in the above context include the need to replace the original clip (ie., the clip prior to trimming) in the timeline with the newly trimmed clip. This forces the user to take extra steps to make the replacement. Furthermore, the user is unable to obtain any information from the timeline or the trimmer, regarding the effect of the trimming on the final edited result, as is represented by the timeline. That is, only the local effect of a trim is available to a user in this context, whereas the global effect of a trim is not available until the user actually commits the trimmed clip back into the timeline. This represents an absence of synchronism between the user's trimming action and the editor's currently held state for the project. Furthermore, the user cannot easily move to another clip within the edit timeline and trim that clip. This limitation impairs the undertaking of related trimming operations between clips and the appreciation of their overall effect on the current project in the timeline. In addition, the edit timeline often is represented as having an arbitrary length, due to a strong interest in providing a fixed resolution representation for every clip and/or frame within the timeline. This often causes a timeline's contents to scroll beyond the boundary of the available window and out of visibility. This is a limitation when multiple clips need to be trimmed that cannot all be visible within the timeline at the same time without scrolling. Furthermore, previewing of the resultant production, to view the results of any one or more trimming operations, is provided in a further, separate viewer window and is unconnected and unsynchronised with any current or recent trimming operation.

Further workflow and usability problems are encountered when automatic editing is employed to generate the edit timeline. Automatic editing has the ability to modify an EDL (often represented graphically by a timeline) based on a number of factors beyond the selected sequence of clips provided as its input. Some of these factors include (i) user metadata such as template selection, where a template contains a characteristic set of editing instructions or operations aimed at producing an expected them4e or genre result for the output EDL, and (ii) and various scene or content metadata such as user-set highlights, pan-and-zoom metadata, and so on. When a user trims an input clip to an auto-editor then their actions can result in significant changes to the output EDL because of the potential non-linear behaviour of the auto-editing template. For example, if the user trims a clip to a significantly short period, then it might be discarded by the auto-editor altogether. Or, if the user adds a highlight flag to a frame of the clip while in the trimmer (the highlight being a form of user metadata) then the auto-editor may trim the clip automatically around the position of the highlight. With current systems, the user has a poor and delayed appreciation of the effects of changes they might make within the trim window, in regard to the overall result of the auto-edit. This is a disadvantage in regard to workflow and usability for a user of an auto-editor.

A user wishing to add an animated message or sprite to a video clip must have access to a video or still-image compositing tool such as Apple Quicktime$^{propr}$. Typically such an operation or effect is performed by defining or declaring a sprite layer or animation layer within a streaming compositor, and providing a matte or transparency signal for the sprite to allow it to be overlayed on the desired video content.

Users are provided with sprite animation facilities by various current software applications such as Macromedia Flash$^{propr}$ (often these applications utilise a streaming video compositor such as Apple Quicktime$^{propr}$). However, the application and motion definition for sprite animations is typically a very manual-intensive process, requiring per-frame sprite application (known as rotoscoping), a steady hand, and an appreciation of object dynamics in a video frame for accurate and pleasing placement of the sprite. Alternatively, very basic automated sprite application capability is provided by some software applications. Such capabilities include definition of a fixed spatial coordinate or a spatial path to which the sprite is "attached", both of which have no continuous association or reference to a tracked feature to which the user might wish to relate the sprite.

The current consumer-level sprite application solutions understand nothing about the content of any video to which they might be applied. This content-sprite relationship must be provided entirely by the user's frame-by-frame observation of the video content or alternatively, must be completely ignored and some content-unrelated, typically pre-determined, animation track is provided instead.

Per-frame application of a sprite by a user typically involves specification of a spatial location for the sprite on a per-frame basis, with best results being provided where the user accounts for the position of one or more content objects within the frame to which she wishes to associate the sprite in some higher semantic context. Such operations suffer from human error, in which spatial placement can jitter or jump because of the difficulty in creating smooth animations from what is effectively stop-motion photography. The user is, in such cases, being asked to provide movement dynamics and thus requires trajectory-building skills of similar degree to those of animation experts. Even systems that provide auto-smoothing of a user's animation trajectory or that provide a range of predetermined and possibly adjustable trajectories, do not provide any assistance as to the correct placement of a sprite in any and every frame based on the location of the content-objects with which the user desires to associate the sprites. This lack of automatic connection of the sprite's trajectory with the desired associated, content object therefore requires the user to check and/or correct the sprite trajectory per-frame, or to accept an inaccurate animation trajectory.

It can be seen that the application of a sprite and the definition or declaration of its animation trajectory suffers from significant limitations.

It is thus apparent that when the user either wishes to perform trimming operations using current video editing applications, or wishes to incorporate sprite animation or feature-associated effects operations in current video composition or editing applications, the user must tolerate severe preparation, contrivance, cost, skill, workflow and usability limitations, and thus suffers reduced efficiency and accuracy as a result.

SUMMARY

It is an object of the present invention to substantially overcome, or at least ameliorate, one or more disadvantages of existing arrangements.

According to a first aspect of the invention, there is provided a method of animating a sprite in a video production comprising a plurality of video frames, said method comprising the steps of:

selecting, in one of said video frames, a feature with which the sprite is to be composited;

applying a feature tracking process to the video production to thereby output, for a series of said plurality of video frames containing the feature, a temporal-spatial record for the feature; and compositing, dependent upon the temporal-spatial record, to each frame of the series of video frames, a corresponding instantiation of the sprite.

According to another aspect of the invention, there is provided an apparatus for animating a sprite in a video production comprising a plurality of video frames, said apparatus comprising:

means for selecting, in one of said video frames, a feature with which the sprite is to be composited;

means for applying a feature tracking process to the video production to thereby output, for a series of said plurality of video frames containing the feature, a temporal-spatial record for the feature; and means for compositing, dependent upon the temporal-spatial record, to each frame of the series of video frames, a corresponding instantiation of the sprite.

According to another aspect of the invention, there is provided a method of selecting frames for printing from a production comprising video frames which include animation, the method comprising the steps of:

determining relative suitability measures for the video frames dependent upon at least one of (i) meta-data associated with the video frames, and (ii) a production template used to form the production; and producing said frames for printing dependent upon said relative suitability measures.

According to another aspect of the invention, there is provided an apparatus for selecting frames for printing from a production comprising video frames which include animation, the apparatus comprising:

means for determining relative suitability measures for the video frames dependent upon at least one of (i) meta-data associated with the video frames, and (ii) a production template used to form the production; and means for producing said frames for printing dependent upon said relative suitability measures.

According to another aspect of the invention, there is provided a method of animating a sprite in a video production, said method comprising the steps of:

selecting a sprite and a feature in a video frame of the video production in relation to which the sprite is to be animated;

applying a feature tracking process to the video production to thereby output a trajectory for the feature; and compositing instantiations of the sprite with the video production depending upon the trajectory to thereby form a first animated production.

According to another aspect of the invention, there is provided a computer program for directing a processor to execute a procedure for animating a sprite in a video production comprising a plurality of sequential video frames, said program comprising:

code for selecting, in one of said video frames, a feature with which the sprite is to be composited;

code for applying a feature tracking process to the video production to thereby output, for a series of said plurality of video frames containing the feature, a temporal-spatial record for the feature; and code for compositing, dependent upon the temporal-spatial record, to each frame of the series of video frames, a corresponding instantiation of the sprite.

According to another aspect of the invention, there is provided a computer program for directing a processor to execute a procedure for animating a sprite in a video production comprising a plurality of sequential video frames, said program comprising:

code for selecting a sprite and a feature in a video frame of the video production in relation to which the sprite is to be animated;

code for applying a feature tracking process to the video production to thereby output a trajectory for the feature; and code for compositing instantiations of the sprite with the video production depending upon the trajectory to thereby form a first animated production.

According to another aspect of the invention, there is provided an apparatus for animating a sprite in a video production comprising a plurality of sequential video frames, said apparatus comprising:

a memory for storing a program; and a processor for executing the program, said program comprising:

code for selecting, in one of said video frames, a feature with which the sprite is to be composited;

code for applying a feature tracking process to the video production to thereby output, for a series of said plurality of video frames containing the feature, a temporal-spatial record for the feature; and code for compositing, dependent upon the temporal-spatial record, to each frame of the series of video frames, a corresponding instantiation of the sprite.

According to another aspect of the invention, there is provided a Graphical User Interface (GUI) system for editing a production having a plurality of media clips, said GUI system comprising:

(i) a clip editing process;

(ii) a GUI comprising:

a graphical representation of a selected one of said plurality of media clips, wherein manipulation of said graphical representation enables the clip editing process to be applied to the selected media clip; and a presentation means configured to present said one media clip and any editing changes made thereto; and (iii) a production editing process which is applied to said production to thereby form, dependent upon the selected media clip and said any editing changes made thereto, an edited production, wherein the application of the production editing process is synchronously dependent upon the application of the clip editing process.

According to another aspect of the invention, there is provided a Graphical User Interface (GUI) system for editing a production having a plurality of media clips, said GUI system comprising:

(i) a clip editing process;

(ii) a GUI comprising:

a graphical representation of a selected one of said plurality of media clips, wherein manipulation of said graphical representation enables the clip editing process to be applied to the selected media clip; and a presentation means configured to present said one media clip and any editing changes made thereto; and (iii) a production editing process which is applied to an EDL of said production to thereby form, dependent upon the selected media clip and said any editing changes made thereto, an edited EDL, wherein the application of the production editing process is synchronously dependent upon the application of the clip editing process.

According to another aspect of the invention, there is provided a method of editing, using a Graphical User Interface (GUI) system, a production having a plurality of media clips said method comprising the steps of:

selecting one of said plurality of media clips;

manipulating, using a GUI, a graphical representation of said selected media clip to thereby apply a clip editing process to the selected media clip;

presenting said one media clip and any editing changes made thereto using a presentation means; and applying, synchronously with said application of the clip editing process, a production editing process to said production to thereby form, dependent upon the selected media clip and said any editing changes made thereto, an edited production.

According to another aspect of the invention, there is provided a method of editing, using a Graphical User Interface (GUI) system, a production having a plurality of media clips said method comprising the steps of:

selecting one of said plurality of media clips;

manipulating, using a GUI, a graphical representation of said selected media clip to thereby apply a clip editing process to the selected media clip;

presenting said one media clip and any editing changes made thereto using a presentation means; and applying, synchronously with said application of the clip editing process, a production editing process to an EDL of said production to thereby form, dependent upon the selected media clip and said any editing changes made thereto, an edited EDL.

According to another aspect of the invention, there is provided a computer program product including a computer readable medium having recorded thereon a computer program for directing a computer to execute a method for editing, using a Graphical User Interface (GUI) system, a production having a plurality of media clips said program comprising:

code for selecting one of said plurality of media clips;

code for manipulating, using a GUI, a graphical representation of said selected media clip to thereby apply a clip editing process to the selected media clip;

code for presenting said one media clip and any editing changes made thereto using a presentation means; and code for applying, synchronously with said application of the clip editing process, a production editing process to an EDL of said production to thereby form, dependent upon the selected media clip and said any editing changes made thereto, an edited EDL.

According to another aspect of the invention, there is provided a computer program for directing a computer to execute a method for editing, using a Graphical User Interface (GUI) system, a production having a plurality of media clips said program comprising:

code for selecting one of said plurality of media clips;

code for manipulating, using a GUI, a graphical representation of said selected media clip to thereby apply a clip editing process to the selected media clip;

code for presenting said one media clip and any editing changes made thereto using a presentation means; and code for applying, synchronously with said application of the clip editing process, a production editing process to an EDL of said production to thereby form, dependent upon the selected media clip and said any editing changes made thereto, an edited EDL.

BRIEF DESCRIPTION OF THE DRAWINGS

A number of embodiments of the present invention will now be described with reference to the drawings, in which.

Figure 1:
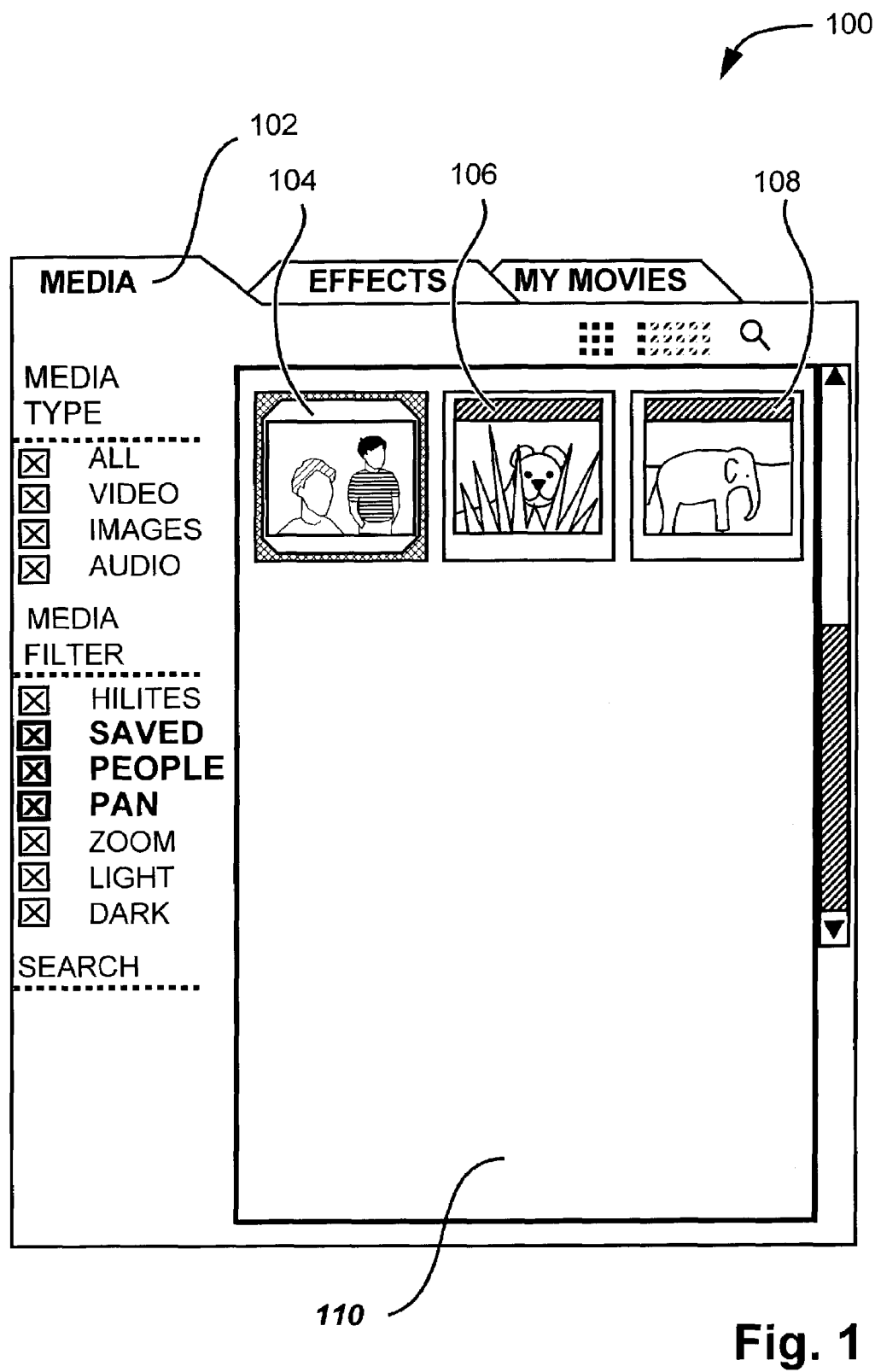
FIG. 1 shows a browser Graphical User Interface (GUI), whereby one or more video clips can be filtered, selected or reviewed.

| Glossary of Terms | |
|---|---|
| animation | artificial moving graphic images. |
| audio | file containing only audio data. |
| browse filters | technology that employs meta-data structures, eg derived from content analysis algorithms to display a filtered list of video shots. |
| clip/shot | a single media file of video/audio content recorded by a user from a single capture event. |
| content | electronically-formatted material suitable for displaying to a user, including video, audio, music, speech, still images, etc |
| content analysis | extraction of additional information or higher-level meaning, typically creating or extracting meta-data |
| DDC | Digital Disc reCorder |
| EDL | a file storing time line data, effects, references to video/audio contents. |
| keyframe | an image selected from a set of media items to represent the set in a GUI. |
| imported media | content imported from other sources such as stills, clips, and audio. |
| media content | includes, but is not limited to video, audio, and still images |
| meta-data | information about content; derived directly from a device or a user or from a process. |
| movie | EDL file referencing video and/or audio, or a rendered or raw file video and audio. |
| program/production | an EDL file or movie rendered from the EDL file. |
| 'Promo' | an industry term meaning a short compilation of clips demonstrative of further content in a movie serving as a preview. |
| provided content | content provided by a source other than the user. Typically being video/audio, graphics, titles, executable scripts, templates, access keys, etc. |
| raw material/content | original, captured, and unprocessed clips, stills or audio, content provided by the user, typically being recorded or previously recorded onto the DDC media. |
| still | file containing a single still picture. |
| Template | collection of rules, processes, content, expert knowledge; template file and related media files used for automatic-editing. |

-continued

| Glossary of Terms | |
|---|---|
| time-line file | file storing time-line data, not including video/audio contents. |
| transparency | a partially transparent image layer overlying a foreground image. |
| trim | to define or select a subset of a clip to replace that clip, typically for playback or editing |

DETAILED DESCRIPTION INCLUDING BEST MODE

The present description has been arranged in a number of sections and sub-sections, which are organised in accordance with the following Table of Contents.

| TABLE OF CONTENTS | |
|---|---|
| 1. | OVERVIEW |
| 2. | SYSTEM DESCRIPTION |
| 3. | GRAPHICAL USER INTERFACE SYSTEM |
| 4. | GUI SYSTEM SPECIFICS |
| 4.1 | THE BROWSER |
| 4.2 | THE PLAYLIST CONTROLLER |
| 4.2.1 | MANUAL EDITING PLAYLIST CONTROLLER |
| 4.2.2 | PLAYLIST CONTROLLER FUNCTIONALITY |
| 4.2.3 | AUTO-EDITING PLAYLIST CONTROLLER |
| 4.3 | FEATURE TRACKING & SPRITE ANIMATION |
| 5. | DATA FLOW AND STRUCTURE |
| 5.1 | CAPTURE AND STORAGE |
| 5.2 | META ANALYSIS AND DATA STRUCTURE |
| 5.3 | USE OF HIGHLIGHT |
| 5.4 | DIRECTORY STRUCTURE |
| 5.5 | EDL STRUCTURE |
| 5.6 | MEDIA TRACK STRUCTURE |
| 5.7 | TRANSITION/OBJECT RELATIONSHIP |
| 5.8 | TIME LINE FILE STRUCTURE |
| 5.9 | TRAJECTORY, TRACK AND CLIP STRUCTURES |
| 6. | PLAYER PROCESS |
| 7. | TEMPLATES |
| 7.1 | OVERVIEW |
| 7.2 | EXAMPLES |
| 7.3 | FEATURE TRACKING AND AUTO-EDIT TEMPLATES |
| 7.4 | PRINT SUMMARISATION OF A VIDEO PRODUCTION |

Where reference is made in any one or more of the accompanying drawings to steps and/or features, which have the same reference numerals, those steps and/or features have for the purposes of this description the same function(s) or operation(s), unless the contrary intention appears.

1. Overview

The underlying context for the present description is a DDC user who wishes to make captured raw video into home movies. Since video consumes high data volumes, the user typically does not keep original video footage on a Personal Computer (PC) hard-drive. Instead, the user maintains the original footage on a Magneto-optic disk (MOD) 512 (see FIG. 5) upon which the footage was originally stored when it was captured on a DDC 204 (see FIG. 2). Thus, when new video footage is captured, or at some later time when review of the video footage is performed, it is necessary to analyse the MOD contents, keeping track of all the shots taken. With this information, the user can build a movie with titles, transitions, effects, and music. Transitions are used to join pieces of video (or audio), and can include simple cuts, dissolves, and fade to colour transitions. Transitions can also affect the viewer's perception of time, through selection of transition type and duration. Effects can include colour adjust (including Black and White (B&W), saturate, de-saturate, and so on), simple wipes, "old film look" (which involves incorporation of B&W, scratch, and dust effects), titles with animated text, as well as sound effects for the audio channel, and so on.

Significant benefits can accrue to the consumer as an outcome of good video editing. Such benefits can include improving on the basic quality of raw material, setting a context to make the content more holistic and comprehensible, providing extra information to aid in understanding and level of viewer interest, removing poor/unwanted content and so on. A typical motivation for those wishing to edit a consumer video is to produce a result that will be interesting or entertaining to themselves and their intended audience. This typically means that the consumer video editor attempts to meet the audience expectation of professional-quality television production, thereby providing a significant advantage by meeting the goals of comprehensibility and interest.

The DDC/PC arrangements shown herein (see FIGS. 2, 4, 5 for example) incorporate what will be referred to as a "GUI system" 300 (see FIG. 3) as well as various GUIs (see FIGS. 1, 7A, 7B, 9, 11-13 and 15-17) supported by the GUI system 300. The GUI system 300 provides both the GUIs by which the user interacts with both the DDC 204 and the data in the MOD 512 (see FIG. 5), and also supports the underlying functionality required to maintain and utilise the MOD library which the user accumulates over time.

When the user has captured and stored new media data on the MOD 512 (see FIG. 5), the GUI system 300 (see FIG. 3) can be used to analyse the content of the disk. This analysis involves generating and storing meta-data for every shot stored on the MOD 512. The meta-data stored on the MOD 512 is both that meta-data provided by the DDC 204 during recording time, and that meta-data obtained thereafter by content analysis.

Using the arrangements described, the user can browse and edit the captured video footage. This can be performed either manually, using a browser 220 (see FIG. 3) and a manual edit feature 228, or the process can be partially or completely automated, by using an auto-editor 240 (see FIG. 3). The auto-editor 240 produces substantially professional quality edited video from raw footage by applying pre-defined templates. The templates supply titles, music and effects in one or more styles depending on the template. Video material which has been edited, or has had effects added thereto, is sometimes referred to as "effected material". The user need only make minor inputs during the auto-edit process, in order to yield a finished movie. At a minimum, the final result may be similar to that produced by a two-step "browse and manual edit" operation, but with much less effort required on the part of the user. Typically, however, the templates provide much more sophisticated editing and effects than can be achieved with a single pass through a manual editor 228 (see FIG. 3). Additionally, the template incorporates implicit, and sometimes explicit, video and audio production expertise, and thus the template is more than merely a sum of its editing and effects parts.

The GUI system 300 provides two basic capabilities, namely review, and storyboard. The review capability allows video to be reviewed at all stages of the video lifetime. Reviewed material may thus include user-selected sequences of raw shots, trimmed shots, shots placed in an auto-edit template including music and effects, and finally the entire movie or part thereof. The review capability provides GUI controls, which are adapted to whichever particular task is at hand. Most reviews are rendered and played in real time at normal play speed, however, where complex processing is required, such as may be required by some templates, non-realtime or background processing may precede review-playback of the material.

FIG. 1 shows a GUI 100, by means of which one or more video clips can be filtered, selected or reviewed. The GUI 100 takes the form of a basic browser screen and shows a number of keyframes, 104, 106 and 108 in a display area 110 under a tab 102 which, in the present instance, is identified by a label "MEDIA". If a touch-screen 524 is used (see FIG. 5), a pen 526 functions as a user interface mechanism, and one or more of the keyframes 104, 106 and 108 can be selected for a desired play sequence by tapping each keyframe once with the pen 526. After selecting the aforementioned keyframes, a play button 736 on a companion GUI 704 (see FIG. 7A) is pressed, or a double-click action is initiated over the selected keyframe(s). Consequently, the video clips associated with the aforementioned selected keyframes are played in the desired sequence, in a contiguous fashion as a single video presentation.

Figure 2:
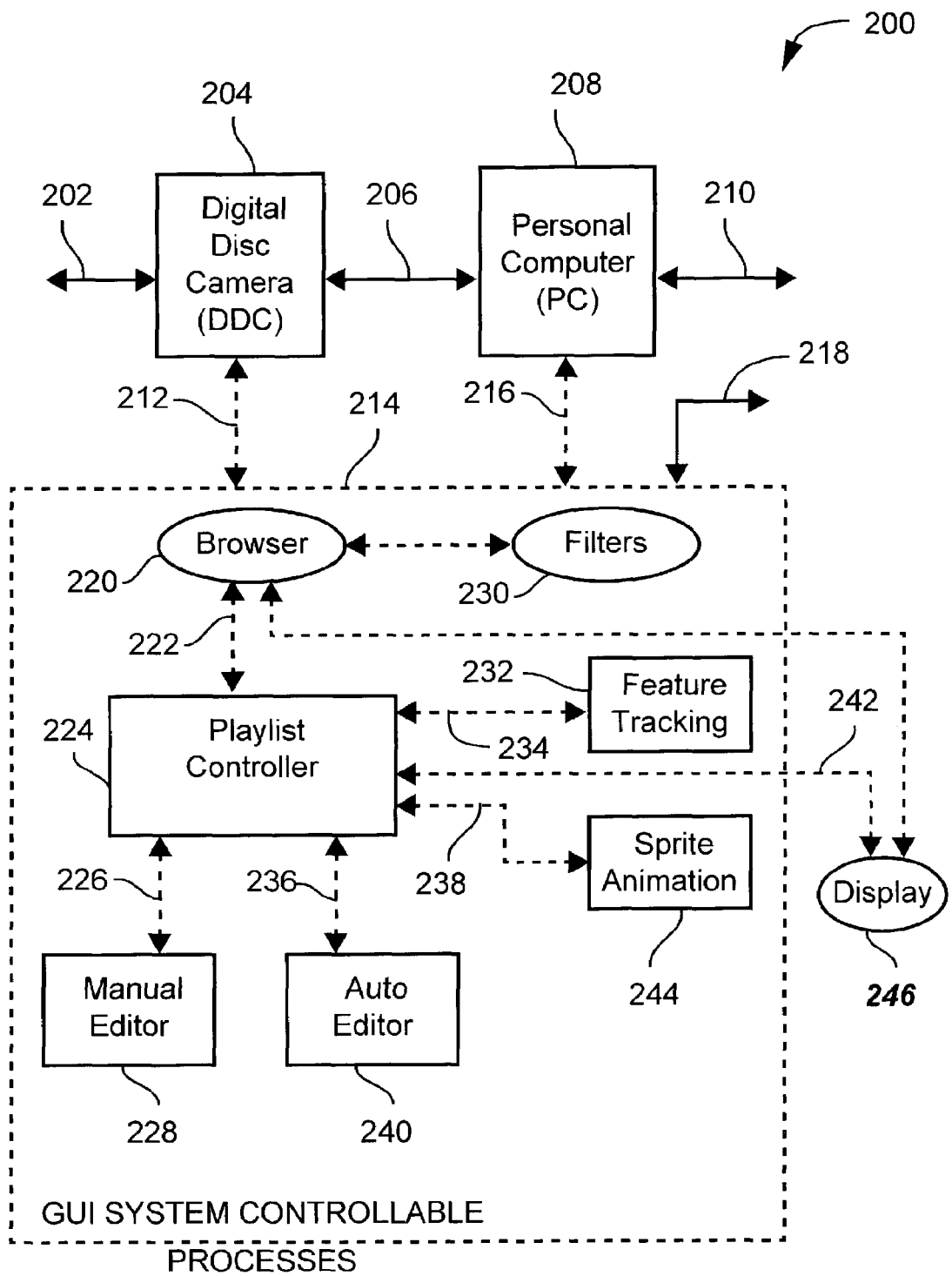
FIG. 2 shows GUI system controllable processes distributed between a DDC system and a PC.

The GUI 100 (FIG. 1) is used in this example primarily to provide a browsing and selection mechanism in relation to keyframes which are intended to form all, or part of a subsequent, or current editing project which is held within a playlist controller 224 shown in FIG. 2. A "playlist" is an overall timeline representation of the entire production being considered.

The typical operational sequence used by the user is to select a sequence of keyframes that is subsequently imported into the playlist controller 224 of the GUI system 300 (see FIG. 3). This importation step of the keyframe sequence into the playlist controller 224 (see FIG. 2) can be manually initiated, by the user pressing a button (not shown). Alternately, the importation can be completely automatic, whereby the playlist controller 224 dynamically accepts any new selection sequence which is created by the user in the browser GUI 100.

The playlist controller 224 (see FIG. 2) can dynamically accept a selection sequence in a number of different ways. If the playlist is empty, then the new sequence forms the entirety of the new playlist. If, however, the playlist is not empty, then the new sequence is accepted as a replacement of the current playlist. Alternately, if the playlist is not empty then the new sequence can be accepted and appended to the current playlist. It can be seen that the last two options require a modal change to the importation operation, either under user control, or via a process that determines the user's intent. Such a process can be as simple as comparing the lengths of the current playlist sequence and the new selection sequence, and if the former is significantly longer than the latter, then the latter is assumed to be intended for appending to the former. Other importation methods are possible, particularly if the user is allowed greater latitude in specification of his intent, with actions such as drag and drop into, or out of, positions within the length of the playlist.

Figure 12:
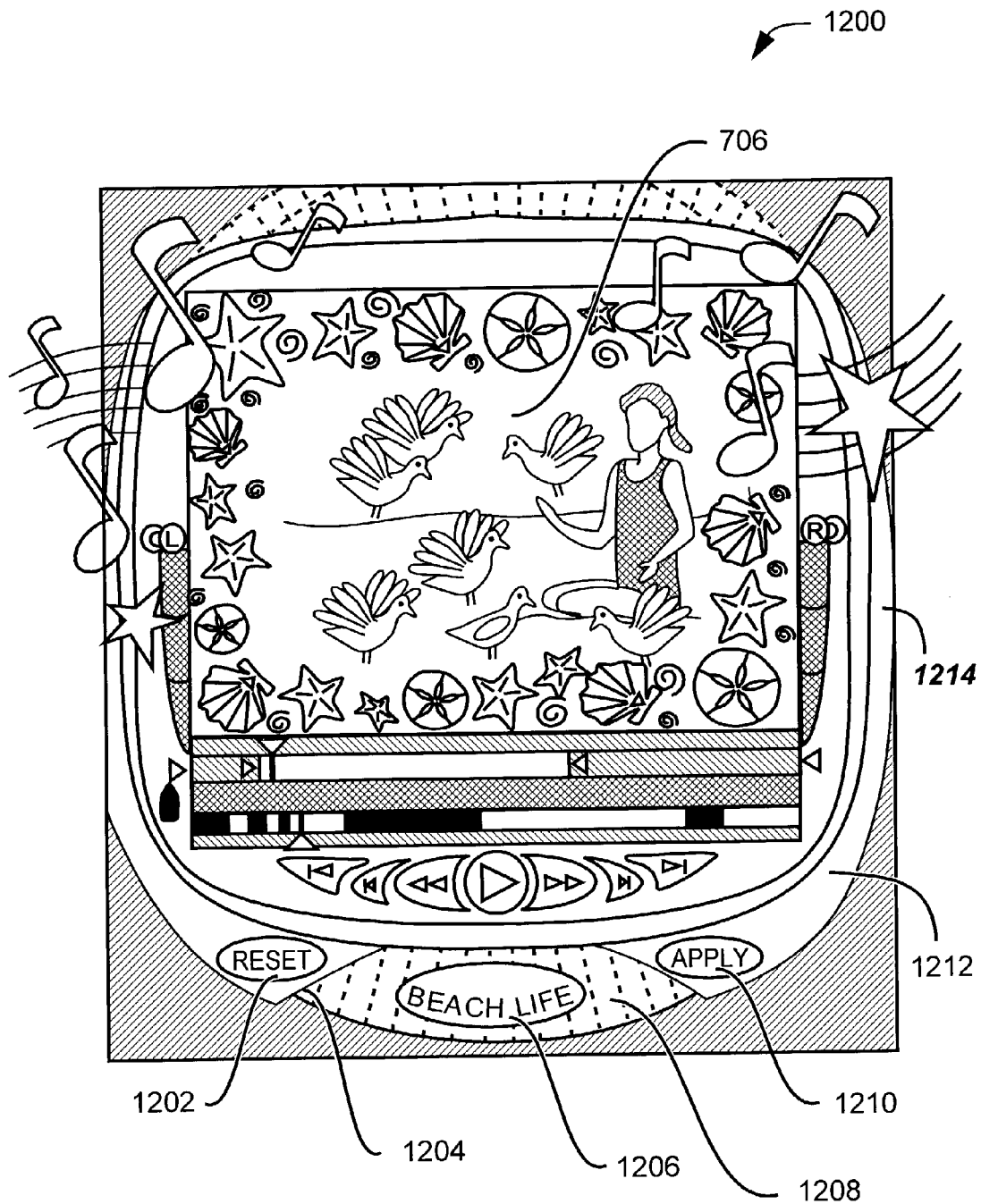
FIG. 12 depicts a style-dial which facilitates template selection in the GUI system.

Additional to the basic functions of review and storyboard is the tracking and animation facility that can be accessed via a sprites button-menu 2004 in FIG. 12. In that instance, the tracking and animation facility can be operated by the user with reference to a playlist controller viewer 1510 (see FIG. 15).

2. System Description

FIG. 2 depicts one example of a DDC system 200, in which GUI controllable processes 214 are distributed between the DDC 204 and the PC 208. The system 200 supports media data retrieval, meta-data processing and usage, and media data display. Recalling the earlier definition of media data, the term "display" is understood to encompass presentation to the user of the various types of media data. The system utilises meta-data creation, storage and processing to underpin advantageous capabilities offered to a DDC user. The system comprises the DDC 204, which communicates, by means of a connection 206, with the Personal Computer (PC) 208. The DDC 204 can communicate with external devices and data by means of a connection 202. The PC 208 can communicate with external devices and data by means of a connection 210.

The GUI system controllable processes 214 depict the prime mechanisms by which the user interacts with both the DDC 204 and the PC 208. The GUIs which incorporate substantiations of the GUI system controllable processes 214 are presented to the user by a browser process 220 which supports the browser GUI 100 (see FIG. 1) and other GUIs. The playlist controller 224 is one of the GUI system controllable processes 214 which provides a convenient and intuitive mechanism by which the user can access and control the various DDC or software application media selection and editing functions. The user can operate the GUI system controllable processes 214 in a number of modalities, including via the touch screen 524 (see FIG. 5), the pen 526 or a cordless remote control (not shown), these options being depicted by a bidirectional arrow 218 in FIG. 2. The specifics of the GUI system controllable processes 214 are dependent upon the distribution of functionality between the DDC 204 and the PC 208.

One element used by the browser process 220 is a set of browse filters 230 that utilise content analysis and meta-data analysis to filter and display more meaningful video segments for the user's selection. A display function 246 enables the user to view both the unedited, unprocessed video data as captured, and also to view the final edited images, as well as data during intermediate stages of processing.

The playlist controller 224 provides access, as indicated by a dashed line 236, to the automatic editing function 240 which utilises expert knowledge, content and effects in templates, whereby the consumer can obtain a better quality result with very simple control selections. The playlist controller 224 also provides access as depicted by a dashed line 226 to the manual editing function 228 that provides the user with a simple and intuitive set of editing functions and interface controls. The playlist controller 224 also provides a display of its status and media content via the display function 246 as depicted by a dashed arrow 242. The playlist controller 224 also provides access to a Feature Tracking function 232 as depicted by a dashed line 234, and to a Sprite Animation function 244 as depicted by a dashed line 238.

3. Graphical User Interface System

Figure 3:
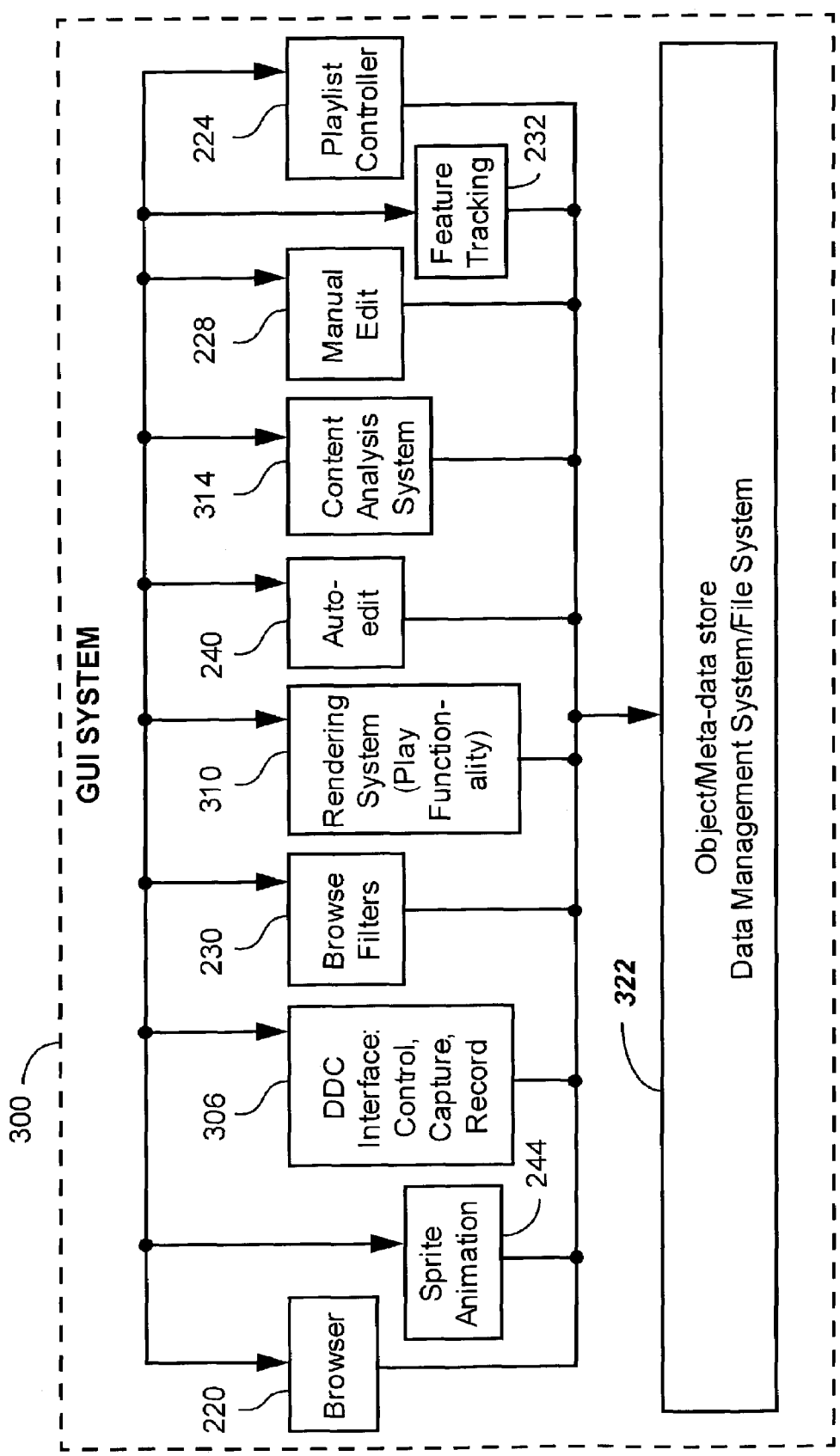
FIG. 3 shows a block diagram of a GUI system.

FIG. 3 provides a block diagram representation of the GUI system 300 incorporating the GUI system controllable processes 214 (see FIG. 2) as well as other functional elements. The GUI system 300 can be implemented in hardware, software or a combination thereof. An integrated data management system 322 keeps track of input media data, and of all generated movies. This system 322 allows the user to search and/or browse a DDC database or directory structure for content, such as media data including video, animation, audio, or effects, via the browser module 220. The system 322 also provides access to meta-data and media content for other DDC modules, by acting as a central information resource in the DDC architecture. The data management system 322 is preferably implemented as an object store, however, other data management configurations can be used. Searching is handled with custom-made software modules, or is performed by using an object tree. Alternately, searching can be performed by dynamically creating an index by filtering, or by partially traversing an object tree, or by using a master index.

A DDC interface 306 is responsible for importing and exporting digital video via either or both the DDC external connection 202 (see FIG. 2) and the connection 206 to the PC 208. The DDC interface 306 is also responsible for handling the interface between the DDC's functional elements and the "lens" system 520 of the DDC 204 (see FIG. 5). The interface 306 provides control over the DDC 204 (see FIG. 2), allowing digital video data to be transferred to the PC 208 via the connection 206, and allows digital video to be sent back to the DDC 204 from the PC 208, or from an external source.

When capturing media data, the interface module 306 parses the video and audio data for meta-data. The interface module 306 also captures scene meta-data from the image sensor 520 (see FIG. 5) when recording media data. Scene meta-data can include white balance, focus and focal length information, operating mode information and auxiliary information such as date and time, clip start time, and so on.

The Browse filters 230 provide an extra level of functionality to the data management system 322. Since the data management system 322 is only an object store, it is the browse filters 230 which provide the functionality for more efficient searches. The Browse filters 230 allow the user to sort the contents of the MOD 512 (see FIG. 5) according to certain criteria. Typically the browse filters 230 are used to search for a particular video clip. Alternately, the browse filters 230 can be used in combination with the editing facilities of the GUI system 300. By selecting a specific type of video clip for display (for example "bright" clips only), the number of key frames (eg. 104 in FIG. 1) displayed to the user is greatly reduced. This allows for easier navigation and manipulation of the contents of the MOD 512 (see FIG. 5). It is noted that while the description makes reference to "key frames" as being objects representative of a particular media content item, other indicia such as text labels can also be used to fulfil this purpose.

Meta-data generated during the content analysis process is available for use in filtering video. White balance, aperture speed, and other scene meta-data directly obtainable from the DDC 204 (see FIG. 2) can be used as a basis for filtering video segments into, for example, bright or dark categories for browsing. Timestamps and other non-visual or scene meta-data can also be obtained directly from the DDC 204, and can be used to filter video by criteria such as "most recent", or by user-selectable date and time options.

A Render (Play) System 310 (see FIG. 3) captures a movie, and renders it. The render system 310 can accept and render a movie in a number of forms. Thus, for example, a raw movie clip can be rendered directly to the display 246 (see FIG. 2). A sequence of raw movie clips, such as might be displayed temporarily in the browser GUI 100 (see FIG. 1) by a user selecting a sequence of clips for playing, can be rendered from a simple EDL which references raw input. Typically, the result from the set of EDL references can be rendered to the display 246 (see FIG. 2). The renderer 310 (see FIG. 3) can also accept more complex EDLs, these often comprising complex editing and effects operations on raw video clips. In this case, the renderer 310 can be instructed to output a movie either to the display 246 (see FIG. 2), or to a file or stream, and can also, or instead, be instructed to output a compiled EDL comprising optimised or specialised instructions, this output EDL differing from the input EDL.

Further, the renderer 310 (see FIG. 3) can be instructed to render and store to file any components which are to be used in the desired final movie that do not already exist in the input raw movie clips, for instance, transitions and effects. This latter function provides a pre-caching capability useful for accelerating a subsequent rendering operation.

The renderer 310 provides services of the aforementioned kinds to other modules, and can operate synchronously, or asynchronously, as requested by another module and as system capabilities permit. The render system 310 can render a movie and store the rendered movie in a file, or alternately, the system 310 can render the movie in real time to the display 246 (see FIG. 2). If a "live to display" render is required, then segments of the movie that can not be rendered live are either rendered offline first, or alternately, the segments are substituted with near-equivalent effects that are more easily rendered.

The playlist controller 224 (see FIG. 3) is an important element of the GUI system 300, and plays an important role in the video editing process. The playlist controller module 224 allows importation of video clip information from the browser 220. Control of the playlist controller 224 is available to the user, who is also provided with a display, in the form of a graphical representation, of the playlist controller status (see 722 in FIG. 7A). The playlist controller 224 (see FIG. 3) channels much of the user's interaction with the GUI system 300 through to either the manual edit module 228, or the auto-edit module 240.

A Feature Tracking module 232 provides the user with the ability to generate a trajectory based on any selected feature or features within a selected video clip. These trajectories can be saved in the Object/Metadata Store 322, and referenced to, or by, the clip from which they were generated, for later retrieval and application. A typical application of the feature tracking trajectory is provided in a Sprite Animation module 244 which accepts a trajectory, a video clip and a selection of a sprite animation sequence, and assembles an animation EDL, which is typically composited and rendered by the renderer module 310

The auto-edit function 240 is an important feature in the GUI system 300, and plays an important role in the video editing process. The playlist controller 224 interacts with the auto-edit module 240, which allows templates, styles and content to be automatically applied to raw video. The result produced by the auto-editing function is an EDL, which is an object description of a movie, the EDL referencing the content and processes which make up the movie. The EDL information is channelled back to the user in the form of a playlist, via the playlist controller 224 in particular, and the GUI system 300 in general. The auto-edit module 240 hides a large amount of functional complexity from the user, greatly simplifying operation thereof.

As already described, the GUI system 300 (see FIG. 3) supports both (i) automatic post-production editing using the auto-edit function 240, and (ii) intelligent filtering of digital video, by means of the browser module 220 and the browse filter function 230. Both these features (the browser 220 and the auto-editor 240) of the GUI system 300 operate to a large degree based on meta-data, by identifying clips of video that are relevant to the user. However, although the functionality of these two features (220, 240) appears to be similar in some respects, there are important distinctions.

The browse filters 230 allow the contents of the MOD 512 (see FIG. 5) to be filtered and displayed via the browser GUI 100 (see FIG. 1) according to pre-defined categories (such as "bright") that are defined in the filter specifics. However, unlike the auto-edit function 240 (see FIG. 3), there is no intelligent creation, or manipulation of the raw video to thereby produce a new movie. The output of a browse filter operation is simply a subset of those video clips or other media already residing on the MOD 512 that match the user-specified criteria. Thus the browse filters 230 may be used within the browser 220 (see FIG. 3), independently of the auto-editor 240, or as a first step in an editing session using the manual editor 228 or auto-editor 240 functions.

The manual editing function 228 provides the user with a flexible, and yet simple and intuitive set of editing functions and interface controls. The manual editor 228 is controlled by the user via the playlist controller 224 and the resultant EDL is displayed via the playlist controller 224 and the GUI system 300 as a playlist.

The outcome of an editing process, whether produced by manual editing, auto-editing or a combination thereof, is captured in a corresponding EDL, or in an equivalent playlist. The EDL can be used to direct production of the edited movies already described, using movie clips rendered according to the EDL's time-line. Alternatively, the EDL can be saved to file and need not include any copy of video and/or audio content, but instead, need only includes references to input video clips.

A content analysis module 314 (see FIG. 3) generates content information (meta-data) from media data. The Content Analysis module 314 provides services to other components of the GUI system 300, in particular to elements such as the auto-edit function 240 and the browse filters 230.

Figure 4:
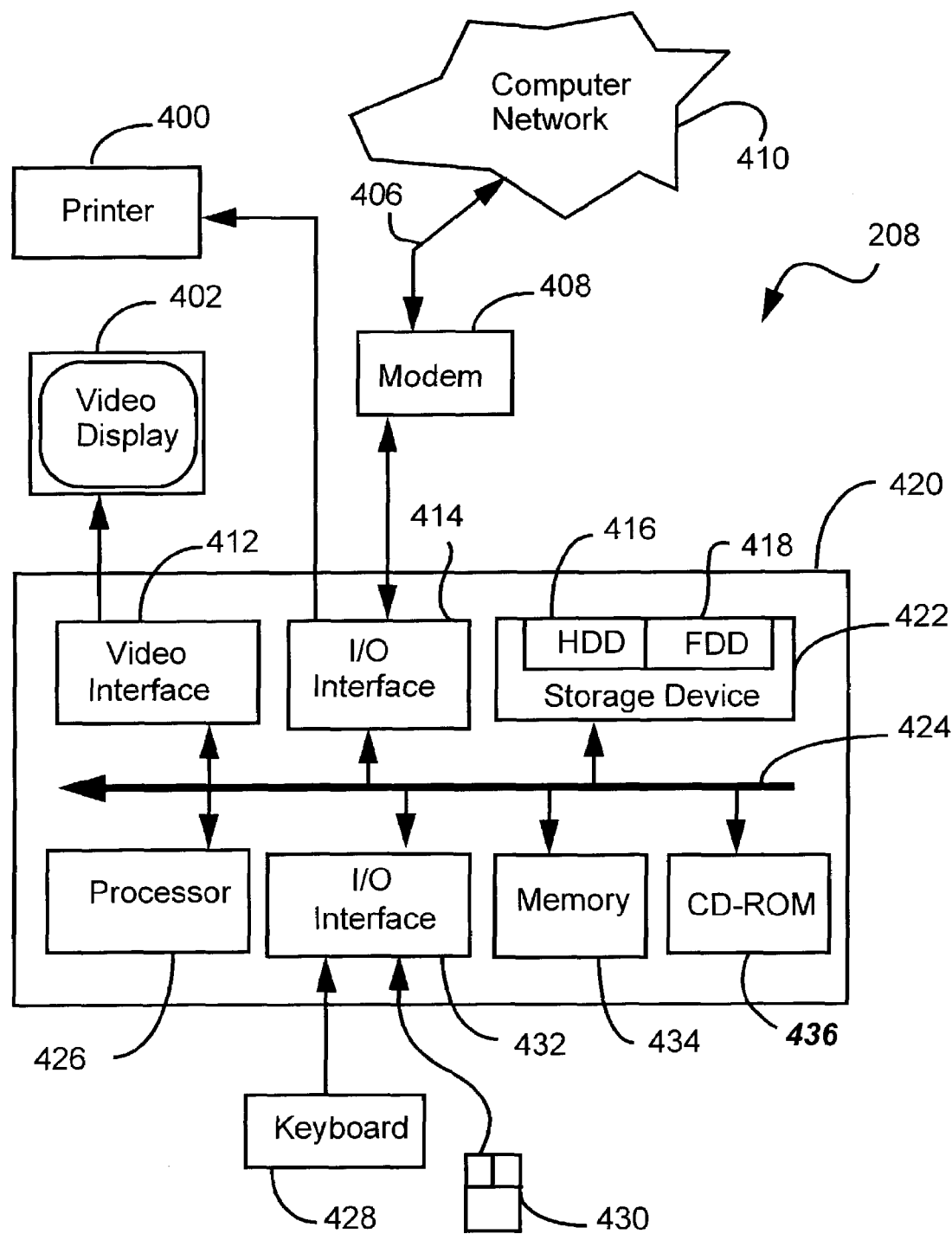
FIG. 4 shows a general purpose computer system upon which the GUI system of FIG. 3 can be practiced.

Turning to FIG. 4, in one arrangement the GUI system 300 of FIG. 3 is practiced using a general-purpose computer system 208, such as that shown in FIG. 4 wherein the GUI system 300 may be implemented as software, such as an application program executing within the computer system 208. The computer system 208 refers, for example, to the PC 208 in FIG. 2. In particular, GUI system is effected by instructions in the software that are carried out by the computer. The software may be divided into two separate parts; one part for providing the GUI system 300; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer effects an advantageous apparatus for providing the GUI system 300.

The computer system 208 comprises a computer module 420, input devices such as a keyboard 428 and mouse 430, output devices including a printer 400 and a display device 402. A Modulator-Demodulator (Modem) transceiver device 408 is used by the computer module 420 for communicating to and from a communications network 410, for example connectable via a telephone line 406 or other functional medium. The modem 408 can be used to obtain access to the Internet, and other network systems, such as a Local Area Network (LAN) or a Wide Area Network (WAN).

The computer module 420 typically includes at least one processor unit 426, a memory unit 434, for example formed from semiconductor random access memory (RAM) and read only memory (ROM), input/output (I/O) interfaces including a video interface 412, and an I/O interface 432 for the keyboard 428 and the mouse 430 and optionally a joystick (not illustrated), and an interface 414 for the modem 408. A storage device 422 is provided and typically includes a hard disk drive 416 and a floppy disk drive 418. A magnetic tape drive (not illustrated) may also be used. A CD-ROM drive 436 is typically provided as a non-volatile source of data. The components 412-426 and 432-436 of the computer module 420, typically communicate via an interconnected bus 424 and in a manner which results in a conventional mode of operation of the computer system 208 known to those in the relevant art. Examples of computers on which the described arrangements can be practised include IBM-PC's and compatibles, Sun Sparcstations or alike computer systems evolved therefrom.

Typically, the application program is resident on the hard disk drive 416 and read and controlled in its execution by the processor 426. Intermediate storage of the program and any data fetched from the network 410 may be accomplished using the semiconductor memory 434, possibly in concert with the hard disk drive 416. In some instances, the application program may be supplied to the user encoded on a CD-ROM or floppy disk and read via the corresponding drive 436 or 418, or alternatively may be read by the user from the network 410 via the modem device 408. Still further, the software can also be loaded into the computer system 208 from other computer readable medium including magnetic tape, a ROM or integrated circuit, a magneto-optical disk, a radio or infra-red transmission channel between the computer module 420 and another device, a computer readable card such as a PCMCIA card, and the Internet and Intranets including email transmissions and information recorded on websites and the like. The foregoing is merely exemplary of relevant computer readable mediums. Other computer readable media may alternately be used.

Figure 5:
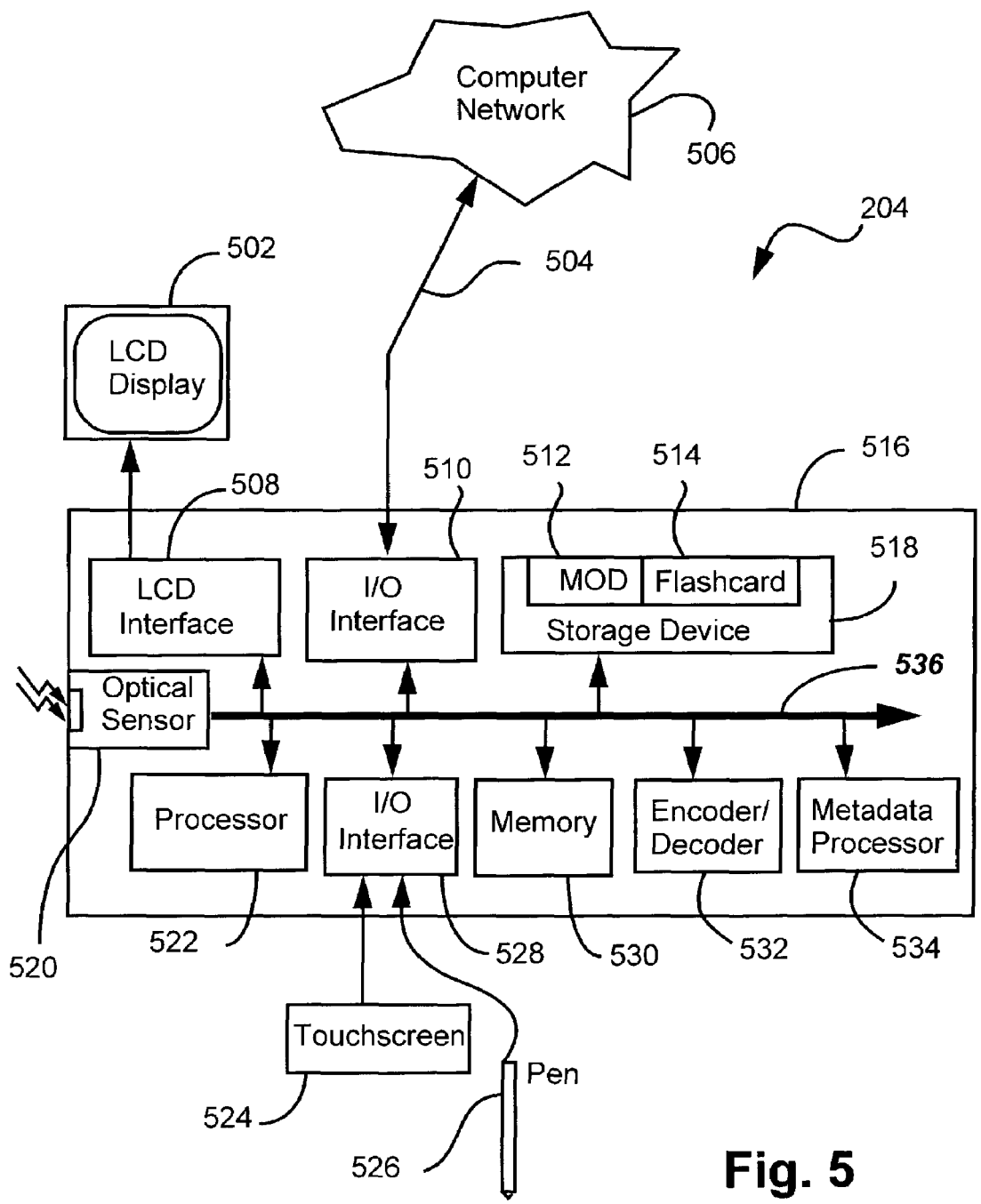
FIG. 5 shows a special purpose DDC computer system upon which the GUI system of FIG. 3 can be practiced.

Turning to FIG. 5, in another arrangement the GUI system 300 of FIG. 3 is practiced using a DDC implementation 204 wherein the GUI system may be implemented as software, such as an application program executing within the DDC 204. The DDC 204 refers, for example, to the DDC 204 in FIG. 2. In particular, the GUI system is effected by instructions in the software that are carried out by the DDC. The software may be divided into two separate parts; one part for providing the GUI system; and another part to manage the remaining DDC functions. The software may be stored in a computer readable medium, including the storage devices described below, for example. The software is loaded into the DDC from the computer readable medium, and then executed by the DDC. A computer readable medium having such software or computer program recorded on it is a computer program product. The use of the computer program product in the DDC effects an advantageous apparatus for providing the GUI system.

The DDC 204 comprises a processor module 516, input devices such as the touch-screen 524 and the pen 526, output devices including an LCD display device 502. An I/O interface 510 containing a Modulator-Demodulator (Modem) transceiver device (not shown) is used by the processor module 516 for communicating to and from a communications network 506, for example connectable via a telephone line 504 or other functional medium. The I/O interface 510 can be used to obtain access to the Internet, and other network systems, such as a Local Area Network (LAN) or a Wide Area Network (WAN).

The processor module 516 typically includes at least one processor unit 522, a memory unit 530, for example formed from semiconductor random access memory (RAM) and read only memory (ROM), input/output (I/O) interfaces including an LCD interface 508, and an I/O interface 528 for the touch screen 524 and pen 526, and an interface 510 for external communications. The optical sensor 520 is a primary input device for the DDC 204, which also typically includes an audio input device (not shown). An encoder 532 provides image coding functionality, and a meta-data processor 534 provides specialised meta-data processing. A storage device 518 is provided and typically includes the MOD 512 and a Flash Card memory 514. The components 508-514, 518-522, and 528-534 of the processor module 516, typically communicate via one or more interconnected busses 536.

Typically, the GUI 300 system program is resident on one or more of the Flash Card 514 and the MOD 512, and is read and controlled in its execution by the processor 522. Intermediate storage of the program and any data fetched from the network 506 may be accomplished using the semiconductor memory 530. In some instances, the application program may be supplied to the user encoded on the MOD 512, or alternatively may be read by the user from the network 506 via the I/O 510. Still further, the software can also be loaded into the DDC 204 from other computer readable medium including a ROM or integrated circuit, a radio or infra-red transmission channel between the processor module 516 and another device, a computer readable card such as a PCMCIA card, and the Internet and Intranets including email transmissions and information recorded on websites and the like. The foregoing is merely exemplary of relevant computer readable mediums. Other computer readable media may alternately be used.

The GUI system 300 of FIG. 3 may alternatively be implemented in dedicated hardware such as one or more integrated circuits performing the functions or sub functions of the GUI system. Such dedicated hardware may include graphic processors, digital signal processors, or one or more microprocessors and associated memories.

4. GUI System Specifics

Figure 6:
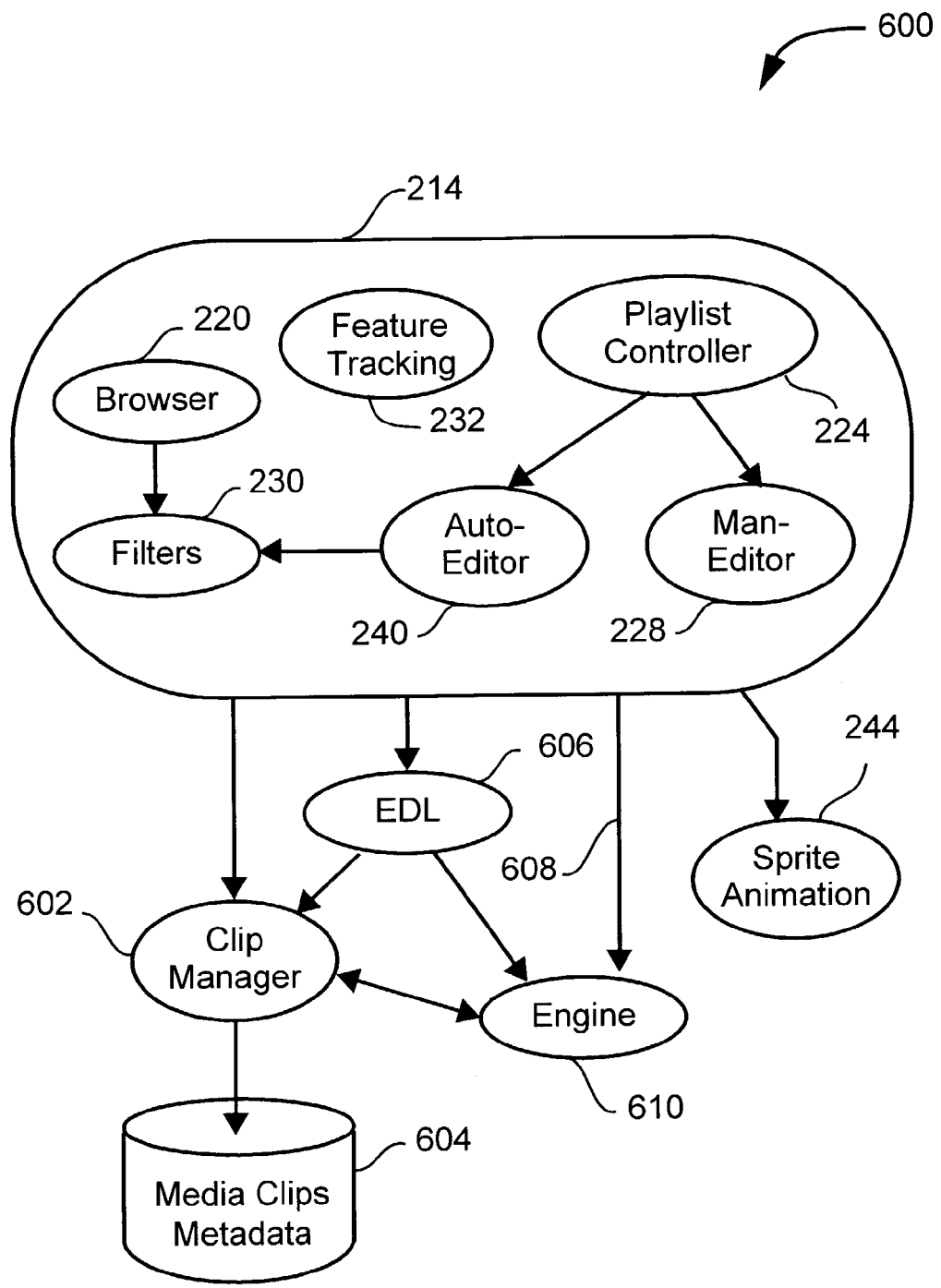
FIG. 6 shows data flow in the GUI system.

FIG. 6 shows data flows in the GUI system 300 of FIG. 3, with particular reference to the GUI system controllable processes 214, and a detailed description is provided in regard to the user interface and underlying data kernel. A function-calling direction is depicted by an arrow 608, for example. An Engine 610 is a software/hardware component that supports media processing functions such as compositing, playback and information retrieval.

An object, or clip manager function 602 manages clips, noting that a clip has been defined as a single media file that consists of, or emulates, video and/or audio content recorded by a user, commencing from a "record-on" command, and terminating at a "record-off" command. From a "media type" perspective, the clips include (i) Movies, which are files containing video and optionally, sync audio, (ii) Stills, which are files containing a single still picture, and (iii) Audio, which are files containing only audio data. From a "production" perspective, the clips include (iv) raw material, which are clips captured prior to any editing, (v) edited movies, which are movie clips rendered by the engine from an EDL, (vi) EDL files, which are files storing time-line data, and optionally (vii) processing operations. The EDL files (vi) need not, however, include a copy of video and/or audio contents. In this regard it is noted that the EDL file (vi) can be reloaded by the user for modification and playback. The rendered movies (v), however, contain composed video/audio data, but do not have any time-line editing information, which in contrast comprises the major part of EDL files in (vi). Further from a production perspective, the clips also include (viii) auto-editing templates, which can include combinations of clips of any kind, and related media and meta-data, as well as processing or executable files used for automatic-editing. A process for capturing and/or storing media data is described in relation to FIG. 21.

One or more storage areas 604 are created, typically on a hard disk 416 (see FIG. 4), to contain the clip data and associated meta-data, as well as any EDLs. A directory structure used in the MOD 512 (see FIG. 5) in an exemplary DDC system such as is shown in FIG. 2 is described in relation to FIG. 24.

Returning to FIG. 6, the Browse Filters 230 are used to filter the raw material clips presented in the Browser 220. Filter attributes can include (i) dark, (ii) light, (iii) zoom, (iv) pan, (v) saved, (vi) people, and (vii) highlights (referred to also as "hilites"). From an implementation perspective, many of the browse filter attributes can be defined as bit-fields that can be operated on with Boolean logic operations, in order to define the required meta-data combinations.

The EDL 606 is also referred to as an "edit-list" or a "play-list" and, in this text these terms are generally used interchangeably. The latter term is typically used in connection with the playlist controller 224 and particularly when a play-list or EDL is instantiated in the playlist controller 224. The term "play-list" is often used in this text to describe the temporal properties of an EDL that may be visually represented to a user using a timeline paradigm or the playlist controller summary bar 722 for instance (see FIG. 7A). This usage is a convenience to assist the reader or user to comprehend the presented concepts. The term "play-list" is not restricted to this meaning however. The EDL 606 can be edited by the manual editor function 228, or by the auto editor function 240. The EDL 606 can be fed to the engine 610, and can direct the engine to either play, or alternatively render, a movie file. The EDL 606 can also be saved by either of the editors 228, 240 by means of the object manager 602, for later use. The EDL 606 is discussed in terms of a time-line and is described in more detail in relation to FIG. 25.

The playlist controller 224 controls the auto editor 240 and the manual editor 228. The Feature Tracking module 232 allows user selection via a GUI of one or more features, which it will subsequently track, and its results are typically fed to the Sprite Animation module 244, which does not need to provide GUI control in the current arrangement.

4.1 The Browser

Figure 7A:
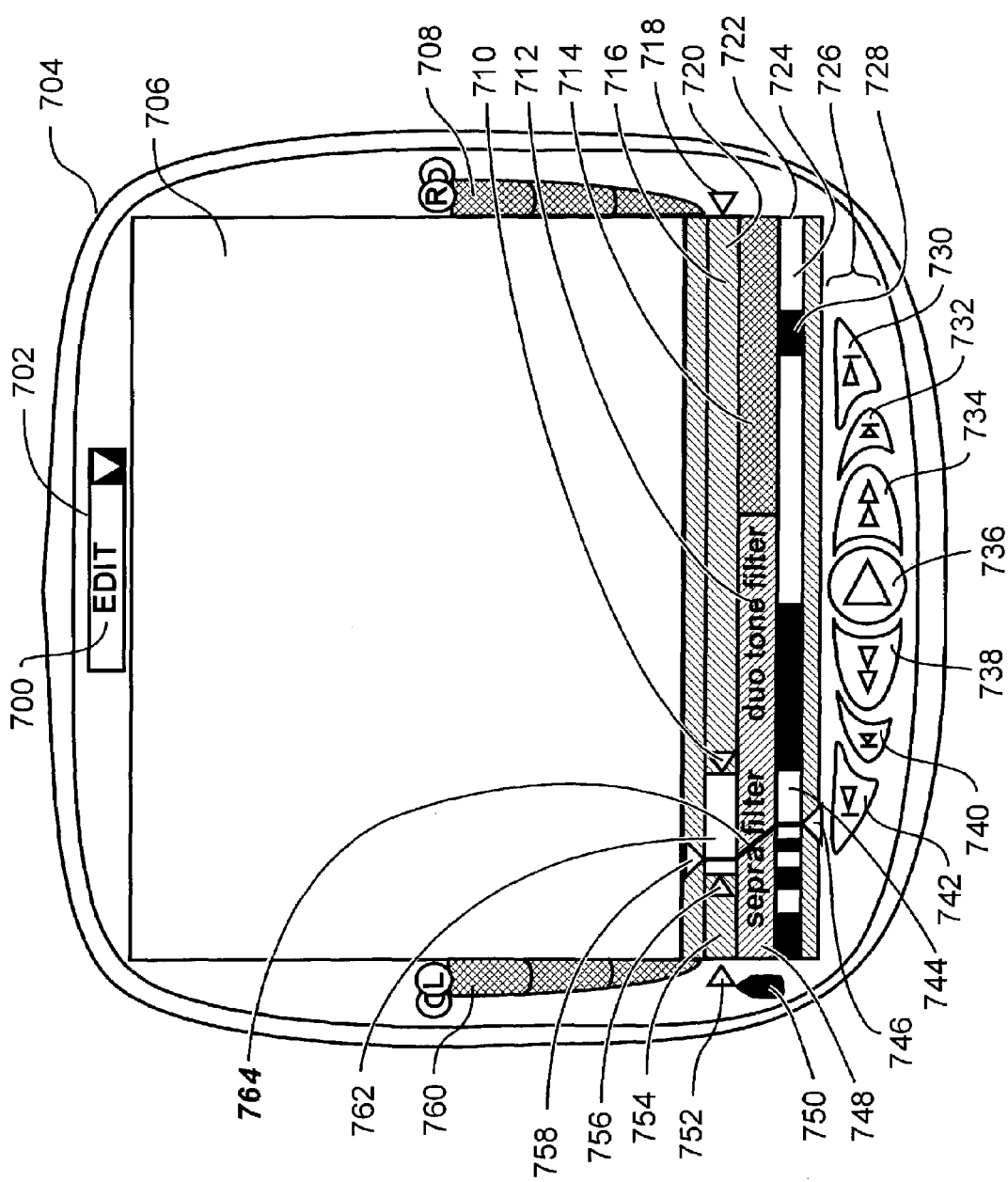
FIGS. 7A and 7B shows the GUI for the browser of FIG. 1 and a playlist controller GUI.
Figure 7B:
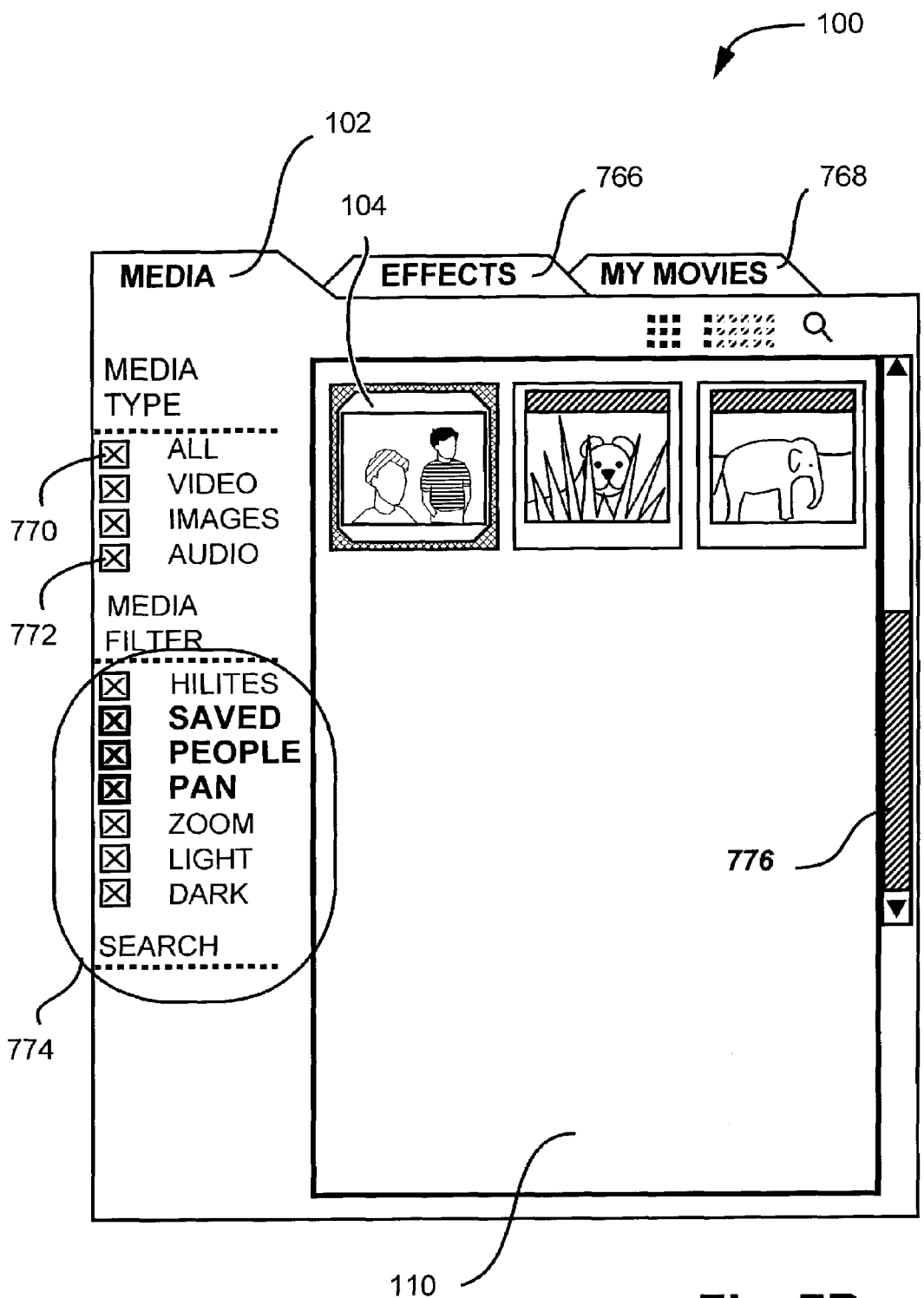

FIGS. 7A and 7B show exemplary GUIs 704 and 100 for a playlist controller and the browser GUIs respectively. These GUIs enable the user to quickly view the contents of the MOD 512 (see FIG. 5), and display the contents in the screen area 110 in FIG. 7B.

Turning to FIG. 7B, each displayed key-frame 104 represents a video clip, a still image or an audio clip, or a combination of these, which are stored on the MOD 512 (see FIG. 5). Key-frames are selected by the user, who highlights a desired key-frame by tapping it once with the pen 526 (see FIG. 5), assuming that a touch-screen 524/pen 526 implementation is being used.

A key-frame list, which is a software entity listing all key-frames on the MOD 512, can be scrolled up and down using a scroll bar 776 which is positioned to the right of the key-frame display 110 in FIG. 7B. The scroll bar 776 can be dynamically (re)sized depending on the number of key-frames to be displayed in the display area 110.

The media tabs 102, 766 and 768 are used to view different media types stored on the MOD 512. Media types which can be stored on the MOD 512 include "MEDIA" (at the tab 102), consisting of video footage, graphics, titles and other types of importable media, photos (also referred to as "Still"), which are still images captured using the DDC photo mode, and sound files independent of images, available for use in editing.

In addition, the MOD 512 can store "EFFECTS" (at the tab 766), which include transitions (fades, wipes, dissolves and so on) for use in editing, and also special effects, which are effects that can be applied to video clips during editing, such as blurs, colour filters such as sepia, black and white film effects. In addition, the MOD 512 can store "MY MOVIES" (at the tab 768), which are video EDLs or rendered videos generated using manual or auto-edit processes 228, 240, allowing the user to save and re-access their work at a later date.

The browser GUI display area 110 displays icons or keyframes representing the available media of a selected type on the MOD 512. The currently selected "Media" tab 102 also determines the particular browse filters displayed, by removing or disabling inappropriate or irrelevant filter buttons and enabling or displaying relevant buttons. The type of media displayed under any media tab that supports combined media types can also affect the particular browse filters displayed. For instance, selecting the My Media tab 102 allows display of video and still keyframes. If video keyframes are present on the MOD 512, then a browse filter (selected from a set of browse filters 774) that applies only to video content, such as ZOOM, will be displayed (ie. enabled). Similarly, if there are any video clips containing a pan then the "PAN" filter will be enabled, allowing user selection thereof, and indicating that this type of filter is relevant to the available media.

FIG. 7B shows the browser GUI 100, which enables the user to view, sort, and filter the contents of the MOD 512. The user is able to select from the video and other media types (which are selectable using the media tabs 102, 766, 768), in order to include the selected media data in either an auto edit, or manual edit session or other activity.

The browser GUI 110 shares many of the features of typical keyframe browsers, but adds the browser-specific browse filter list or media filter list 774. The browse filter list 774 displays the available browse filters 230 (see FIG. 2). Browse filters are used to modify the key-frame list (which is displayed in the display area 110), in order to display only those key-frames that meet certain criteria defined by the selected browser filter. For example use of a "ZOOM" browse filter will display only those key-frames that contain zoom camera effects.

Once a browse filter is selected, and thus applied, the list of key-frame or other media in the window 110 is updated. The selected media data that is displayed in the display area 110 remains available as various tool buttons are selected by the user. However by deselecting all browse filters 774, the effects of any previously chosen filter is reversed and the entire contents of the MOD 512 are displayed. If a different media type than the "ALL" type (770) is selected, then the Browse filters will change and be enabled or disabled to reflect the new media type. For example, selection of the Audio type 772 allows audio files, which will be displayed in the key frame window 110, to be filtered by music genre or beat pattern, while Images may be filtered by Light or Dark.

The user can, as noted in the above "browse" example, after applying one or more browse filters, select a subset sequence of the key-frames which are displayed in the display area 110, and transfer that sequence to the playlist controller GUI 704 (see FIG. 7A).

Figure 8:
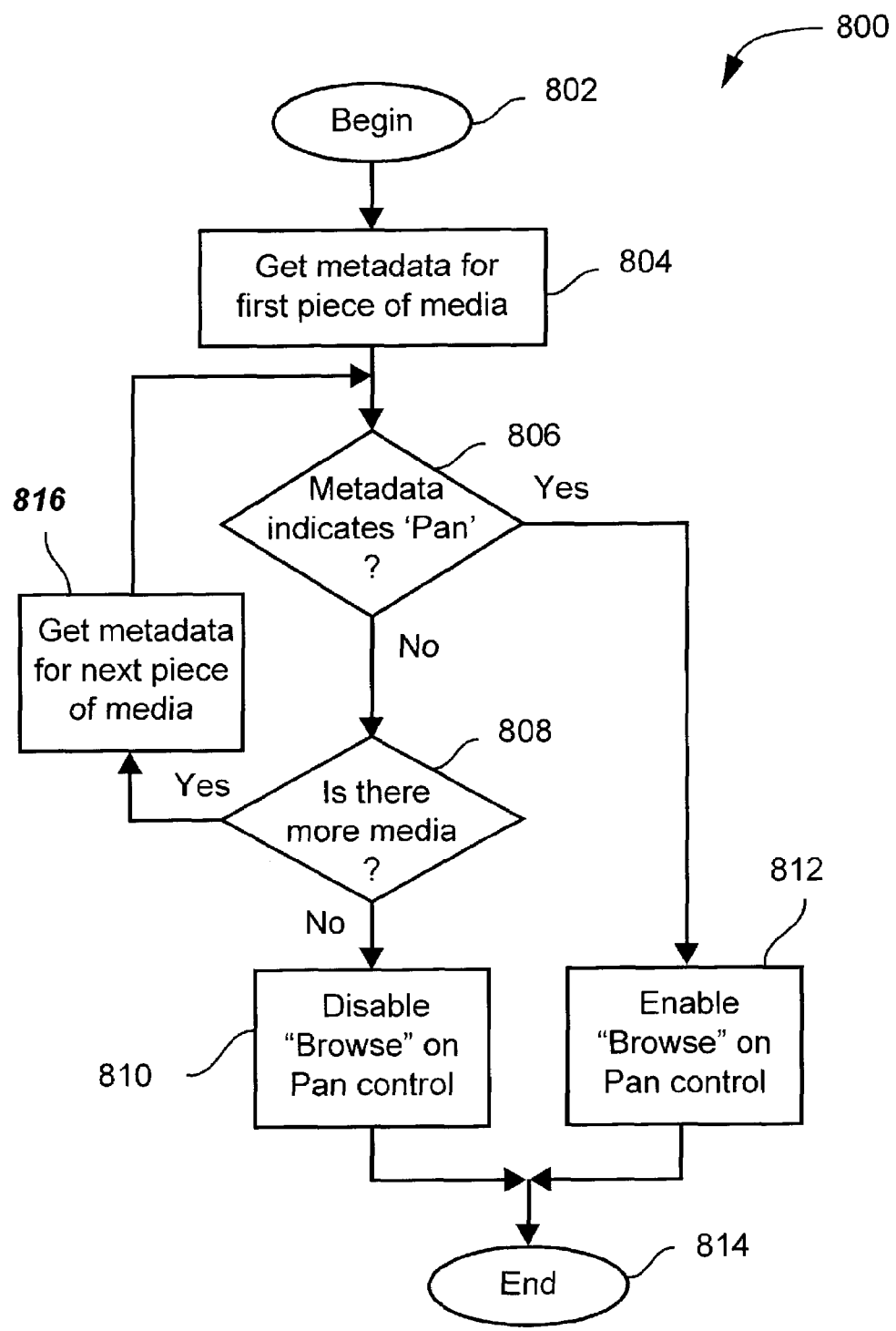
FIG. 8 is a process flow-chart for implementing metadata driven GUI controls.

FIG. 8 is a flow diagram for an exemplary process 800 for controlling meta-data driven GUI controls. The process relates to a GUI which is presently displaying a number of different pieces of media (video, audio, still), and in which it must be determined which controls are to be enabled for the user. In this example the system is considering if the 'Browse on Pan' control should be enabled. The process 800 commences with a start step 802, after which meta-data for a first piece of media is obtained in a step 804. Thereafter, a testing step 806 tests the meta-data for presence of a 'Pan' indication. If such an indication is present, then the process 800 is directed in accordance with a 'yes' arrow to a step 812 which enables a 'Browse on Pan' control, after which the process terminates in a step 814. If, on the other hand, a 'Pan' indication is not detected in the testing step 806, then the process 800 is directed from the testing step 806 in accordance with a 'no' arrow to a second testing step 808 which tests whether any further media items are available. If such items are available, then the process 800 is directed in accordance with a 'yes' arrow to a step 816 which obtains meta-data for the next piece of media, after which the process 800 is directed back to the testing step 806. If, on the other hand, the testing step 808 determines that no further media items are available, then the process 800 is directed from the testing step 808 to a step 810 which disables the 'Browse on Pan' control, after which the process 800 terminates at the step 814.

4.2 The Playlist Controller

Returning to FIG. 7A, the GUI 704 includes a video/still image viewer window 706 and a synchronised audio player device (not shown). The viewer windows 706 together with the audio player allows multimedia presentation of media items to the user. The GUI 704 has viewing controls including a play/pause button 736, a fast forward button 734, a rewind button 738, a frame step forward button 732, a frame step reverse button 740, a clip-index forward button 730, and a clip-index reverse button 742. The GUI 704 also has a current clip summary bar 720, over which a clip scrubber 758 slides, as well as an in-point marker 756 and an out-point marker 710 slide. An active clip segment marker 762 is also displayed.

A playlist summary bar 722 is displayed, overlaid by proportional clip indicators including 724 and 728, as well as a playlist scrubber 746, which is connected to the clip scrubber 758 by a line 764. The GUI 704 also has a playlist mode box 702, and a playlist mode indicator 700, as well as audio channel indicators and controls for a right channel 708 and a left channel 760. Media components referable by the playlist controller 224 (see FIG. 2) are selectable and manipulable by common file commands such as "drag and drop", "copy", "paste", "delete" and so on.

Returning to FIG. 7A, the clip summary bar 720 and its components operate in a similar way to a conventional trimmer window scrubber, where the length of the clip summary bar 720 represents 100% of the current clip displayed in the trimmer window 706. The scrubber control 758 can be moved left or right at varying speeds by the user to access discrete frames within the clip at the proportional position within the clip duration according to the scrubber relative position along the length of the clip summary bar 720. Further, the ability to set at least one pair of "in and out" points is provided, by dragging corresponding "in" or "out" markers from initial locations 752 or 718 respectively, to locations such as are indicated by 756 and 710 respectively. The constantly available display of the playlist summary bar 722 relieves the user of the need to pan the time line in order to evaluate changes to components therein.

The intervening proportional length and clip duration 762 between these markers 756 and 710 is understood to be the portion of the clip that will be subsequently displayed or used. Other portions 754 and 716 of the clip are understood to have been trimmed, and will not be displayed or used subsequently.

It is possible to drag multiple in and out points into the clip summary bar 720 to represent and command the multiple segmentation of (non-nested) clip portions for subsequent use.

The viewer play controls, referred to collectively under the reference numeral 726 in FIG. 7A, may be activated by the user to initiate various kinds of playback within the newly trimmed clip, which is represented by the indicator 762. For instance, if the play button 736 is selected, then playback resumes from the current position of the scrubber control 758 within the active clip region 762, and continues until the end 710 of the active clip region 762 at which point playback stops. It is usual for the scrubber 758 to allow a user access to trimmed regions outside the current in/out points 756 and 710, for the purposes of viewing video in such regions, to allow further modification of the existing in or out point, or for adding further in or out points. Therefore, non-linear interactions are typically provided between playback controls 726. For example, having regard to the play button 736, the scrubber 758, and the active clip region 762, it is noted that if the scrubber 758 is presently outside the active clip region 762 when the play button 736 is pressed, then the scrubber 758 immediately jumps to the first frame of the active clip region 762, and commences playback until the last frame of the active clip region 762. It is typical and useful for the scrubber 758 to track the current playback frame by moving proportionately along the active clip region 762 according to the relative time-location of the currently playing video frame.

As discussed, the above-described functionality of the current clip summary bar 720, the associated viewer 706, and the playback controls 726 is conventionally provided in a trimmer window in currently available editors. Such editors that provide a trimming window functionality, either (i) provide the trimming window functionality independently of and without any synchronised viewing at an associated edit timeline, or (ii) provide trimming window functionality with a synchronised position marker within the timeline such that the position marker within the edit timeline represents the proportionate position of the current clip scrubber 758, but within the edit timeline production as a whole.

Editors of the first kind (i) disadvantage the user because there is not provided any dynamic or current information about the effect of trimming the current clip on the whole of the edit timeline production or playlist or EDL. Accordingly, the local clip information being modified by the user is not presented to the user in terms of its global effect. In fact, it is usual for such editors not to insert the current trimming information into the edit timeline until the user explicitly, and usually laboriously, performs the insertion by a sequence of GUI operations involving dragging and dropping and often replacing clips, and rendering and/or previewing the timeline result.

Editors of the second kind (ii) provide the user with a global marker positioned according to the relative length 762 of the currently trimmed clip to the overall timeline production length and offset proportionately to the position of the scrubber 758 within the proportionate length of the trimmed clip 762 as the trimmed clip 762 is positioned within the overall timeline length. Thus, if the scrubber 758 is moved, then the global marker will move proportionately within the distance describing the trimmed clip length shown within the timeline production display. If the trimmed clip length is altered by the user by moving either or both of the in or out points in the trim window then the proportionate length of the trimmed clip within the timeline production display will also change, and the position marker might be moved to proportionately match the position of the scrubber 758 within the trimmed clip length.

Editors of type (ii) therefore do provide a current or dynamic update of the global effect of a local clip trimming action performed by the user. Such editors also have the following disadvantages: (a) the edit timeline is not positioned in any alignment or visual proximity to the trimming window, and so little information may be available to the user in one glance as to the global effect of a local change; (b) because of the use of fixed length resolution representing time duration along the timeline 722, a timeline containing a number of clips can easily reach beyond the boundaries of the current window, requiring scrolling to see the total global effect of a local clip trimming action; (c) the facility to quickly select any random clip within a timeline 722 for trimming within the trimmer is not provided in the convenient fashion that will be described.

In summary the GUI 704 in FIG. 7A is supported by the playlist controller 224 (see FIG. 2), and the GUI 704 incorporates with these the multimedia viewer 706 for viewing video clips and listening to audio selections. The viewer 706 also enables display of images, or other media, and has the current clip summary bar 720 for viewing and/or trimming of a current video or audio clip using a clip editing process and for setting or resetting meta-data flags for the current audio/video clip. The GUI 704 also has the playlist summary bar 722 which is updated according to a production editing process in order to conform the production, in a synchronously dependent manner, to changes made to the current clip. The playlist summary bar 722 indicates the overall (global) production timeline, also known as the playlist, of which the current clip shown in the current clip summary bar 720 is typically a part. The GUI 704 also has player controls 726 for controlling playback, and various forward and reverse access modes to the current clip or the playlist.

The GUI 704 also has one or more meta-data display regions 714 aligned with the current clip summary bar 720 or the playlist summary bar 722. The display region 714 contains zero or more meta-data flags or statii, such as regions 712 and 748, which identify in and out points for each of two differing user-nominated effecting processes applied over the playlist. The time references associated with the meta-data flags are indicated by the relative position of the flags, referred either to the duration of the current clip, as indicated by the current clip summary bar 720, or to the duration of the playlist, as indicated by the playlist summary bar 722. Which summary bar reference is valid to a metadata flag is typically shown by graphical proximity thereto, or by another visible association. For instance, the highlight graphic (which is described in more detail below) points to the current clip summary bar 720 to which it is referenced. The GUI 704 also has audio volume controls 708 and 760, and optionally, the mode selector 702 which may, however, not be present in some arrangements of the GUI 704.

The described playlist controller 224 and associated GUIs 100 and 704 provide sufficient editing facilities, particularly with reference to the playlist summary bar 722, that a conventional edit timeline is not a requirement for even an advanced user. However, such an edit timeline remains an option if the user wishes to benefit from some of its capabilities such as embedded keyframes display. Further, the playlist controller 224 and GUIs 110 and 704 provide additional convenience by providing the synchronised and aligned locating of the clip summary bar 720 and the playlist summary bar 722, with the meta-data flags summary 714 and the viewer 706.

4.2.1 Manual Editing Playlist Controller

The example of the GUIs as shown in FIGS. 7A and 7B is specifically directed to manual video or audio editing. The playlist summary bar 722 represents similar data to that shown by a typical edit timeline, the playlist summary bar 722 being based on the EDL output of the manual editor function 228 (see FIG. 2) operating within an application to which the browser and playlist controller GUIs (100, 704) are connected. The mode switch 702 is optional in this configuration, and is shown only to indicate that the playlist controller GUI 704 is in manual edit mode (as depicted by the reference numeral 700), as opposed to an auto-edit mode, which is discussed later.

The typical operation of the playlist controller 224 is as follows. As a starting point, the user selects and transfers to the playlist controller GUI 704, a clip sequence by one of several equivalent means. Having done so, this clip sequence is depicted in the playlist summary bar 722 by alternating dark and light bands 728, 724 where the length of each band represents the proportionate duration of an individual clip compared to the overall sequence duration. The user may choose to view the clip sequence or playlist by operating the playlist scrubber 746 or the play controls 726. At this point the playlist summary bar 722 contains only the input clips and any default transitions or effects that have been preset by the user within the application. The contents of the playlist summary bar 722 are equivalent to those of an edit timeline that merely holds raw input clips prior to any editing operations being undertaken by the user. The user may proceed to modify or edit or effect the contents of the playlist by using the facilities of the playlist controller 224 as described below.

The user may add effects or transitions to the playlist by selecting and dragging these from the browser GUI 100 into the meta-data display region 714 of the playlist controller GUI 704. Alternatively, the effects and transitions can be dragged directly on to the playlist summary bar 722. This meta-data display region 714 may be extended vertically to include a number of meta-data flags, such as effects or transitions, of interest to the user. The user can add or select or remove such effects by various convenient means such as clicking within the appropriate region of the meta-data summary 714 and selecting an effect or a meta-data flag from a popup box that appears (not shown). The pop-up box (which can take the form of a side-bar) can operate as a switch which reveals alternate meta-data displays, or which may display an expanding and/or collapsing display of additional controls. Alternatively the user can drag in a flag or effect from a sidebar such as 750 and modify start and end points for the flag or the effect by clicking and dragging. Thus, the user may obtain many of the standard features of a conventional edit timeline within the context of the controller playlist controller GUI 704 and the associated playlist controller 224.

The playlist controller 224 provides a strong benefit in its synchronised behaviour between the current clip summary bar 720 and the playlist summary bar 722 and the viewer 706. As a part of standard editing operations the user will typically wish to modify the in and out points (eg. 756, 710) of one or more clips from within the playlist sequence, and the disclosed arrangements provide the user with the ability to simultaneously view the global effect of such changes, whether the changes involve durations of three minutes, or three hours, as well as providing rapid and convenient access to individual clips for applying such effects.

These aforementioned facilities can be accessed in a number of ways. For instance, the user may traverse or scrub through the contents of the playlist summary bar 722 by operating the scrubber 746 on the playlist summary bar 722.

As the scrubber 746 is moved along, across dark and light clip boundaries associated with the displayed bars 724, 728 for example, the clip contained within the current clip summary bar 720 and the viewer 706 is constantly and immediately updated to correspond to the clip indicated by the exact position of the scrubber 746 within the playlist summary bar 722. The current clip selected and displayed by this means is traversed within the current clip summary bar 720 and is shown in the viewer 706 as the user moves the scrubber 746 along the length of the clip (by a distance of one dark or one light region) within the playlist summary bar 722.

The scrubber 758 in the current clip summary bar 720 also displays the relative position within the current clip, synchronising exactly with the same relative position of the scrubber 746 within the dark or light clip region, such as 744, within the playlist summary bar 722 and also synchronising exactly with the frame sequence displayed in the viewer 706. Accordingly, as the user moves the playlist scrubber 746 along a clip region 744, the current clip scrubber 758 moves in synchronism along the active region 762 of the current clip summary bar 720. This synchronism provides the user with a high degree of convenience for accessing clips via the playlist scrubber 746, particularly if the user has an intention of performing editing operations within the current clip summary bar 720 or the metadata region 714.

The viewer 706 operates in one of several modes to display either the original, un-effected contents of the current clip, or to show a preview or the final, typically effected contents of the playlist. The term "effected contents" refers to media content which has been "edited", and has accordingly been trimmed, and/or had effects added thereto. The elected mode to be used by the viewer 706 can be chosen in several ways depending on the most convenient or appropriate manner consistent with the arrangement, or the operating style or context of the user.

One arrangement of this modality is to have the viewer 706 display the relevant content depending on the last scrubbing operation made by the user. The last scrubber or summary bar to be operated by the user will thus set the mode of the viewer. Thus, if the user last moved the playlist scrubber 746, then the viewer 706 switches to showing the preview of the playlist EDL. If, however, the user then moves to operate the current clip scrubber 758, then the viewer 706 switches to display the original, uneffected contents of the current clip. This switch of modality can be indicated to the user in a number of ways, for instance by changing the colour of the active scrubber to red, and that of the inactive scrubber to white.

The play controls 726 can also operate in a modality similar to that described for the viewer 706, in which the controls 726 control the playback of whichever content is currently selected for viewing by the mode of the viewer 706. That is, if the current mode of the viewer 706 is current clip mode, then the playback controls 726 operate within the constraints of the uneffected current clip, as is the convention for trimmers. In this mode, the current clip scrubber 758 will indicate the current playback frame shown in the viewer 706 and the playlist scrubber 746 will indicate the same relative position within the clip region 744 of the playlist summary bar 722. If, however, the viewer 706 mode is playlist preview, then the player controls 726 will operate within the bounds of the entire playlist, and will cause the playlist to be previewed in the viewer 706. In this mode, the playlist scrubber 746 will indicate the current playlist preview frame shown in the viewer 706, and the current clip scrubber 758 will show the equivalent frame position within any current clip as each clip is traversed by the playlist scrubber 746 along the playlist summary bar 722.

Figure 9:
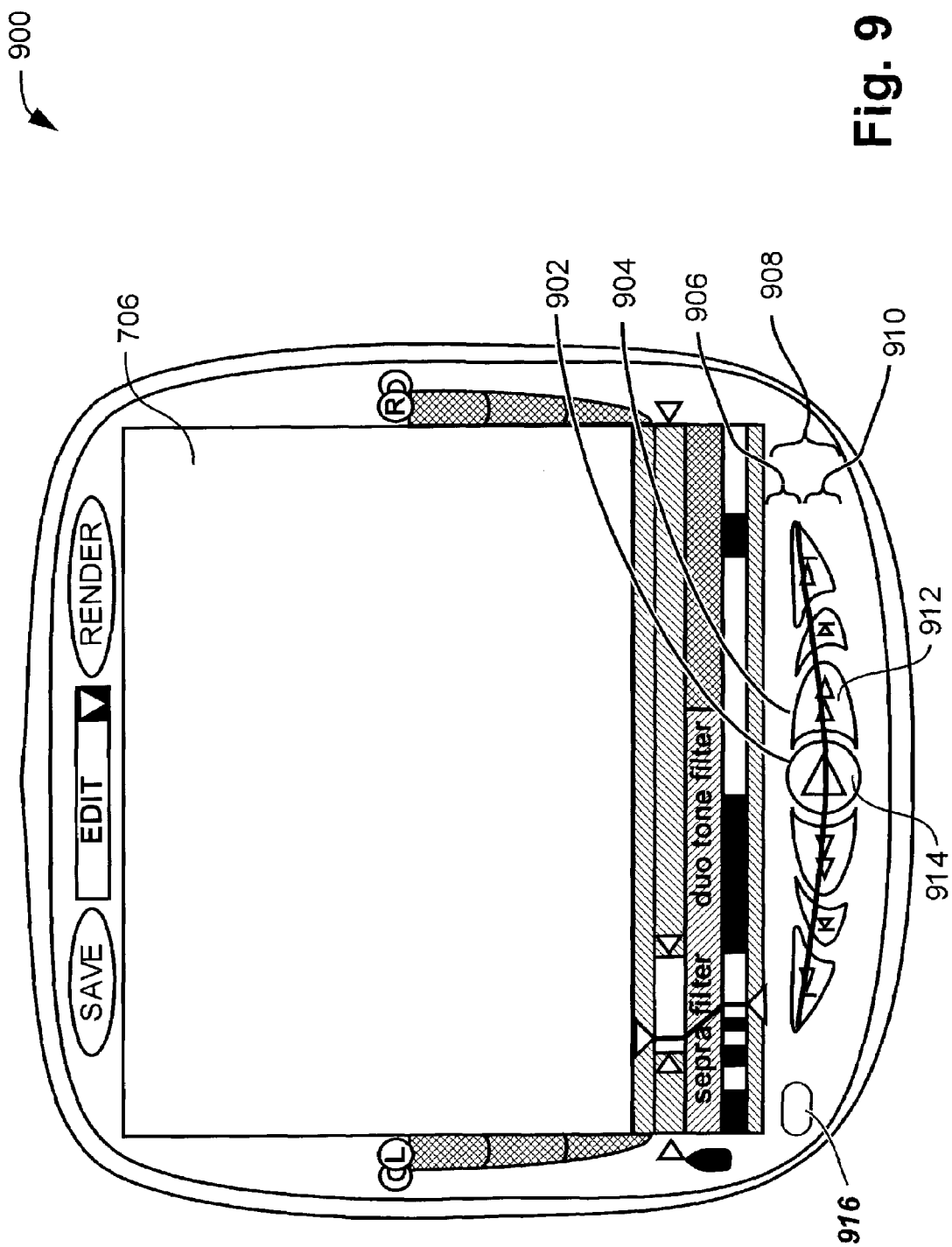
FIG. 9 depicts a playlist controller GUI used for manual editing.

FIG. 9 shows a further mode 900 which is available for the playback controls 726 (see FIG. 7A), in which preselection of the display mode of the viewer 706 by selecting and activating a scrubber, as described in relation to FIG. 7A, is not required prior to selecting the playback mode of the user's choice. This can be achieved by splitting playback controls 908 into two sets of individually operable controls 910 and 906, each set being associated with a particular viewer mode. Thus, irrespective of the current viewer mode as set by the last used scrubber control, the user may operate one of the split playback control sets 910, 906 and this operation implicitly sets the new mode for the viewer 706. For instance, if the user operates a preview playlist playback button 914, then the viewer 706 is immediately placed into playlist preview playback mode, and commences playing the playlist preview. If, however, the user operates a current clip playback button 902, then the viewer 706 is immediately put into current clip playback mode and commences playing the current clip from its in-point.

Returning to FIG. 7A, it is noted that among the various editing operations that can be performed by the user, the removal or deletion of a clip is a common operation. An advantage provided by the disclosed arrangement is to allow the removal of a clip, while preserving the ability to restore that clip in its original position, and to re-edit it, thereby recovering a previously "deleted" clip for inclusion within the playlist. This facility is provided by the playlist summary bar 722 "depicting" zero-length clips by means of thin red vertical lines, or some equivalent minimal, non-zero length representation. This allows a user to scrub to that location on the playlist summary bar 722, causing that zero-length clip to be displayed in the current clip summary bar 720 and the viewer 706. A zero length clip will typically be obtained by setting the in and out points on the current clip summary bar 720 to overlap exactly in a current clip, hence causing a clip duration of zero frames. This situation can be highlighted to the user by setting the current clip summary bar 720 to red, for instance. A magnifier function on the playlist summary bar 722, described in more detail in relation to FIG. 13, allows easy selection of clips in the playlist summary bar 722 that appear with a very narrow representation. Of course, a zero-length clip will always appear with the narrowest representation on the playlist summary bar 722.

The manual editor 220 part of the GUI system 300 (see FIG. 3) is a simplified time-line, containing one video— plus—sync audio track, and one background audio track, where the two audio tracks can be switched to be visible to the user. The user can access the audio timeline by activating the "AUDIO" filter 772 in the browser GUI 100 in FIG. 7B, or by other means made available in the playlist controller GUI 900 (see FIG. 9), such as by operating an audio-visual (A/V) track mode button 916. The modal timeline changes state to match the selected state.

In the case of the "AUDIO" filter being activated, the media items providing track "backing music" become available for editing. Audio clips can be selected in a sequence, or can be dragged and dropped on to the playlist summary bar 722 (see FIG. 7A), thereby creating a sequence of audio tracks. As the audio tracks are added to the timeline 722, automatic "snapping" to the start of the nearest video clip occurs. Where a previous audio track is longer than a video clip, the sequentially added audio "snaps" to the end of the nearest video track. The user can override this function by not letting go of the audio track while dragging, thereby allowing "snapping" to another available location, such as a later video clip start point. Thus, the manual editor 228 (see FIG. 3) easily supports several audio synchronisation options.

Playlists (EDLs) may be explicitly saved by operating a save button, or can be implicitly saved by dragging items from the playlist summary bar 722 (see FIG. 7A) into the browser GUI 100 (see FIG. 7B), which deposits an EDL for the dragged items (which is typically a component of the playlist) into the "My Movies" section at the tab 768 of the browser GUI 100. Entire EDLs, or parts thereof, whether explicitly or implicitly saved, can be later rendered into full-content movies from the browser screen by operating a render button (not shown) or by selecting such EDLs or parts thereof for input back into the playlist controller GUI 704 (see FIG. 7A) for playing.

A Saved Movie can be reinserted into the playlist controller 224 (see FIG. 3) by the user selecting it or dragging it from the browser display area 110 of the "My Movies" tab 768 (see FIG. 7B) to the playlist summary bar 722 (see FIG. 7A) for further modification. A reopened movie returns to the playlist controller 224 in exactly the same state as it was when it was originally saved from the playlist controller 224. Rendered and saved movies can be made available for use as raw input material for the manual or auto editors 228, 240 in the same way as described for any raw video clip once the said movies are made to appear by the usual means in the browser window 110 (see FIG. 7B).

4.2.2 Playlist Controller Functionality

Figure 10:
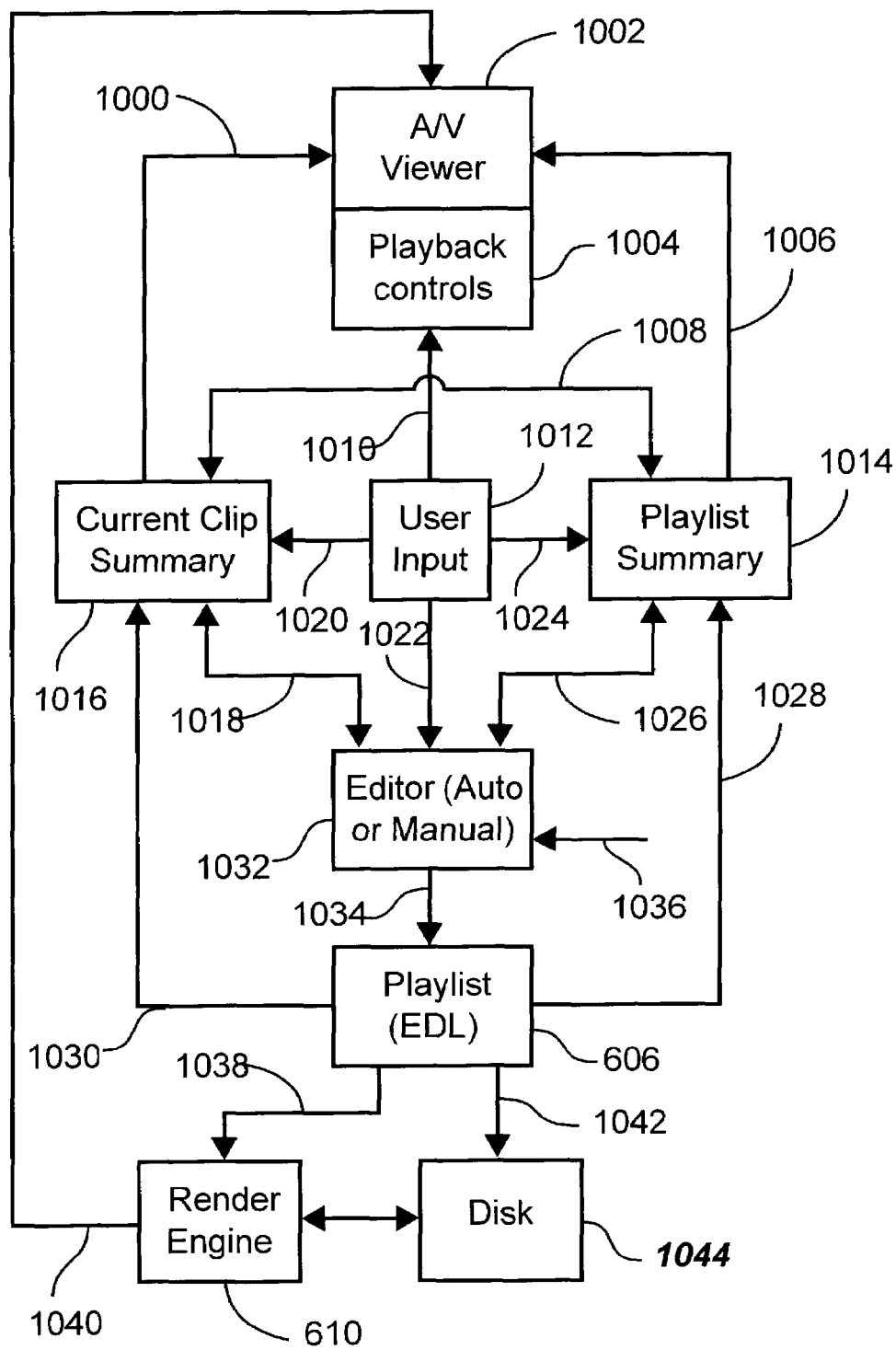
FIG. 10 is a data flow diagram underlying the playlist controller GUI of FIG. 7B.

FIG. 10 illustrates the data flow between the major modules of the playlist controller 224 (see FIG. 6). When a selection sequence at 1036 is input to an editor 1032 (which may be the auto-editor 240 or the manual editor 228 of FIG. 6), a preliminary EDL or playlist 606 is generated and stored in memory as depicted by an arrow 1034, and the playlist 606 is provided to a current clip summary module 1016 as well as to a playlist summary module 1014 via connections 1030 and 1028, respectively. These modules 1016, 1014 update their internal states and their GUI states using the EDL information. The playlist summary module 1014 updates its display which is the playlist summary bar 722 (see FIG. 7A) of the entire playlist duration, with pro-rata representations of individual clip durations and effects meta-data, as has been described in relation to FIGS. 7A and 7B. The current clip summary module 1016, however, only selects information from the EDL 606, which is relevant to the currently selected clip identified by the position of the playlist scrubber 746 within the playlist summary bar 722 (see FIG. 7A). This current clip selection information can be obtained by the current clip summary module 1016 from the editor module 1032 via the connection 1018, or directly from the playlist summary module 1014 via a connection 1008.

A viewer module, 1002 displays the content controlled by its current mode, defined as previously described by either the last scrubber to be selected, or the override made by the user when selecting one of the forced-mode playback controls 1004 forming a sub-module of the viewer module 1002. The viewer 1002 obtains its content, or references to its content, from the render engine 610 (see FIG. 6) which is supplied with the EDL 606 by the editor 1032, and is supplied with content from a disk 1044.

If the user operates, as depicted by a block 1012, a scrubber control or otherwise modifies properties of the current clip (depicted on the current clip summary bar 720 in FIG. 7A) or the playlist (depicted by the playlist summary bar 722 in FIG. 7A) via the playlist controller GUI 704 (see FIG. 7A), then this user input 1012 is fed to and processed by one or more of the current clip summary module 1016, the viewer module 1002, the playlist summary module 1014 and/or the editor 1032.

4.2.3 Auto-Editing Playlist Controller

Figure 11:
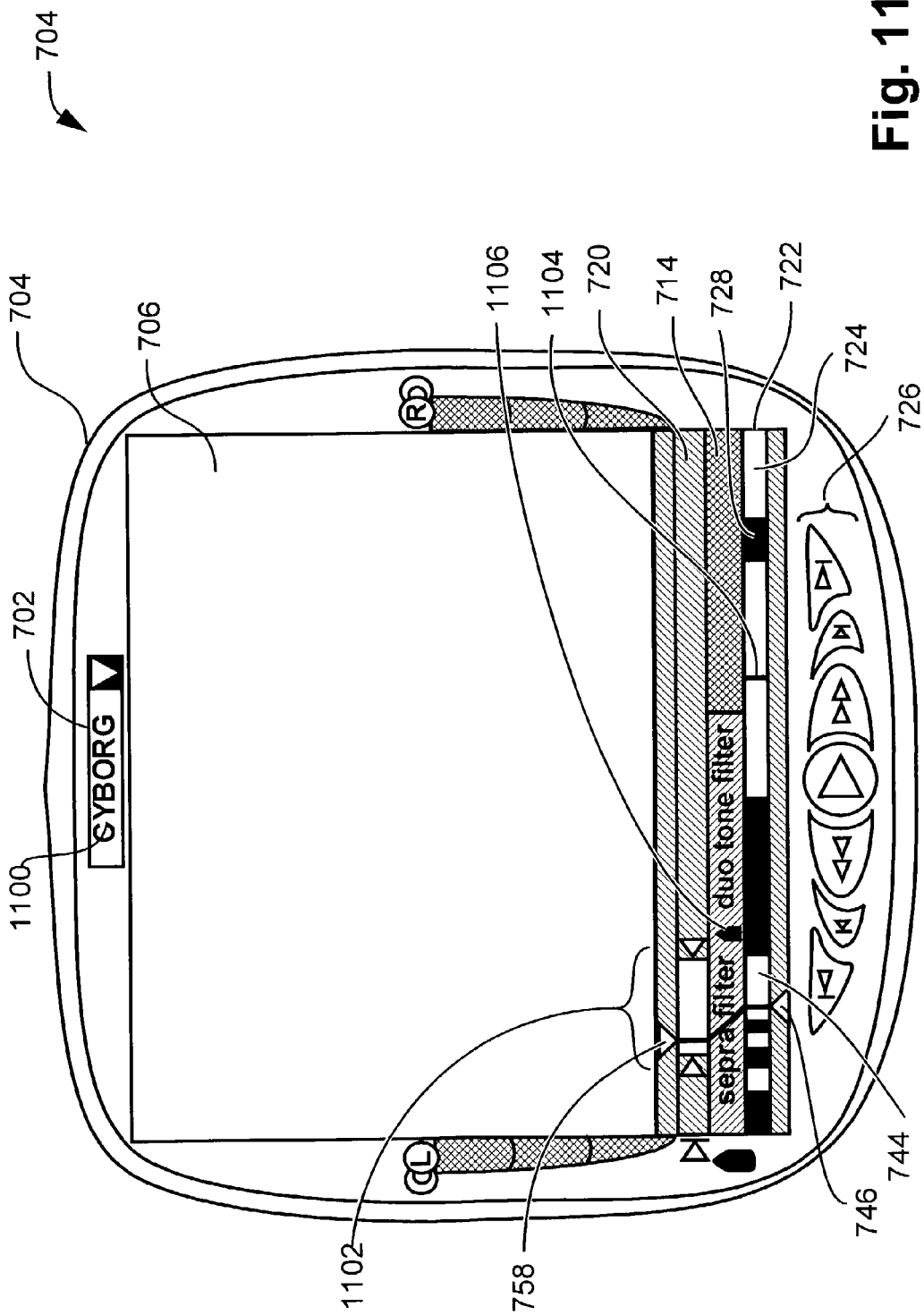
FIG. 11 shows a playlist controller GUI used for automatic editing.

FIG. 11 shows an arrangement 1108 of the playlist controller GUI 704, specifically for an automatic video or audio editor facility. The playlist summary bar 722 represents similar data to that shown by a typical edit timeline, and is based on an EDL output of the automatic editor function 240 (see FIG. 2) which is operating within an application to which the playlist controller GUI 704 is associated. The operation of this playlist GUI 704 in FIG. 11 is identical to that described for the (manual) editing playlist GUI 704 in FIG. 7A with the following exceptions.

The automatic editor 240 (see FIG. 2) accepts a selected sequence of clips and operates on these according to a selected template mode of the automatic editor 240, as well as meta-data attached to, extracted from or referenced by the clip sequence provided by the user via the playlist summary bar 722 (see FIG. 11). In general the automatic editor behaviour as instructed by the selected auto-edit template will be non-linear. Thus the resulting EDL, as displayed on the playlist summary bar 722, will not necessarily relate linearly to the input selected clip sequence, or to trimming or other operations optionally performed by the user in the current clip summary bar 720, or to the meta-data flag settings made in the clip meta-data region 714.

The mode switch 702 is provided in this configuration, and the switch 702 is shown in order to indicate availability of, and to allow selection of, a desired template in order to control the auto-editing functionality underlying the playlist controller 224 (see FIG. 2). The current setting 1100 of this template mode is for the "Cyborg" template, as depicted at 1100, this template being described in more detail later.

The typical operation of the playlist controller GUI 704 is as follows. As previously described, the user has selected and transferred to the playlist GUI 704 a clip sequence by one of several equivalent means. Apart from an initial short period while the auto-editing template is processing, this input clip sequence is not continuously shown in diagrammatic form in the playlist summary bar 722 by the alternating dark and light bands 728, 724. Rather, after the short delay during which the auto-editor 240 (see FIG. 2) processes the input clip sequence, these bands 728, 724 (see FIG. 11) change to represent the resulting clip lengths after operation by the auto-edit template. The same chronology of clips that was input will not necessarily be retained by the template output. The bands 728 and 724 show the relative proportions and chronologies of the clips selected and trimmed by the auto-editor 240. The initial period prior to completion of the auto-edit during which the playlist summary bar 722 temporarily displays the user's input clip sequence provides the user with some positive feedback that the auto-editor 240 (see FIG. 2) is performing. This feedback also, to some extent, infers what the auto-editor 240 is performing, as the auto-editor completes its task and the playlist summary bar 722 (see FIG. 11) is updated with the comparatively different output clip sequence. The user may choose to view the editor output playlist (EDL) by operating the playlist scrubber 746 or the play controls 726. At this point the playlist contains the initial result of the auto-edit template operation. The user may proceed to modify or edit meta-data referenced by, or associated with, individual clips shown in the playlist summary bar 722. The user can access these output clips by operating the playlist scrubber 746. Each output clip encountered by the playlist scrubber 746 has its content displayed in the viewer 706, and placed into the current clip summary bar 720. Related meta-data flags, such as highlights, are displayed in the current clip meta-data region 714. The current clip which is graphically represented by the current clip summary bar 720 has trimming points set to match the output trimming state previously determined by the auto-edit template. Thus, the user has the ability to modify the automatic results, for example the clip trimming of the template to suit their needs or wishes.

The user has the option to change, using the mode switch 702, the mode 1100 in FIG. 11 to manual edit ("EDIT") as depicted at 700 in FIG. 7A, and then the playlist summary bar 722 will display the user's original input clip sequence. If the user returns the mode 1100 to that of the previous auto-edit template, ie "Cyborg", the playlist summary bar 722 will update with the auto-edit output results for this template, and the user can view the changes in clip cutting and sequence between these two states of the playlist summary bar 722. Furthermore, the user can switch modes 1100 between any available templates and compare the cutting results and clip sequences between these in the playlist summary bar 722 for the identical input clip sequence.

FIG. 12 shows a "style dial" GUI 1200 that provides the user with an advantageous mechanism for selecting between available templates as an alternative to using the mode switch 570 of FIG. 11. The style dial GUI 1200 in FIG. 12 comprises the viewing screen 706 surrounded by a fixed non-rotating bezel 1212, beneath which is disposed a rotatable dial 1208. The bezel 1212 has a cutout 1204 at the lower edge thereof, that enables the rotatable dial 1208 to make visible a label 1206 of a particular template, the template presently being visible being entitled "Beach Life". The dial 1208 can be rotated in order to make visible one of a series of templates, and it is apparent that the style dial provides a convenient and effective way for the user to select a template from a large set of templates. The style dial GUI 1200 also supports an "apply" button 1210 and a "reset" button 1202 which can be used to control application of the selected template 1206, and resetting thereof to a default template (not shown).

Returning to FIG. 11, the user has, additionally, the option to modify the meta-data flags relating to the current clip, as can be shown within the current clip meta-data region 714. For instance, a typical auto-edit template might trim a clip to the segment 1102 as shown in FIG. 11 based on the position of a user-set highlight flag 1106. However, if the user wishes to move the highlight flag, in order to select and set a more appropriate frame of interest for the auto-editor template to operate on, then the auto-editor template is likely to cause the trimmed clip segment 1102 to be moved or modified to match the new frame location of the recently moved highlight flag 1106.

As previously mentioned for the (manual) editor playlist controller GUI 704 in FIG. 7A, some input clips might not be selected for output by the auto-editor 240 (see FIG. 2), and yet could still be displayed within the playlist controller 224 as a zero-length red vertical line or similar on the playlist summary bar 722 (see FIG. 9), thus allowing later user selection thereof for potential modification in the current clip summary bar 720. In the manual editor 228 (see FIG. 2) this de-selection of a clip can be performed by setting the in and out points to overlap in the current clip summary bar 720 (see FIG. 11) for the relevant clip. The use of a zero-length clip marker such as a red bar appearing in the playlist summary bar 722 remains the preferred method within the (auto-editing) playlist controller GUI 704, particularly because the auto-editor template might not select material for output from some clips, and thus any auto-edit output playlist summary bar 722 potentially includes a number of zero-length clip markers 1104. The user can move the scrubber 746 to such a marker 1104, causing the output clip to appear in the current clip summary bar 720 and the viewer 706, thereby allowing the user to modify the trimming or meta-data flags that will either force the editor to provide some material from the clip at the output (in the case of the former modification), or potentially cause the auto-edit template to select a region of the clip for inclusion in the output EDL (in the case of the latter highlight meta-data flag adjustment).

Figure 13:
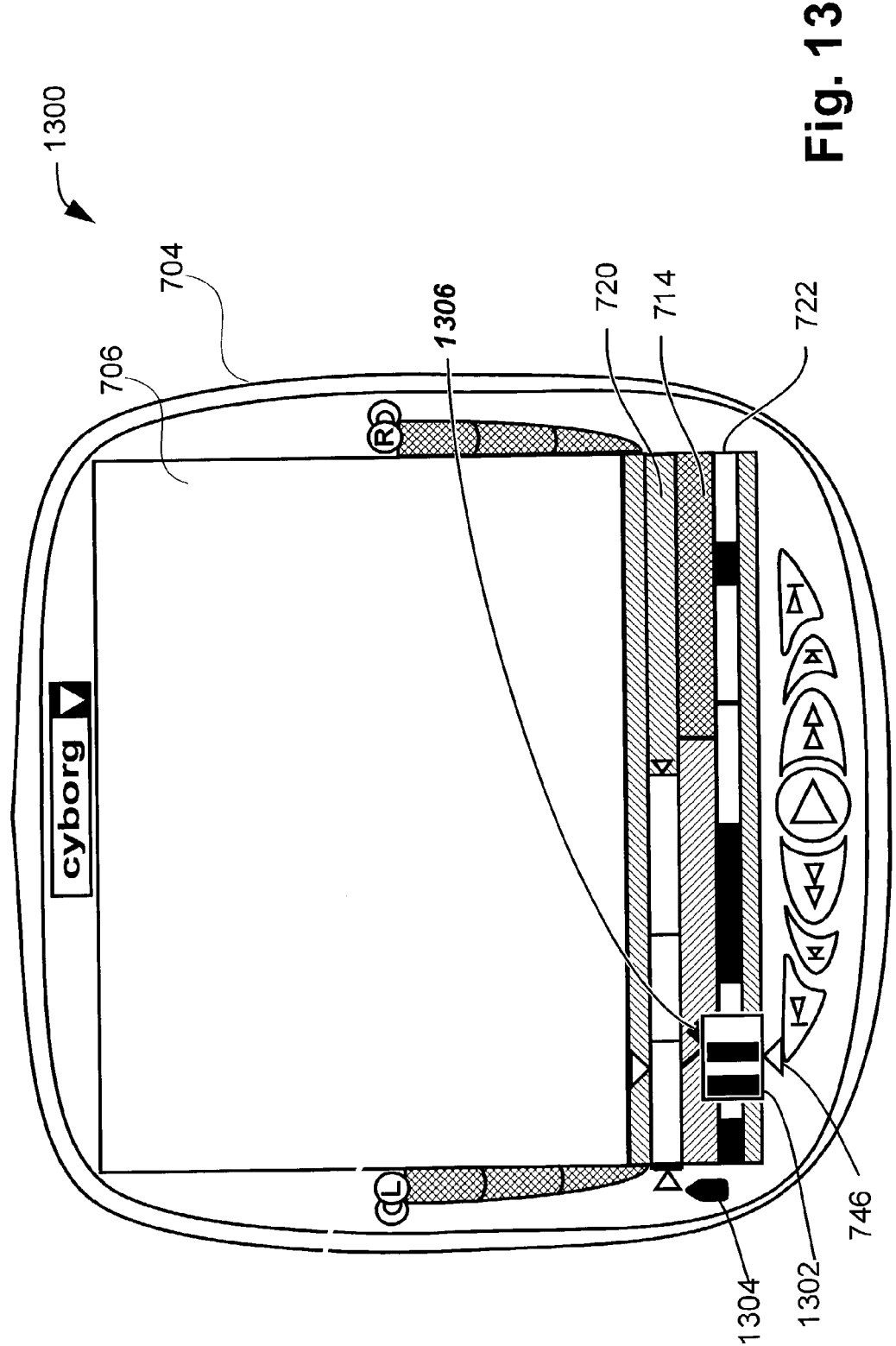
FIG. 13 shows a playlist controller GUI with an auto-magnified playlist summary bar.

FIG. 13 shows a view 1300 of the (auto-editing) playlist GUI 704 with a magnifier effect 1302 over the playlist summary bar 722 in the region of the playlist scrubber 746. This feature is provided to alleviate the problem of discriminating the possibly high density of clip boundaries or other information such as meta-data, which is possible in a constrained-length display such as the playlist summary bar 722. The magnifier 1302 can operate wholly automatically, switching on when it detects the playlist scrubber 746 to be positioned in or near a region of high information density above a certain threshold. A suitable threshold will be one where the user might begin to have difficulty in positioning the playlist scrubber 746 with sufficient ease or accuracy to select a particular clip. The magnifier 1302 will appear and scroll along with the playlist scrubber 746 wherever it may be needed based on the above or equivalently useful criteria.

Highlight or other meta-data flag information can be set within the current clip meta-data flag region 714 by various equivalent means, including in the described arrangement, the click and dragging from a symbol 1304 to a desired position 1306 within the meta-data flag region 714. An equivalent mechanism can be provided in which a simple click within the meta-data flag region 714 causes the instantiation of the highlight marker 1306.

The metadata flag region 714 in FIG. 13 is aligned with, and references, the current clip summary bar 720 in the auto-editor arrangement of the playlist GUI 704. This metadata display region 714 may be extended vertically to include a number of metadata flags of interest to the user.

Returning to FIG. 11, the playlist controller 224 (see FIG. 2) provides a strong benefit in its synchronised behaviour between the current clip summary bar 720 and the playlist summary bar 722 and the viewer 706. As a part of editing operations, the user will typically wish to modify the in and out points of one or more clips from within the playlist sequence, and the disclosed arrangements provide the user the ability to simultaneously view the global effect of such changes as well as providing rapid and convenient access to clips for applying such effects.

The viewer 706 in FIG. 11 operates in a modal way (in other words, it can be operated in one of several available modes), in order to display either the original, un-effected contents of the current clip, or to show a preview, or the final, auto-edited contents of the playlist. The modality of the viewer can be selected in several ways depending on the most convenient or appropriate mode for the arrangement, or on the embodiment or the operating style or context of the user.

One arrangement of this modality is to have the viewer 706 display the relevant content depending on the last scrubbing operation made by the user. The last scrubber or summary bar to be operated by the user will set the mode of the viewer, so if the user last moved the playlist scrubber 746 then the viewer 706 switches to showing the preview of the playlist EDL. If however the user then moves to operate the current clip scrubber 758, then the viewer 706 switches to display the original, un-effected contents of the current clip. This modality switch can be indicated to the user in a number of ways, for instance, by changing the colour of the active scrubber to red, and the inactive scrubber to white.

The play controls 726 can also operate in a similar modality, in which they control the playback of whichever content is currently selected for viewing by the mode of the viewer 706. That is, if the current mode of the viewer 706 is current clip mode then the playback controls 726 operate within the constraints of the unaffected current clip as is the convention for trimmers. In this mode, the current clip scrubber 758 will indicate the current playback frame shown in the viewer 706, and the playlist scrubber 746 will indicate the same relative position within the clip region 744 of the playlist summary bar 722. If, however, the mode of the viewer 706 is playlist preview, then the player controls 726 will operate within the bounds of the entire playlist, and will cause the playlist to be previewed in the viewer 706. In this mode, the playlist scrubber 746 will indicate the current playlist preview frame shown in the viewer 706, and the current clip scrubber 758 will show the equivalent frame position within any current clip as each clip is traversed by the playlist scrubber 746 along the playlist summary bar 722.

A further mode is available for the playback controls 726 in FIG. 11, in which preselection of the mode of the viewer 706 by selecting and activating a scrubber is not required prior to providing the playback mode of the user's choice. For example, as shown in FIG. 9, the playback controls 908 can be separated into two sets of controls, one set being for each viewer mode. Thus, irrespective of the current viewer mode as set by the last used scrubber control, the user may operate one of the playback controls and this operation implicitly sets the new viewer mode. For instance, and using the representation in FIG. 9 as applied to FIG. 11, if the user operates the preview playlist playback button 914 then the viewer 706 is immediately put into playlist preview playback mode and commences playing the playlist preview. If, however, the user operates a current clip playback button 902, then the viewer 706 is immediately put into current clip playback mode and commences playing the current clip from its in-point.

The output EDL from an auto-edit template typically includes effects, transitions, clip-trimming, audio balancing, addition of new audio/visual content, and other conventional editing and effecting operations. Such effecting operations can include re-ordering of input clips in the output, so as to produce the theme and style as intended by the selected auto-edit template. The previewing of such a result, or the result of a manual editor playlist controller EDL can be provided at lower spatial and chronological resolution, or provided with simplified or missing effects or transitions in order to allow high-speed preparation and realtime or near-realtime preview of the expected result of the playlist controller EDL. The full-quality rendering of the playlist controller EDL for either the manual or auto-editor arrangements 228, 240 (see FIG. 2) can be performed later at the discretion of the user by selecting a render button (not shown), or if performance permits within the implemented arrangement, instead of the previously described reduced-quality preview.

Returning to FIG. 11, playlists (EDLs) can be saved by operating a save button (not shown) or by dragging from the playlist summary bar 722 into the browser GUI 100 (see FIG. 7B), thereby depositing an EDL into the "My Movies" section of the browser at the tab 768. EDLs can be later rendered into full-content movies from the browser screen 110 or by operating the render button.

A Saved Movie can be reopened from the browser's "My Movies" tab display area into the (manual) editor playlist GUI 704 (see FIG. 7A) for further modification. A reopened movie returns to the manual editor playlist GUI 704 in exactly the same state as it was when it was originally saved from the (auto edit) playlist GUI 704 in FIG. 11. Rendered movies can be made available for use as raw material for the manual or auto editors 228, 240 (see FIG. 2) in the same way as explained for the manual editor rendered movies.

A movie can be rendered to a media-only form, without an EDL representation. This rendering can be performed by selecting a "Render" button (not shown) and this will operate on the current auto-editor playlist EDL. The rendered movie has several advantages and disadvantages over the EDL movie form. The rendered movie is disadvantageous in that it consumes more space on the MOD 512 (see FIG. 5), but on the other hand, it is ready for instant playback, can be easily exported as a stream, can be used as raw input material into another process such as manual or auto editing and does not require access to the original clips and effects in order to recreate or replay it. The rendered form might also overcome compatibility or format issues where some externally-connected devices or software applications might not understand the EDL format or might not have easy or timely access to EDL-referenced media.

Several hybrid options are possible between an EDL and a rendered movie. The EDL is retained when the movie it represents is rendered. This provides a powerful opportunity to revise the rendered movie by substituting it with the EDL, thereby allowing easy revision, at appropriate times, such as when re-submitting the movie to the auto or manual editors 240, 228 (see FIG. 2) for modification. The meta-data associated with the pre-rendered movie is therefore not lost and becomes available for advanced browsing of edited content. For example, the user may wish to search for all clips applied with "SEPIA" effects. Such metadata will be preserved in the EDL of the rendered movie and can be retrieved for use in, for example, the browse filters 230 (see FIG. 2). As described previously in regard to FIG. 7B, the browse GUI window 110 makes available to the user such meta-data and would provide a contextual filter indicating that clips are present with sepia effect.

Another hybrid option is the processed EDL, in which all effects and processing are performed for the rendered result except those requiring only a simple move or copy. In this way, only new material is stored on the MOD 512 (see FIG. 5) and duplication of material is avoided. This processed EDL hybrid scheme allows for fast random-access playback and streaming of material without any processing steps, having the advantage of requiring minimal extra space for the rendered material. This hybrid form could also benefit from retaining a more detailed EDL including the original effects and processing material as explained for the first hybrid form, thereby allowing iterative editing in the manual or auto editors 228, 240 (see FIG. 2).

The Saved Movie output EDL from the auto editor 240 is in a format that is understood and can be operated on by the manual editor 228. This allows the user to select a Saved Movie and import it (for example by dragging it) into the Manual Editor GUI 704 (see FIG. 7A) from the MY MOVIES Tab display area 768 in the browser GUI 100 (see FIG. 7B). The Manual Editor timeline 722 (see FIG. 7A) will then show many of the components of the auto-edited production and allow the user to alter these. The temporal components, such as transitions and cut-lengths will typically be adjustable by the user as well as some other components such as audio track selection and volume/fade, some video clip selection, and so on. This facility allows a user to subtly alter an auto-edited production and is suitable for users who wish to have more control over their work. It is an optional feature that can be ignored by users.

4.3 Feature Tracking & Sprite Animation

Figure 14:
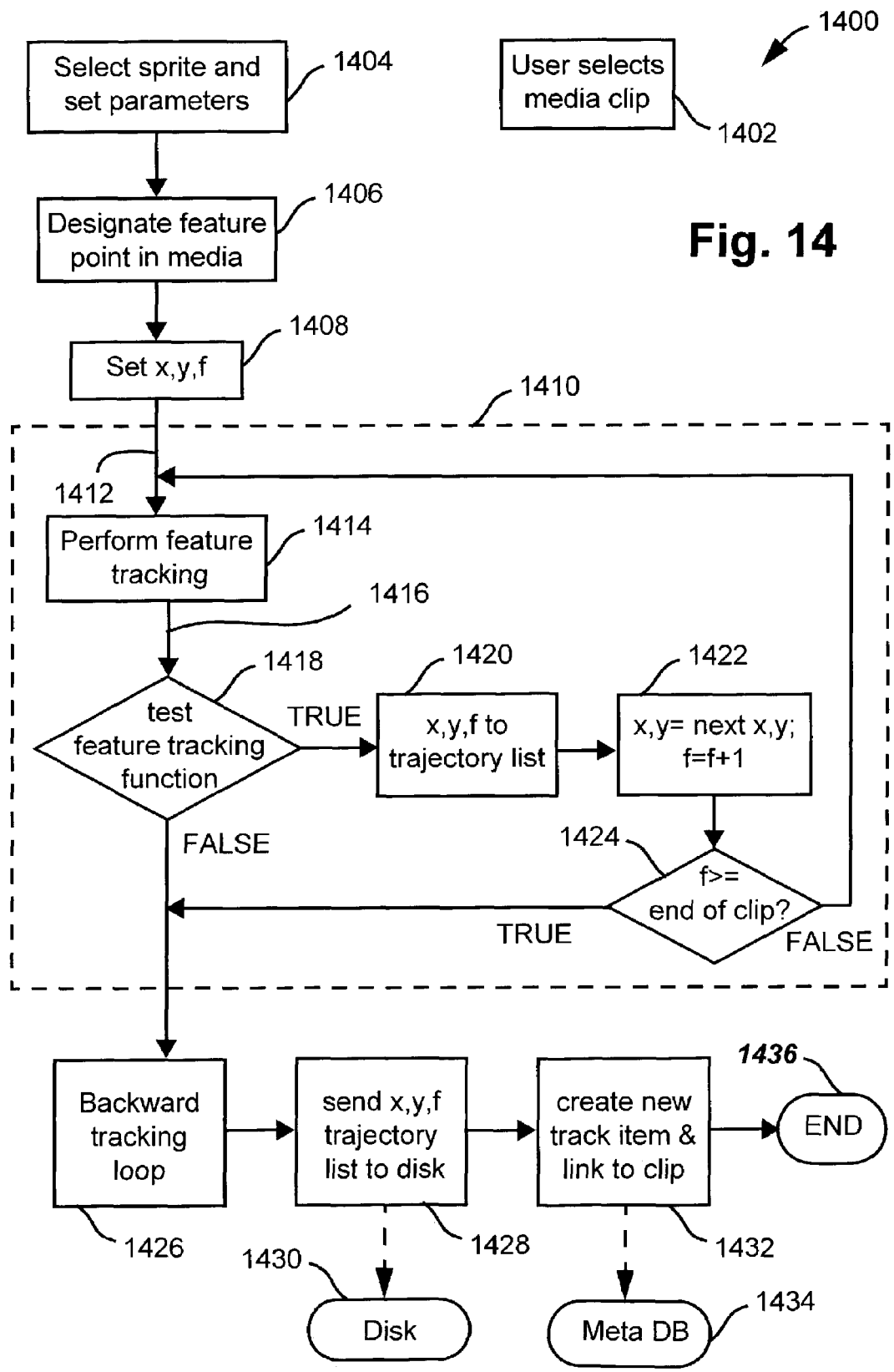
FIG. 14 shows a process for Feature Tracking and Creation of a Trajectory List and Track Item.

FIG. 14 is a flow diagram 1400 for a feature tracking process. The process 1400 is typically followed immediately by execution of an animation process 1900 shown in FIG. 19, and typically followed immediately thereafter by compositing and rendering of the animation and media components and layers in the form of a preview or final view of the resultant production. The flow diagram in FIG. 14 is to be read in conjunction with pictorial FIGS. 15, 16 and 17.

Figure 15:
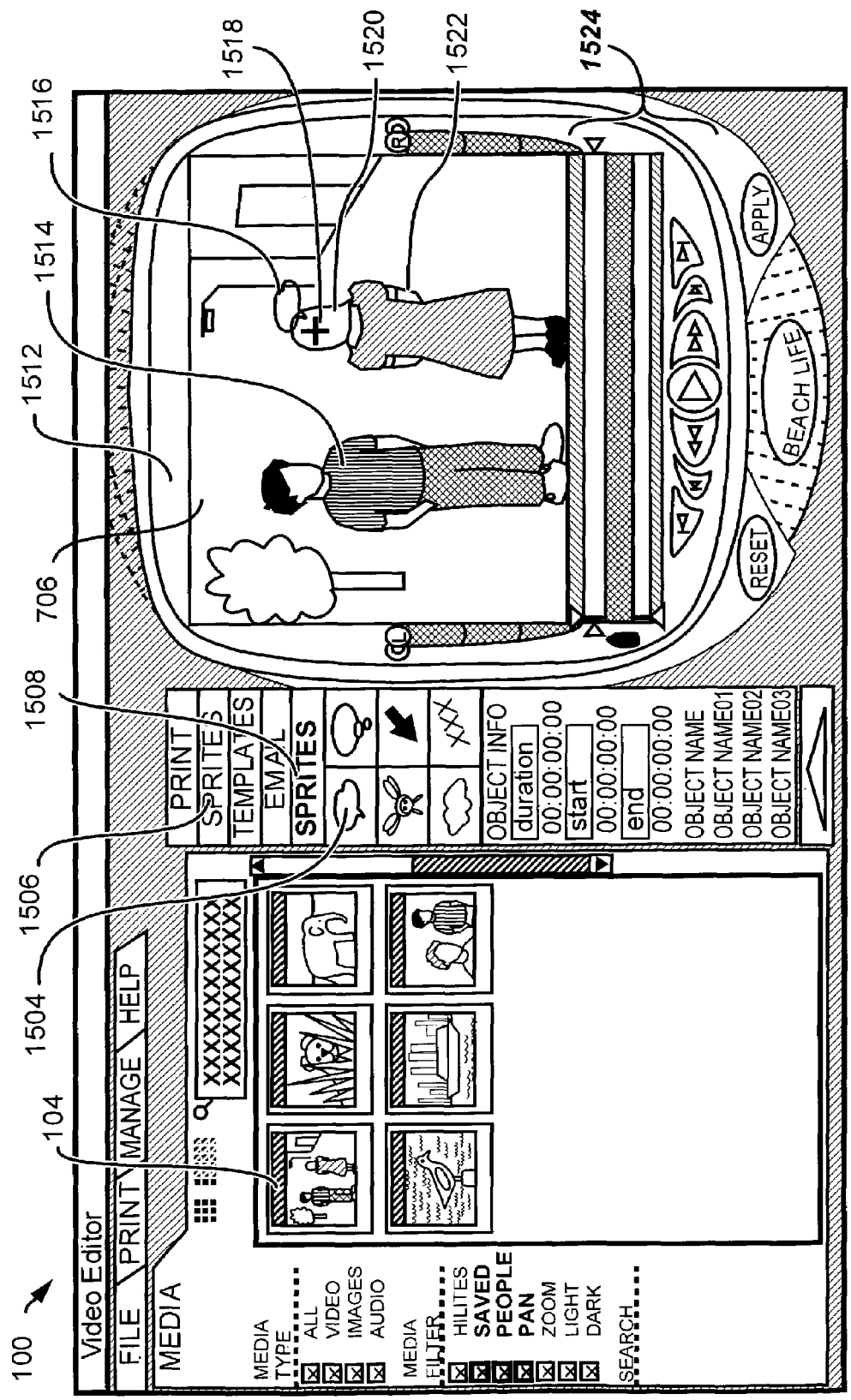
FIG. 15 shows a GUI for User Selection of a Feature for Tracking with Simultaneous Application of a Sprite Animation.

FIG. 15 shows the following components or functions, which aid in successful provision of interactive, user-nominated feature tracking and sprite animation: (i) the frame or video viewer or previewer window 706, within which a user can select and view one or more video frames in stop-motion or moving sequence via controls 1524, to select an appropriate feature to track and identify the time and space coordinates by left-clicking a mouse button after placing a cross-hair cursor over the desired point; (ii) a pointing facility, typically involving a mouse button and cross-hair cursor 1518 allowing selection of any appropriate feature 1520 at any spatial coordinates within the video frame; (iii) a menu GUI 1508 activated by a GUI button 1506 for user selection of a sprite animation 1504 for application to the tracked feature 1520; (iv) visual confirmation of the selected sprite animation and preview of its appearance 1516 next to the tracked feature 1520 through display of the animated sprite 1504, or a simplified version of such next to the cross-hair cursor 1518 used to select a feature for tracking (v) the video compositor and renderer 310 in FIG. 3, this being capable of compositing an animation sprite and its transparency layer over a video clip and rendering the result as a scaled-down preview on one of the displays 402 or 502 in FIGS. 4, 5 respectively, or other hardware platform, or rendering to a full-scale video view to file. An example of such a video compositor and renderer is Apple Quicktime$^{propr}$.

A typical operation of the arrangement in FIG. 15, from the user's perspective is as follows. The user selects the video clip 104 from the browser GUI 100, for viewing in the viewer 706. The user selects the sprites button 1506, thereby activating the drop-down sprites menu area 1508, and the user selects a desired sprite 1504 for application to a feature within the video. The user plays, steps or scrubs through the video clip in the viewer 706 by using the controls 1524 to (i) find an appropriate feature to track, (ii) find a suitable start frame from which to track the feature, and (iii) first apply the selected animation. During this process the cross-hair cursor 1518 and an associated graphical reminder/preview 1516 of the selected animation 1504 are available to the user for pointing within the video frame in the viewer 706 at the selected feature 1520. In the example of FIG. 15, the user selects the feature 1520, namely the head of a human FIG. 1522 for feature tracking. The user confirms the selection by left-clicking the mouse when the cross-hair cursor 1518 is over the desired feature. The arrangement immediately commences to track the selected feature through all subsequent video frames until "track is lost" through one of four conditions, namely (i) the feature can no longer be identified as being the same feature within an expected range of spatial motion within a frame, (ii) the feature is obscured, (iii) the feature exits the frame boundary, and (iv) the video clip ends. In the example of FIG. 15, the human FIG. 1522 moves left and behind a human FIG. 1514 as the video clip plays.

Figure 16:
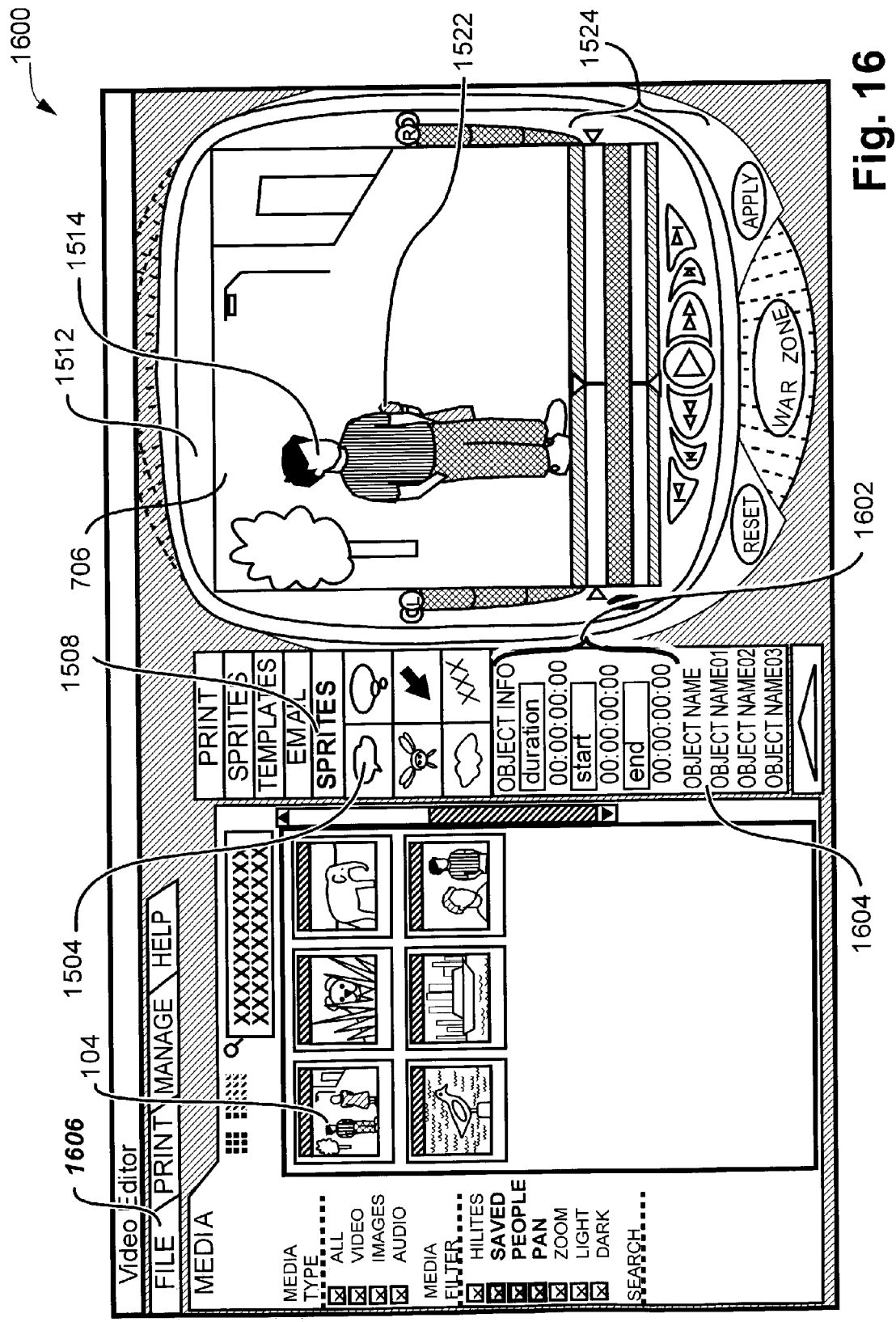
FIG. 16 shows the GUI of FIG. 15 after termination of the Sprite Animation due to Detected Obscuring of the User-Selected Feature.

FIG. 16 shows a view 1600 of this obscuring, in which the human FIG. 1522 of FIG. 15 is almost totally obscured, including the feature 1520 (which is not visible in FIG. 16), behind a human FIG. 1514.

Figure 17:
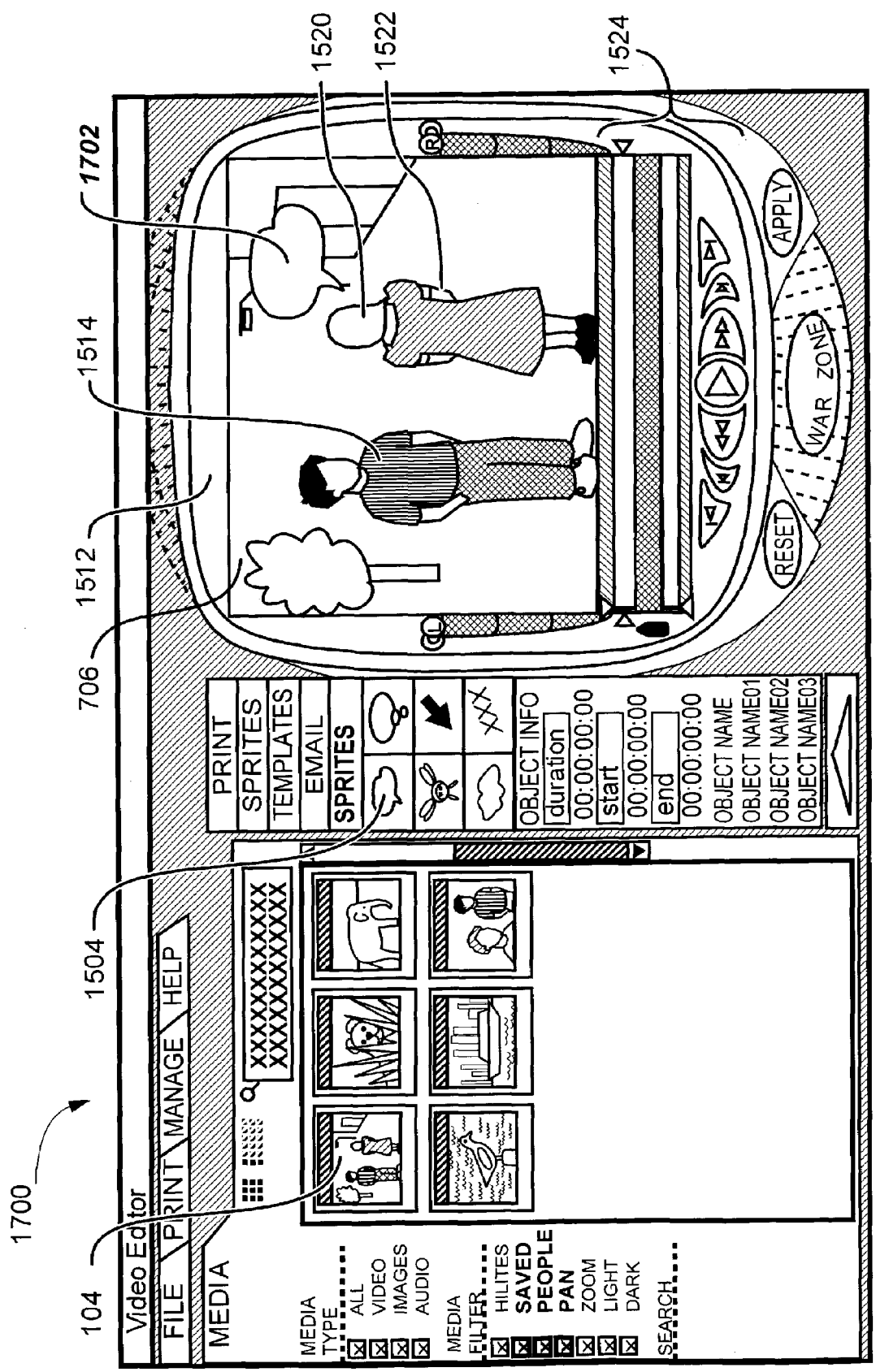
FIG. 17 shows the GUI of FIG. 15 with a Composited Preview of the Applied Sprite Animation to the Tracked Feature previously selected by the user.

FIG. 17 shows a view 1700 depicting how upon termination ("loss", in this case) of tracking, the arrangement immediately applies the feature trajectory coordinates which have been determined, in order to control the parameters of the selected sprite animation, and instructs the compositing and rendering engine to prepare a preview result which is displayed in the viewer 706. It can be seen that an instantiation 1702 of the selected animation (ie. the speech bubble 1504) has been composited and rendered into the video clip and appears as a foreground animation that tracks the selected feature 1520. This particular animation includes a text component which is animated to display one second after the speech bubble 1702 is animated to appear near the tracked feature 1520. The user may select or edit alternate text to be applied to the animation by right-clicking over the relevant sprite selection box 1504. The user may preview the feature-tracked sprite animation in the viewer 706 via the controls 1524. It can be seen in FIG. 16 that the animation terminates once tracking of the selected feature is lost, in this case by obscurance.

The user may save this result via the save command in the File menu 1606 (see FIG. 16), and/or may continue to add further sprite animations to further selected tracked features. The user may also elect to name a tracked feature by editing the name field 1604 (see FIG. 16) appearing in the sprites menu 1508. Further, the user may modify the sprite animations parameters via fields 1602 in the sprites menu 1508 (see FIG. 16).

The feature tracking function is capable of tracking a feature backward in time from a selected frame thereby tracking the "history" of the feature. This allows for the insertion of sprite animations that terminate, rather than originate, at the selected frame. An example of this is an animated target that tracks the selected feature in the frames leading up to the selected frame until it "fires" on the chosen feature at the selected frame. In general, tracking may be carried out in both directions in time from a selected frame. This capability allows the feature tracking function to determine the period in which a selected feature is visible in a video clip and thus provides a bounding range for that feature. This bounding range, along with the originally selected frame, can be saved as metadata relating to the video clip and can be applied to various subsequent operations. Such operations include identification of interesting features by name and bounded region for subsequent searching for portions of video clips rather than whole video clips. This allows greater discrimination in a search, since finding material within a clip, after the clip has been retrieved by a search, is expedited by use of bounding facility described. Another operation where the meta-data can be used is auto-trimming of a video clip in which all material outside the bounding range is discarded, possibly apart from an introduction-and-concluding period to allow smooth transition to, and from the bounded feature. Another operation is auto-application and bounding of animations or effects which do not require a spatial parameter, an example being audio sound effects which might be applied for the period during which a feature is visible (the bounding period). In this case feature tracking selection by the user is required to determine this bounding period, but the intermediate trajectory information for that feature is not subsequently required for application of the sound effect.

Returning to FIG. 14, the functionality of the feature tracking and trajectory creation process 1400 of the described arrangement is as follows. Typically, the user has previously selected a video clip, and that clip has already appeared in a suitable viewer window such as 706 (see FIG. 15), as depicted by a step 1402. The user then selects, in a step 1404, a sprite animation, and sets any optional parameters such as text which may be edited with the particular animation selected. The process 1400 then proceeds to a step 1406, in which a feature within a particular frame of the video clip being viewed is selected. Once such a feature is selected in the particular frame, the process 1400 is directed to a step 1408, which resolves a feature location for the selected feature to a 3-dimensional coordinate set which is designated <x,y,f>, where "x" and "y" are uniform spatial coordinates lying in a range (−1,1) and "f" is an absolute frame number within the selected video clip. The x and y coordinates are preserved in uniform units, since these are equally applicable to any constant aspect-ratio scaling of the video clip, and can thereby be applied to a reduced-size preview clip, which is typically provided to the user for selection of a feature to be tracked. Thumbnails are also typically presented to the user as a basis for selecting a particular clip for full-size rendering, when a final high-quality result is desired.

In a following step 1414, the coordinates x, y, and f, as well as a path-name or Universal Resource Locator (URL) are provided as inputs to a process which then performs a feature tracking function.

Figure 18:
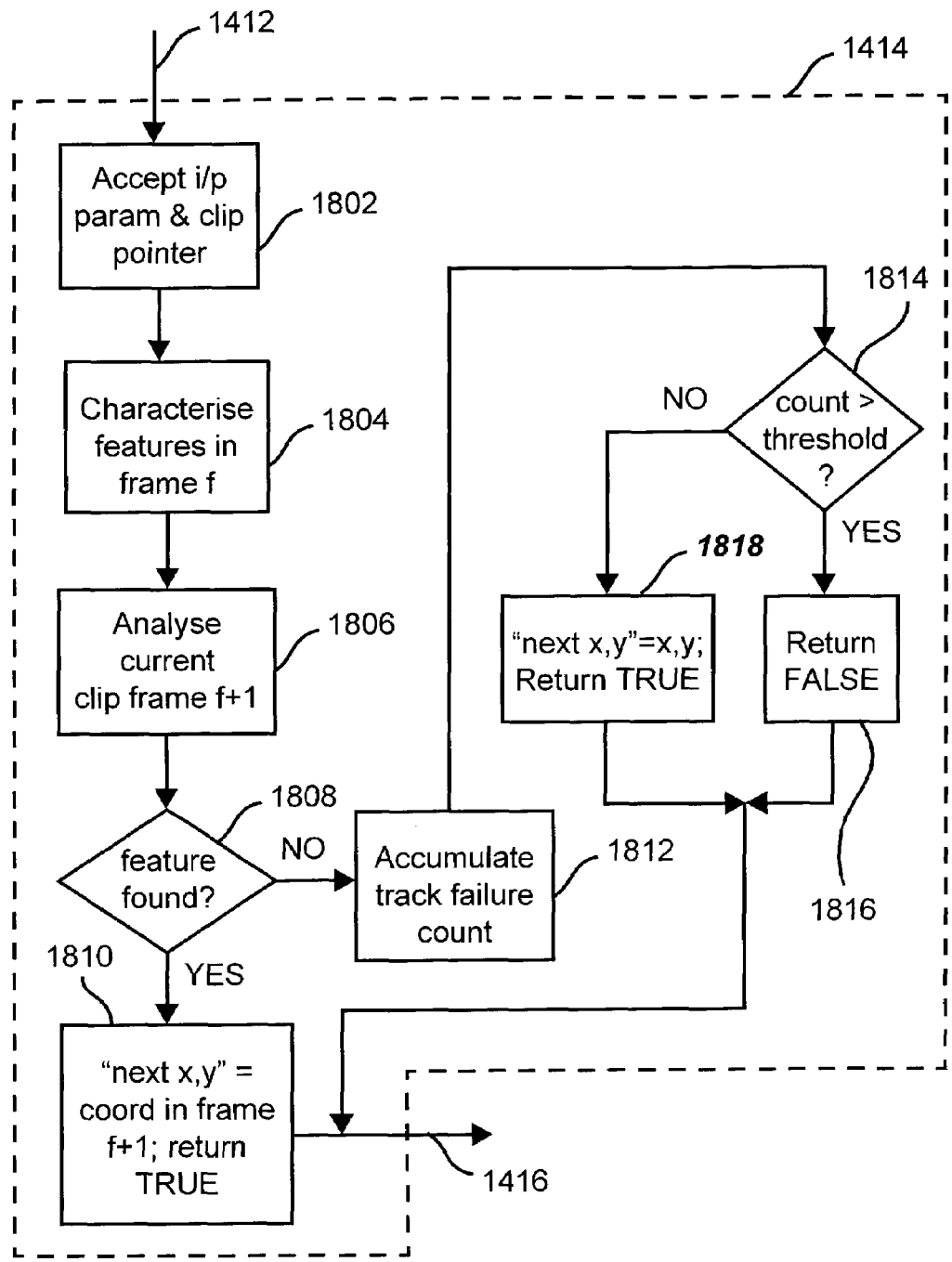
FIG. 18 shows an exemplary Feature Tracking process.

FIG. 18 depicts the feature tracking function 1414 which makes use of input coordinates x, y, and f, as well as a video clip pointer or URL, in order to determine whether a characterised feature can be located within an expected range of movement from its original position in the frame number "f". The process commences with a step 1802, in which the input coordinates x, y, and f as well as the URL are input as depicted by the arrow 1412. Thereafter, in a step 1804 the feature which is identified by the aforementioned coordinates is characterised. Thereafter, in a step 1806, the next video clip frame f+1 is analysed, in order to determine whether the characterised feature can be located within an expected range of movement from its original position in the frame f. Examples of feature characterisation can include characterisation by colour similarity combined with pixel area similarity (ie search for a specified feature as having substantially the same colour and size in the frames being compared). Alternately, characterisation by luminance can be used, wherein presence and similarity of high contrast edges can be used as the relevant parameter to be considered. Various spatial frequency components can also be considered in this approach. The aforementioned techniques can be sensitive to noise, changes in image lighting and so on, and more sophisticated techniques such as motion anticipation may also be used.

In a following testing step 1808, if the feature is found within preset limits of characterisation matching, then the process 1414 is directed in accordance with a "yes" arrow to a step 1810, in which the coordinates of the feature found in the new frame f+1 are output as "next x, y", and the process 1414 returns a "TRUE" value. The TRUE value indicates a "feature found" status, and the process 1414 thereafter proceeds, as depicted by an arrow 1416, to a process 1418 (see FIG. 14).

Returning to the step 1808 in FIG. 18, if the feature is not found in the frame f+1 being considered, then the process 1414 is directed in accordance with a "no" arrow to a step 1812, in which a count of tracking failures is accumulated. This count enables a degree of tracking stability to be maintained in the presence of noise or other defects in the video clip. Thereafter, in a step 1814, the accumulated tracking failure count is tested against a preset threshold. If the tracking failure count exceeds the threshold, then the process 1414 is directed in accordance with a "yes" arrow to a step 1816, which returns a "FALSE" value, indicating that feature tracking has failed (ie., been lost), and accordingly that the "next x, y" coordinates have no meaning in this event. Returning to the step 1814, if the accumulated tracking failure count does not exceed the threshold, then the process 1414 is directed in accordance with a "no" arrow to a step 1818, in which the unmodified x, y coordinates are returned as the "next x, y"

coordinates, and a TRUE status is returned. The process 1414 proceeds, from both the step 1818 and the step 1816, to the process step 1418 of FIG. 14 as depicted by the arrow 1416.

Returning to FIG. 14, the return value of the feature tracking function is tested in a step 1418, and if TRUE, then the process 1400 is directed to a step 1420 in which the original x, y, f coordinates are recorded in a trajectory list. This ensures that if a feature track fails immediately, then no trajectory will be recorded at all for the feature, since the step 1420 will not be executed in that instance. If the feature tracking function is TRUE, then the process 1400 is directed from 1420 to the step 1422, in which the coordinates x, y are updated with "next x, y" as returned by the feature tracking function described in relation to FIG. 18, and the frame index f is incremented. A following step 1424 tests for an "end of clip" condition. If the end of the clip is not detected, then the process 1400 is directed in accordance with a "false" arrow back to the step 1414. The process loop comprising the steps 1414 to 1424 (referred to as the "forward tracking loop") continues until track is lost, or until the end of clip is encountered. This loop creates a trajectory list for the user-selected feature.

If tracking is lost, or an "end of clip" condition is encountered, then the process 1400 is directed from the step 1424 to a step 1426, which is a second ("backward") tracking loop whereby the selected feature is tracked backwards in time from the selected frame. This step is not described in detail, since it is substantially identical with the "forward" tracking loop previously described. The second tracking loop is identical to the first, except that the frame index f is decremented instead of being incremented. The result of the backward tracking loop in the step 1426 is the "history" portion of the trajectory list, whereas the result of the forward tracking loop is the "future" portion of the trajectory list.

Once the backward tracking loop 1426 is completed, the process 1400 is directed to a step 1428 which saves the entire trajectory list, both history and future, to a disk 1430. In a following step 1432, a new track item is created in the Metadatabase 1434, and a link is established between the trajectory list saved to the disk 1430 and the video clip from which the trajectory list has been created. The process 1400 thereafter terminates at a step 1436.

Figure 19:
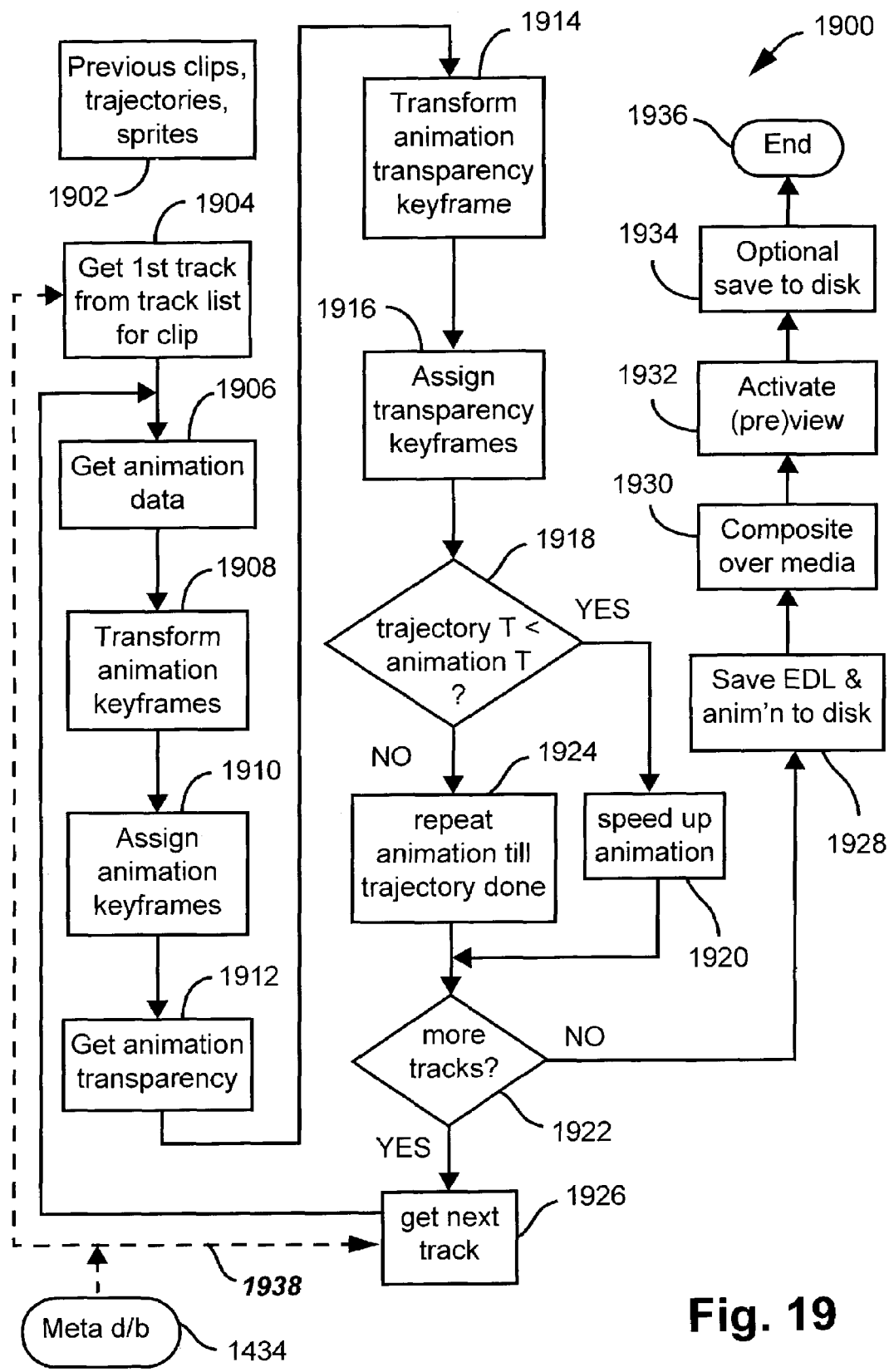
FIG. 19 shows a process for Application of a Track Item and associated Feature Trajectory to a Sprite Animation and Compositing thereof over Media.

FIG. 19 shows a process 1900 for sprite animation, whose initial step 1904 typically proceeds immediately on from the termination step 1436 in FIG. 14. However, the process 1900 can execute without requiring immediate prior execution of the process 1400 in FIG. 14. Thus, for example, if data is available on the disk 1430, or in the Metadatabase 1434 (of FIG. 14), or both, in such a form as will satisfy the requirements of the process 1900, then the process 1900 can execute on the basis of this data which is depicted by the step 1902. This data typically comprises a Pathname or URL for a video clip, a trajectory list referenced from a track item, and a selected sprite animation.

Bearing in mind the alternative sources of input data, the process 1900 commences at a step 1904 in which a first track item is fetched from a track list in a Metadatabase area, which is referenced by the video clip entry in the Metadatabase. A next step 1906 fetches the required animation data, including animation key frames, in accordance with the associated sprite animation selection which was performed by the user in creating the data. A following step 1908 transforms the animation data according to the x, y, f coordinates in the trajectory list which is pointed to by the current track item. This transformation is typically a spatial translation of the sprite animation by coordinates x, y per frame f, and possibly including additional transformations such as reflections, rotations or translations. The additional transformations are typically incorporated under certain conditions, such as when an animation approaches a frame boundary to within a threshold distance, or when the animation enters or leaves particular frame regions or quadrants. The aforementioned additional transformations allow for adaptation of a sprite animation to spatial positioning of the tracked feature. Thus, for example, an animated arrow might be altered so that its orientation will always be away from a spatial frame boundary. Accordingly, if it is detected that the tracked feature is approaching a particular frame boundary, then the animated arrow orientation will be altered so that it always points away from the frame boundary. It is observed that some animations can use the "history" portion of the trajectory list, while other animations can use the "future" portion, and some animations can use both portions. Thus, for example, an animated cartoon bomb can use (i) the history portion of the trajectory list to show the bomb with a fuse burning, and (ii) the future part of the list to show the bomb exploding.

After the transformation step 1908, the process 1900 is directed to a step 1910 which assigns the transformed animation, including transformed animation keyframes, to a newly defined or declared animation layer (see 2514 in FIG. 25) within the compositing system of the compositor/renderer 310 (see FIG. 3). It is noted that typical compositor/renderers such as AppleQuicktime$^{propr}$ would typically use transformed animation keyframes to interpolate any remaining unspecified frames.

Thereafter, a step 1912 fetches the animation transparency data for the user-selected sprite animation, after which a step 1914 transforms the animation transparency keyframes by the x, y, f coordinates in a similar (in fact typically identical) manner to the transformation(s) performed in the step 1908. A following step 1916 assigns the transformed animation keyframes to a newly defined or declared animation transparency layer (see 2516 in FIG. 25), where the newly defined layer relates to the previously declared or defined animation layer (see 2514 in FIG. 25) within the compositor/renderer 310 (see FIG. 3).

Returning to FIG. 19, the process 1900 is then directed to a testing step 1918 which compares the trajectory duration for the current track item with the animation duration. If the trajectory duration is less than the animation duration, then the process 1900 is directed in accordance with a "yes" arrow to a step 1920 which speeds up the animation so that its duration matches that of the trajectory duration. This allows completion of the full animation within the tracking period of the selected features. Alternatively, if the step 1918 determines that the trajectory duration is greater than, or equal to the animation duration, then the process 1900 is directed in accordance with a "no" arrow to a step 1924, in which the animation is repeated until the trajectory duration is completed. The steps 1920 and 1924 modify the parameters of the declared or defined animation layer and animation transparency layer within the compositor/renderer 310 (see FIG. 3).

The process 1900 is then directed to a testing step 1922 which tests the track list for any remaining track items. If additional track items are found, then the process 1900 is directed in accordance with a "yes" arrow to a step 1926 which fetches the next track item from the Metadatabase 1434, as depicted by a dashed arrow 1938, and execution of the process 1900 loops back to the step 1906 which adds, transforms and assigns further animation(s) to the current video clip. Alternately, if the step 1922 determines that no further track items exist for the current video clip, then the process 1900 is directed in accordance with a "no" arrow to a step 1928 which saves the EDL describing the current clip and the various transformed animation and animation transparency layers, sprites and other determined or calculated parameters to disk. Thereafter, in a step 1930, the compositor/renderer 310 (see FIG. 3) is instructed to composite the animation(s) over the current clip, after which a step 1932 previews the result in a viewer, typically at a reduced scale, or alternately, performs a full-scale composite and render job of the result. A following step 1934 optionally saves any, or all the composited/rendered results to a disk, after which the process 1900 terminates at a step 1936.

In the described arrangement, upon reaching the step 1936 in FIG. 19, execution normally resumes again at step 1404 in FIG. 14 to provide the user with an interactive and optionally cumulative feature-tracking and animation functionality. The entire, combined process of 1400 in FIG. 14 and 1900 in FIG. 19 will typically take a few seconds to execute, being a sufficiently short time to allow a reasonable level of user interactivity. Additionally, upon completion of the step 1936 of FIG. 19, the user is free to preview or view the resulting animation production via the viewer 706 and its controls 1524 in FIG. 15 before optionally proceeding to select another sprite animation from the sprite menu 1508, or selecting another feature from within a frame of the current video clip.

The user may optionally delete any applied sprite animation from the video clip animation production by means such as selecting the relevant sprite name 1604 in the sprite menu 1508 of FIG. 16, and hitting the delete key (not shown) on the DDC 204 or the computer 208 (see FIG. 2), or performing an equivalent delete action via other menu means.

Figure 20:
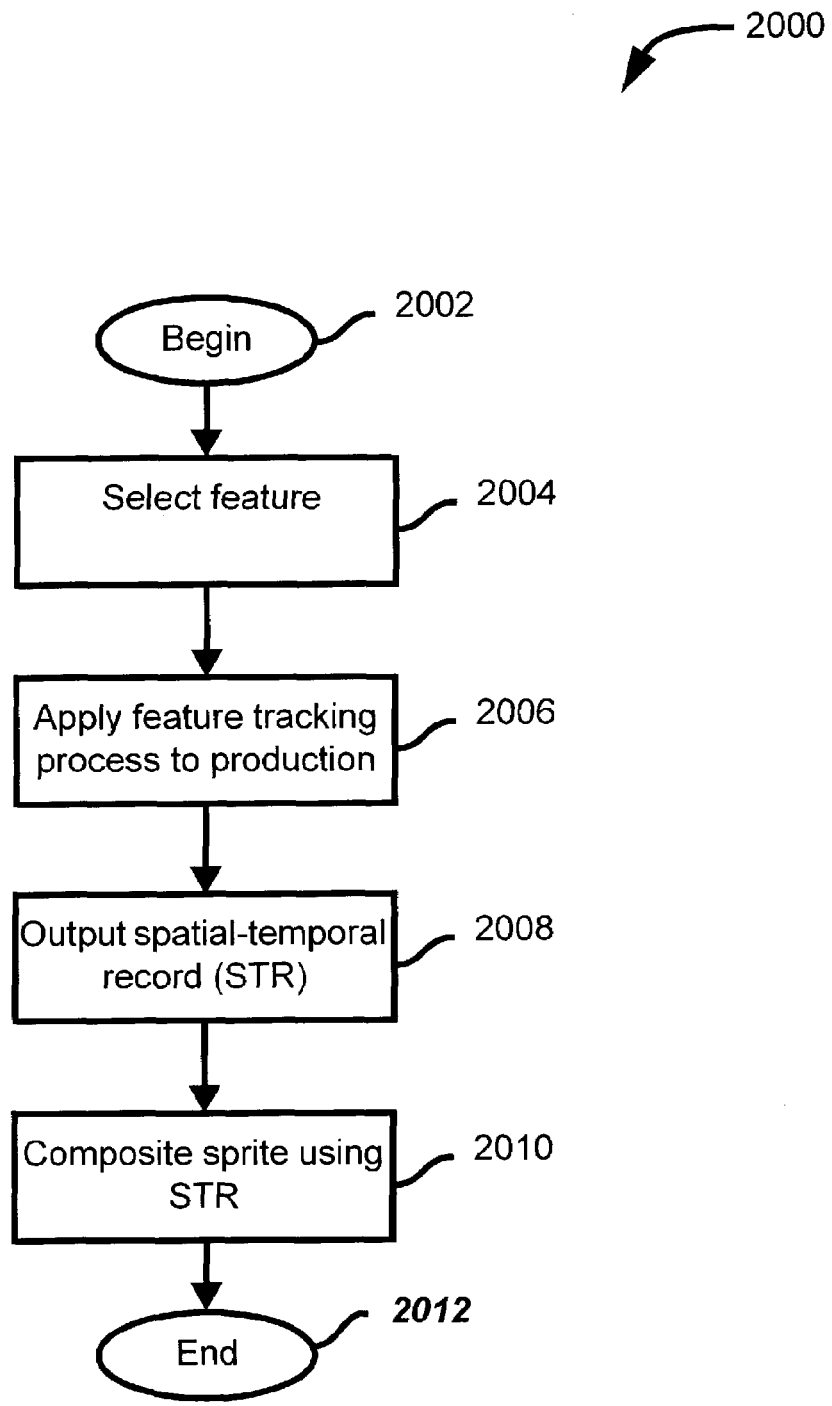
FIG. 20 depicts a process for selecting a feature in a video production, and compositing a sprite onto frames in the production in which the feature is present.

FIG. 20 depicts a process 2000 for selecting a feature in a video production, and compositing a sprite onto frames in the production in which the feature is present. The process 20-00 commences with a begin step 2002, after which a step 2004 selects a desired feature to which a sprite is to be animated. A subsequent step 2006 applies a feature tracking process to the production. Thereafter, a step outputs a spatial-temporal record of the feature with respect to production frames in which the feature is detected. A subsequent step 2010 composites the selected sprite to those frames in which the desired feature has been detected, using the spatial-temporal record. The process 2000 ends with a step 2012.

5. Data Flow and Structure 5.1 Capture and Storage

Figure 21:
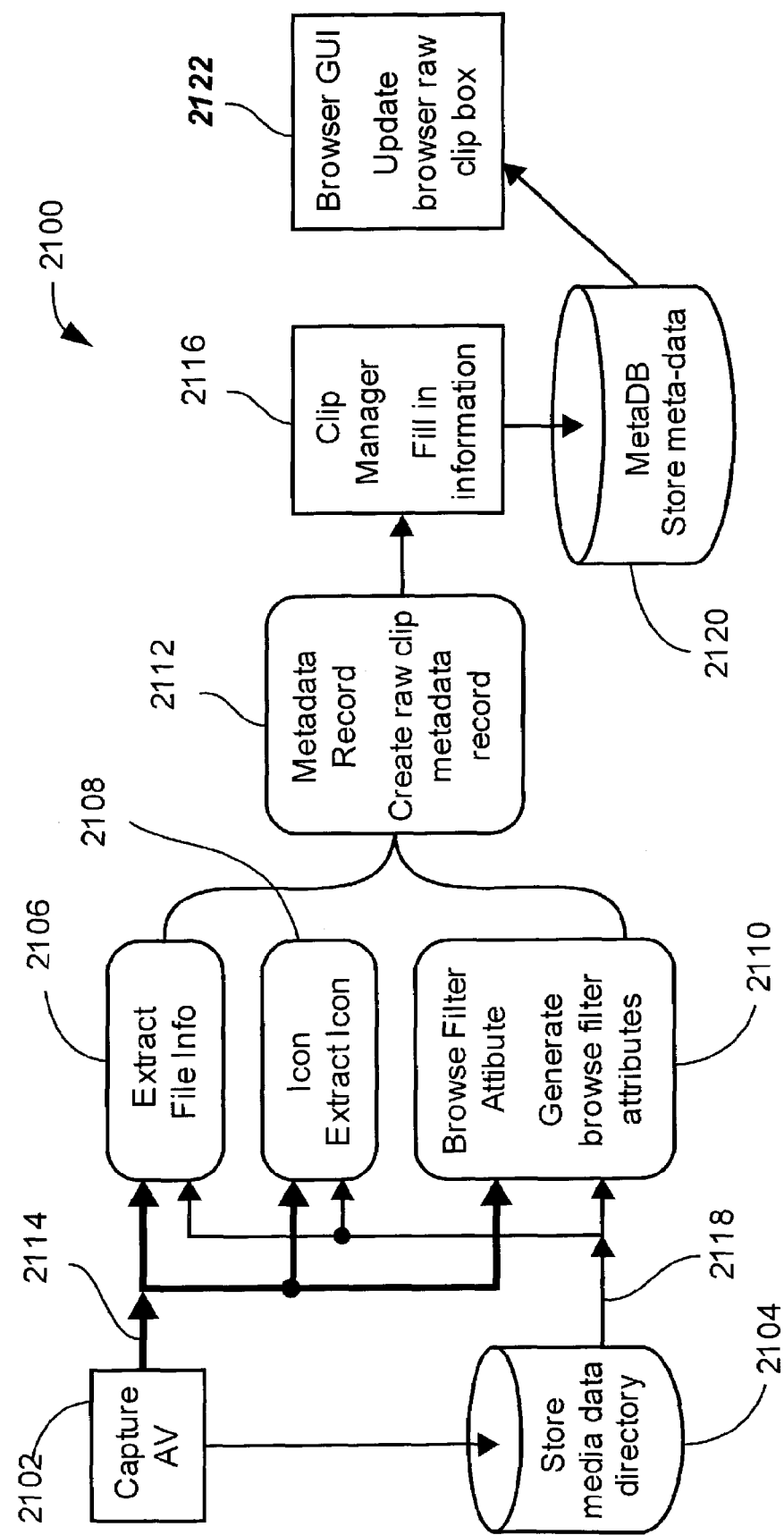
FIG. 21 is a process flow-chart for capture and/or import, and storing of media data.

FIG. 21 shows a process 2100 depicted as a flow chart of method steps, for capturing and/or importing, and storing media data. Media data is captured in a process 2102, and is stored 2104 in a raw-clip directory as ".avi", ".wav", ".mpg" files or files in other formats. File information such as media type, duration and so on is extracted, in a process 2106, from the captured and stored file via 2118 or from live capture 2102 via 2114. Alternatively media data is transferred to the store media data 2104 from the Personal Computer (PC) 208 (see FIG. 2) another device or any other source by some means of data transfer such as by removable disk 418 (see FIG. 4) or memory card or communication link 406 such as an ethernet connection (see FIG. 4). A thumbnail picture or icon is also extracted, in a process 2108. Meta-data for the file is created in a process 2110 using known methods to extract information about the media data. Additionally meta-data may come directly from the camera device 204 (see FIG. 2) in the step 2106, for example camera settings and information about zoom or focus. In some systems the meta-data from the steps 2106, 2108, 2110 may be created offline by this system or by a third party. In any case, a raw clip meta-data record is created in a process 2112, and the information is stored in the raw clip meta-data record and this record is added by a clip manager process 2116 to a meta-data database in a process 2120. Thereafter, the related Browser GUI 100 (see FIG. 7B) is updated in a process 2122.

5.2 Meta Analysis and Data Structure

The meta-data analysis process 2110 (see FIG. 21) is made by using image processing algorithms in relation to the media data. This analysis extracts information about features of the media such as bright, dark, pan, zoom and tilt. This information includes details about the nature of the feature and the temporal and spatial extent of the feature. For example information about the panning in the media data includes the time the pan starts, the time the pan ends, the direction of the pan, and the speed of the pan.

A method is well-known in the art of extracting approximate pan and zoom information of this kind from MPEG-2 motion vectors, which are a portion of the encoded media data. The analysis of the media data also extracts information about the size, location, motion and colour of human like objects in each frame of the meta-data. Information about the location of objects is recorded for every frame of the media data. Summary information about the objects is recorded for segments of the media data where the object is in approximately the same position. Summary information includes an identification number for the object and the temporal and spatial extents and locations of the object. The resultant meta-data is stored in a format described by FIG. 22.

Figure 22:
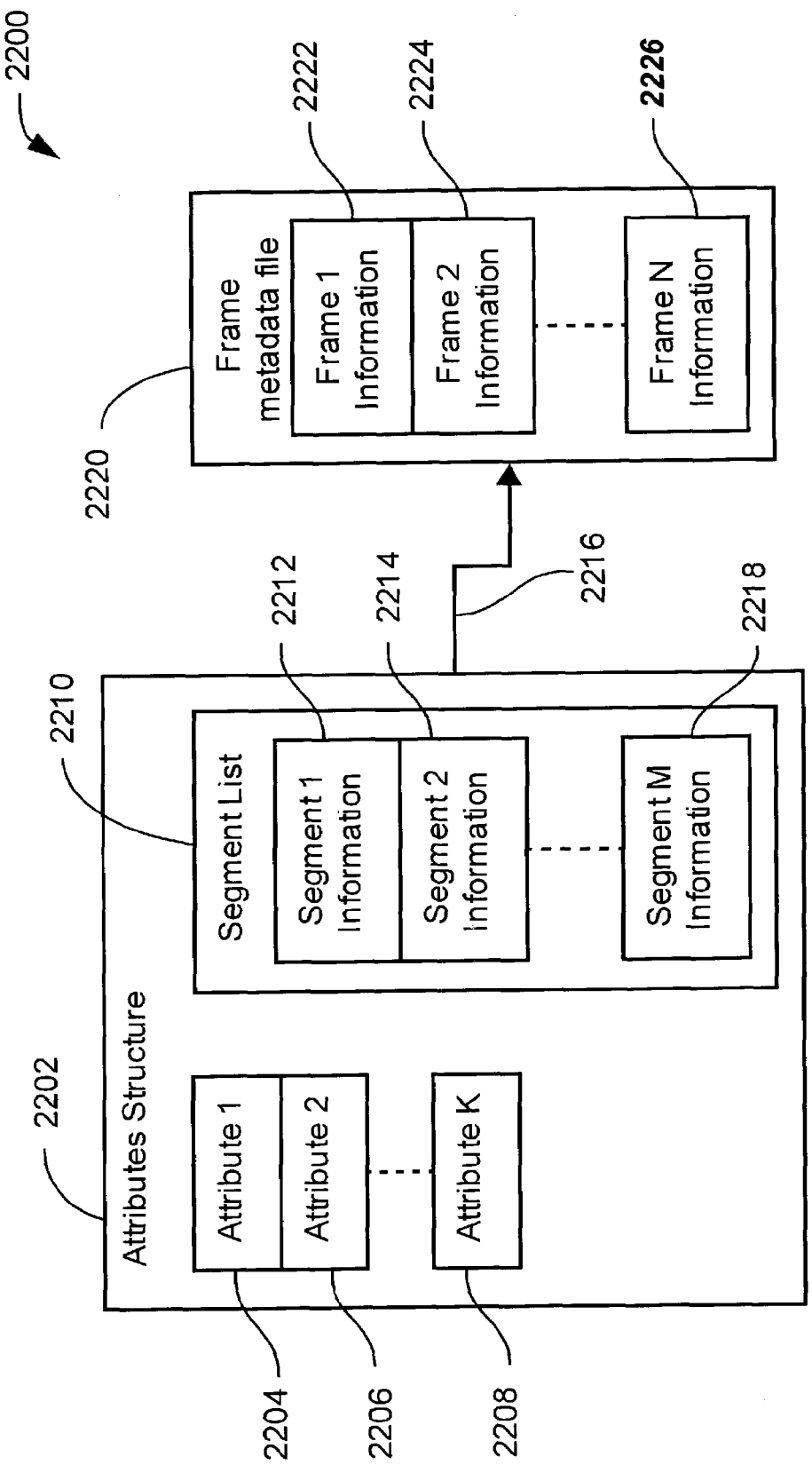
FIG. 22 depicts an attributes structure incorporating a meta-data summary.

In FIG. 22 a summary of the meta-data information is stored in the attributes structure 2202. This structure contains flags 2204, 2206, ... 2208 to indicate existence or not of each particular meta-data attribute in the media data file. In addition to the summary information, a segment list 2210 is maintained. The segment list is a structure containing any number of segment structures 2212, 2214, ... 2218. Each segment structure describes a piece of the media data in terms of a start time and an end time and an attribute that is active for that duration.

The segment structure also contains other information that is relevant to the attribute. For example, with a pan attribute, the direction and speed of the pan would also be contained. Another example is for an object attribute, in which case the identity (ID), size, general location and colour of the object is stored. The attributes structure also points 2216 to a frame meta-data file 2220 that contains detailed attribute information about each frame 2222, 2224, ... 2226 of the media data. This information includes a description of the position of objects found by the analysis, their location and size.

5.3 Use of Highlight

The GUI system 300 (see FIG. 3) can use inputs from the user to guide automatic movie generation, for example the input and use of highlight data. An example of a method of generating and using highlight data is described in the flow diagram in FIG. 23.

Figure 23:
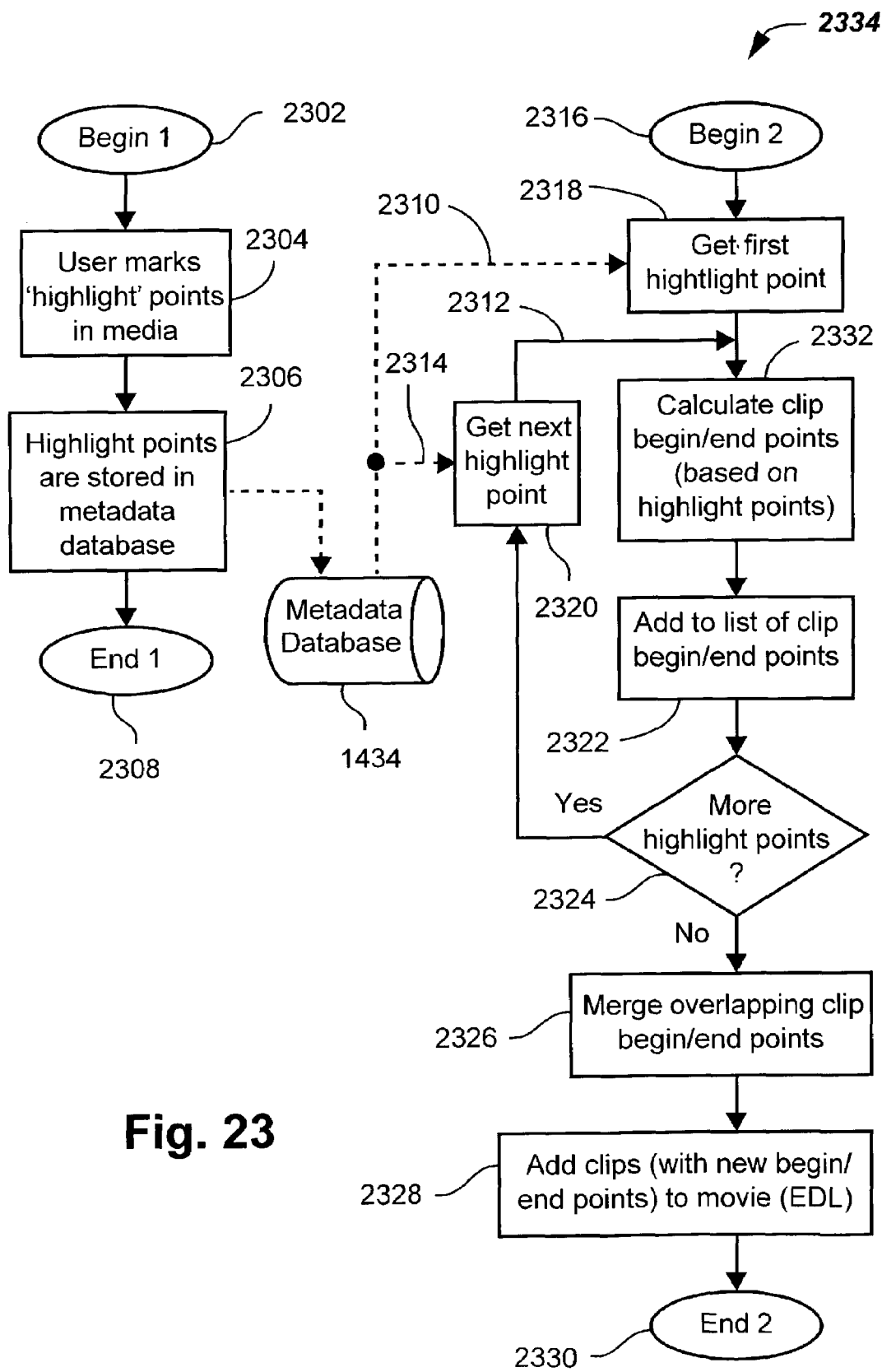
FIG. 23 is a process flow-chart showing highlight data being added to video media data.

In FIG. 23, a two-thread process 2334 is depicted, one thread comprising the steps 2302-2308, and a second thread comprising the remaining steps. Considering the first thread, in a step 2302 the user has decided or been prompted to add highlight data for one or more pieces of video media. Using a convenient GUI such as 704 (see FIG. 7A) in a step 2304, the user marks points in time in the video that are highlights. The location of these marks is stored in the meta-data database 1434 in a following step 2306, after which the first thread terminates in a step 2308.

Considering the second thread, at a later time, an automated movie system is operated starting at a step 2316. For a specific piece of video, the system in a step 2318, retrieves a first highlight point from the meta-data database 1434, as depicted by a dashed arrow 2310. The system then determines, in a step 2332, "in" and "out" points (eg. 756, 710 in FIG. 7A) in order to cut out a segment of video surrounding the first highlight. These in and out points are then stored in a list in a step 2322. Thereafter, in a test step 2324, the process 2334 tests for presence of further highlights. If further highlights are present, then the process 2334 is directed in accordance with a "yes" arrow to a step 2320 which retrieves, in accordance with a dashed arrow 2314, a next highlight from the database 1434. The process then is directed in accordance with an arrow 2312 to the step 2332, which determines "in" and "out" points in order to cut out a segment of video surrounding the new highlight. After processing all highlight points for a piece of video, the system merges, in a step 2326, segments that overlap according to their respective in and out points. Thereafter, in a step 2328, the merged clips, having new begin and end points, are added to the movie EDL. The process 2334 terminates with a step 2330. It is noted that the merge process may also merge segments that are close but do not overlap. The result of this step is a reduced number of video segments that can be used as part of a movie. The method of merging depends on the instructions contained within the selected template in the auto editor and includes the basic transitions and beyond.

5.4 Directory Structure

Figure 24:
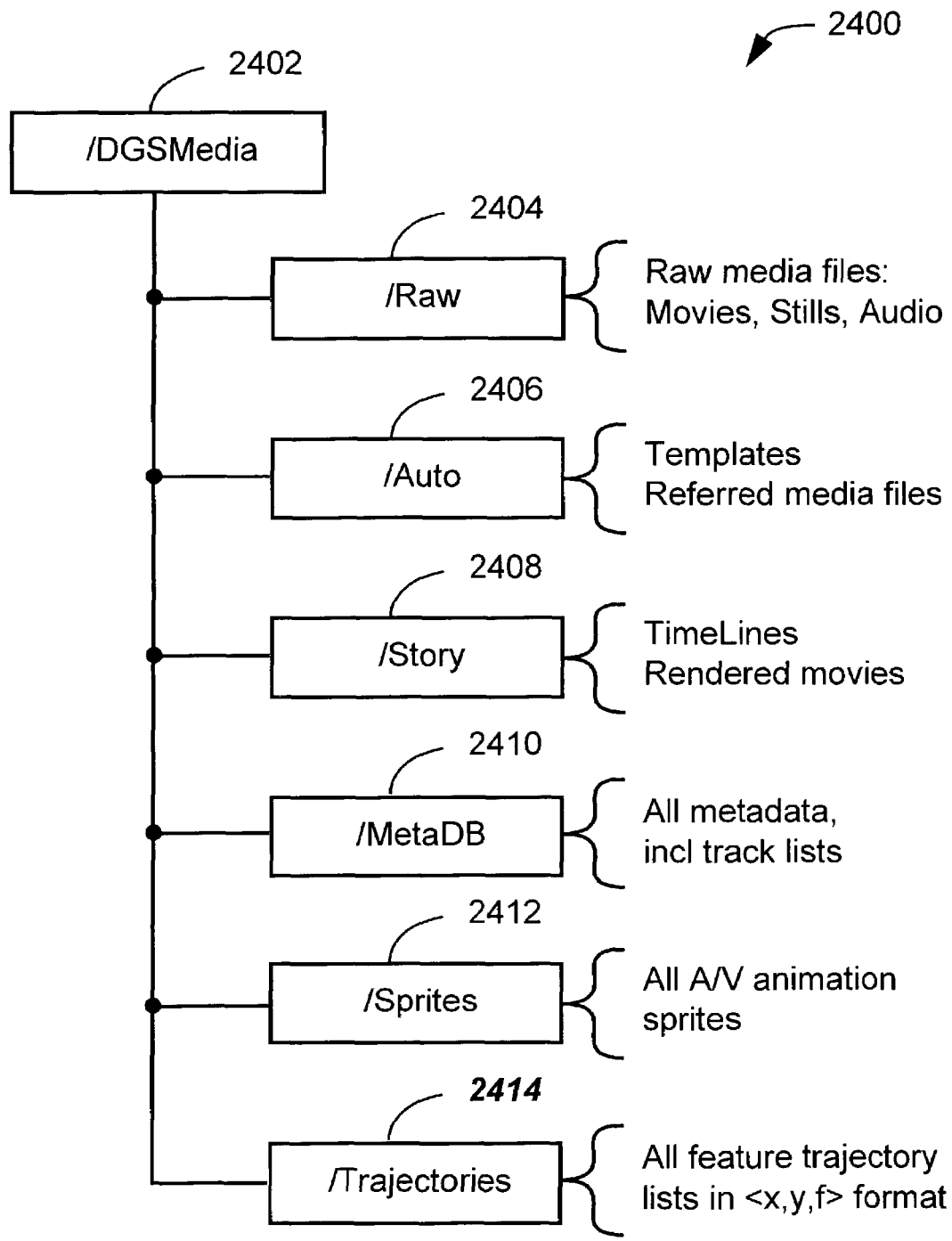
FIG. 24 shows a Magneto-optical-disk (MOD) directory structure.

FIG. 24 shows a directory structure 2400 used in the MOD 512 (see FIG. 5) in an arrangement of the DDC system 200 (see FIG. 2). A directory 2402 is created on the MOD 512 to contain all media files and their associated meta-data. The "raw" subdirectory 2404 contains the raw material clips, and all files of different types can be stored in this directory directly, with no further subdirectory being necessary. An "Auto" subdirectory 2406 contains media files referred to by auto-editing templates.

A "Story" subdirectory 2408 contains edited time-line files, and also stores rendered movie files. Meta-data describing all the aforementioned files, including track object lists and clip lists are stored in a "MetaDB" subdirectory 2410 which preferably contains a metadatabase. Animated sprites and their transparency layers and related information are stored in "sprites" sub-directory 2412 and feature trajectory list files are stored in "trajectories" sub-directory 2414. A rendered movie is related to an associated time-line file that generated it. The abovementioned description applies equivalently to a directory structure on the PC hard disk 416 (see FIG. 4).

The metaDB directory 2410 stores meta-data which is associated with corresponding clips. The meta-data is stored in 5 files, namely (a) a file relating to all raw movie clips, (b) a file relating to all raw still clips, (c) a file relating to all raw audio clips, (d) a file relating to all edited time-line-file and rendered-movie pairs, and (e) a file relating to all auto-editing templates. These aforementioned files are lists of meta-data records, each record describing one media clip.

Each of the first three meta-data files, ie types (a)-(c), typically contain (i) an identifier which "uniquely" identifies the clip and the record (where unique is taken to mean unique in the context of the system being considered) (ii) a filename, without a path, for the clips file, (iii) a file creation time, (iv) a flag denoting a type of the clip, (v) a duration of the clip in seconds, (vi) a duration of the clip in frames, (vii) a user-friendly name (used by the GUI system only), and (viii) a thumbnail picture (used by the GUI system 300 (see FIG. 3) only).

The first of the first three meta-data files, ie types (a), additionally contains meta-data structures as described in the section 5.2 above.

Meta-data of type (d) is associated with a story clip, which comprises a paired "time-line-file" and "rendered-movie-file". This meta-data typically includes (i) an identifier to uniquely identify the clip and the record, (ii) a filename (without path) of the time-line-file, (iii) a time-line file creation time, (iv) the corresponding rendered-movie, (v) a filename (without path) of the rendered-movie-file, (vi) a rendered-movie-file creation time, (vii) a duration of the clip in seconds, (viii) a duration of the clip in frames, (ix) a user-friendly name (for GUI use only), (x) a thumbnail picture (for GUI system use only), and (xi) an array of identifiers relating to raw clips used in the present time-line. It is noted that a reference count can be incorporated with the identifier. In order to reduce unnecessary complexity, the identifier reference between raw clips and story clips is uni-directional, ie from story clip to raw clip.

Meta-data of type (e) defines the meta-data for a template clip, and typically includes (i) a file name of a referred template file in the Auto directory 2406 (without path), and (ii) a bitmap file, having the same title name of the present template file, which holds the GUI icon bitmap for the present template.

All GUI system components shown in FIG. 6 use a data work space which is implemented as a common data set. The common data set incorporates all the raw and story (edited) media clips which are managed by the clip manager 602 (see FIG. 6), and relates to a single 'active' EDL or time-line object 606 and raw clip reference list associated with the current time-line 606.

5.5 EDL Structure

The professional video industry gave rise to the term Edit Decision List (EDL) that was used to describe or control editing performed by linear machines, typically tape-based video editing machines. With the advent of disk-based, random-access video editing machines, the term is often applied to an index or equivalent data set controlling random-access editing and can also be used to include effects and transitions. In the context of the various embodiments described herein, the term EDL typically encompasses any or all of the editing and effects functions that might be performed in a disk-based, video editing system or machine. Furthermore, it is understood that the simplest form of EDL, comprising only non-overlapping video editing instructions or indexes without any effects or transitions, is equivalent to a playback control stream or file table within a disk-based, random-access system. Perhaps the simplest, equivalent form of each system is a single reference, entry or instruction in the EDL, index, control stream or file table that represents a single, contiguous video clip or a contiguous part thereof, for playback. A similar description applies to audio editing and playback.

The system uses an Edit Decision List (EDL) to describe a movie. The following description is a description of an EDL, in this case called a time-line.

Figure 29:
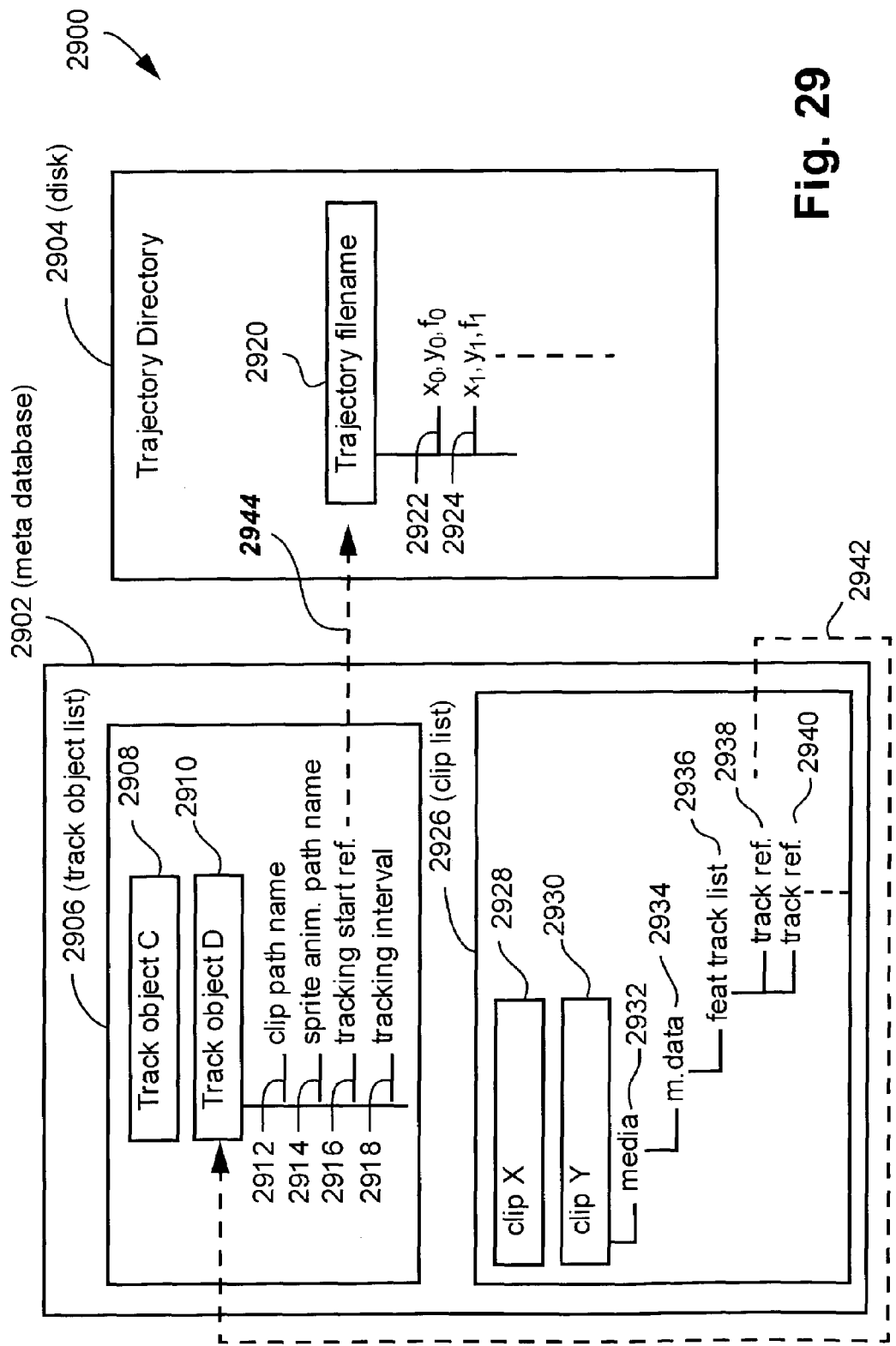
FIG. 29 shows Trajectory and Track List Data Structures.

FIG. 29 shows that a time-line 2500 can include one media track 2504, and multiple audio tracks 2506, 2508, multiple title tracks 2510, 2512, and multiple animation tracks 2514, as well as multiple animation transparency tracks 2516. The media track 2504 contains information for the video information, video filter effects, video transition effects and sync-audio. There are two types of elements in this media track 2504, namely media-objects and transition-objects. A media-object contains a reference to (i) a movie or a still clip file, and (ii) a description of a filter effect applied to the present clip. A transition-object contains a description of transition effects applied to the media-objects which precede and succeed the transition object.

The audio tracks 2506, 2508 contain one type of element, namely media-objects.

The title tracks 2510, 2512 and the animation and animation transparency tracks 2514 and 2516 contain media-objects that reference Flash Graphics$^{prop}$ media files. Title, animation and animation transparency tracks contain animated graphic and text that can be used to overlay video tracks. In this way titles and animated effects can be displayed over the video.

5.6 Media Track Structure

Figure 25:
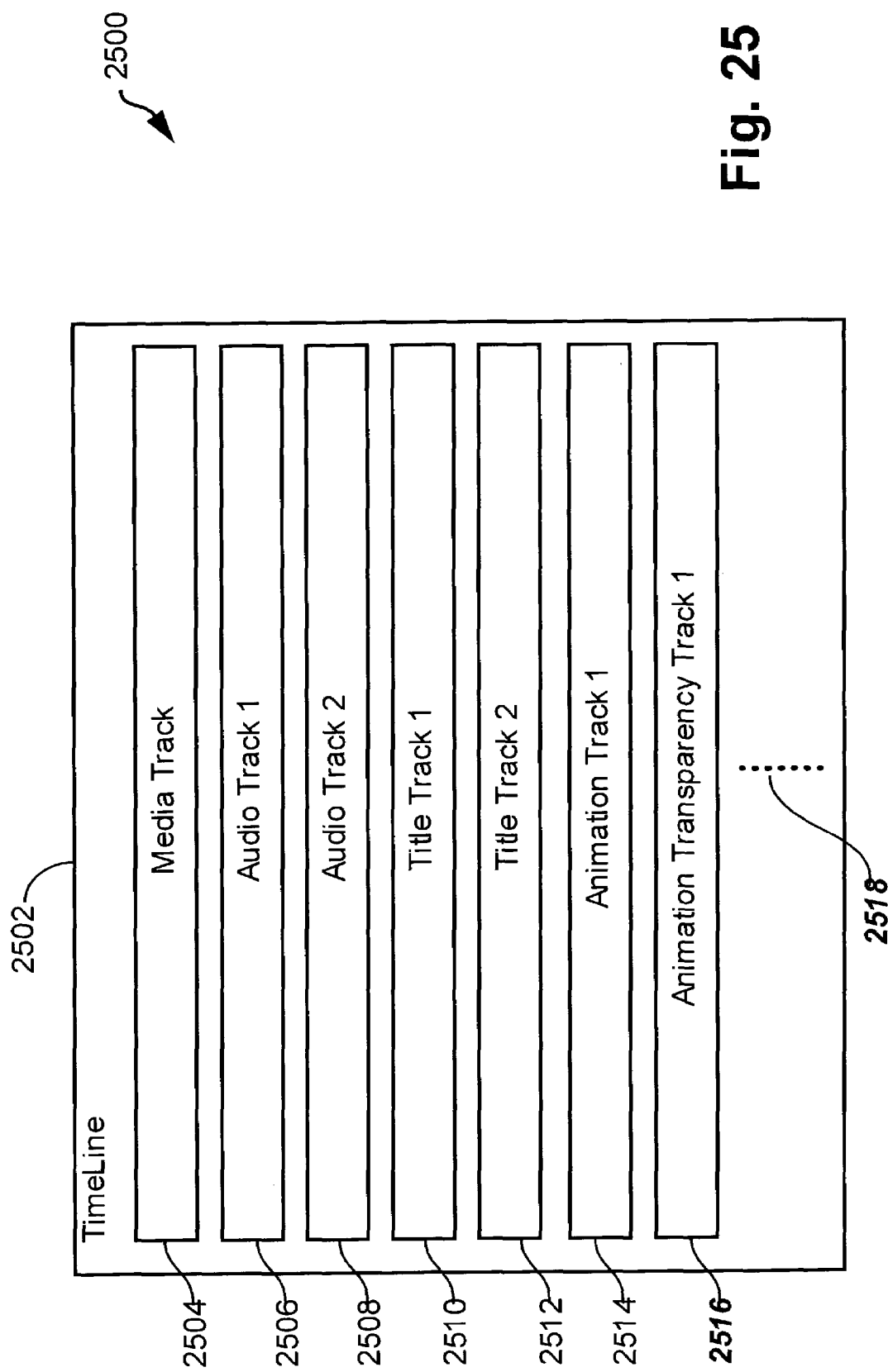
FIG. 25 shows a track composition of a time line.
Figure 26:
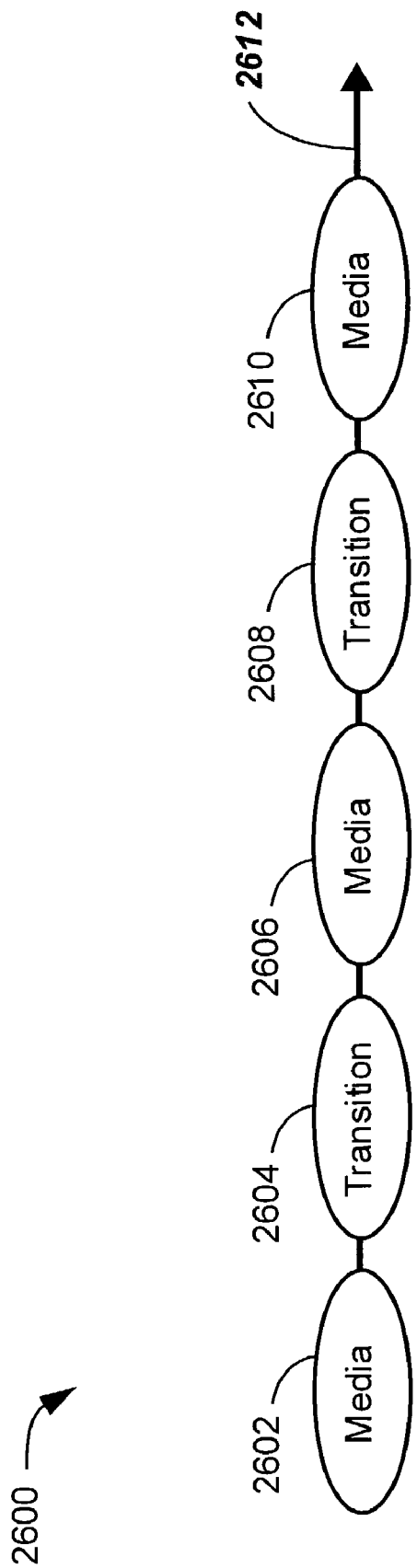
FIG. 26 shows the order of elements in an exemplary media track in the time line of FIG. 25.

FIG. 26 shows the order in which elements are contained in the media track 2504 (see FIG. 25). FIG. 26 shows that a media element 2602 is succeeded by a transition element 2604, which in turn is succeeded by a media element 2606. The media element 2606 is then succeeded by a transition element 2608, which in turn is succeeded by a media element 2610. The media track 2604 can be empty, or alternately, can contain a single media-object. If multiple media-objects are present, transition-objects are inserted between media object pairs. In other words, a transition-object can only exist with media-objects preceding and succeeding the transition object. If a "hard-cut" is required, namely a first media-object butted directly against a succeeding media-object, then a transition object having a "null" transition attribute, is nonetheless inserted to act as a placeholder.

5.7 Transition/Object Relationship

Figure 27:
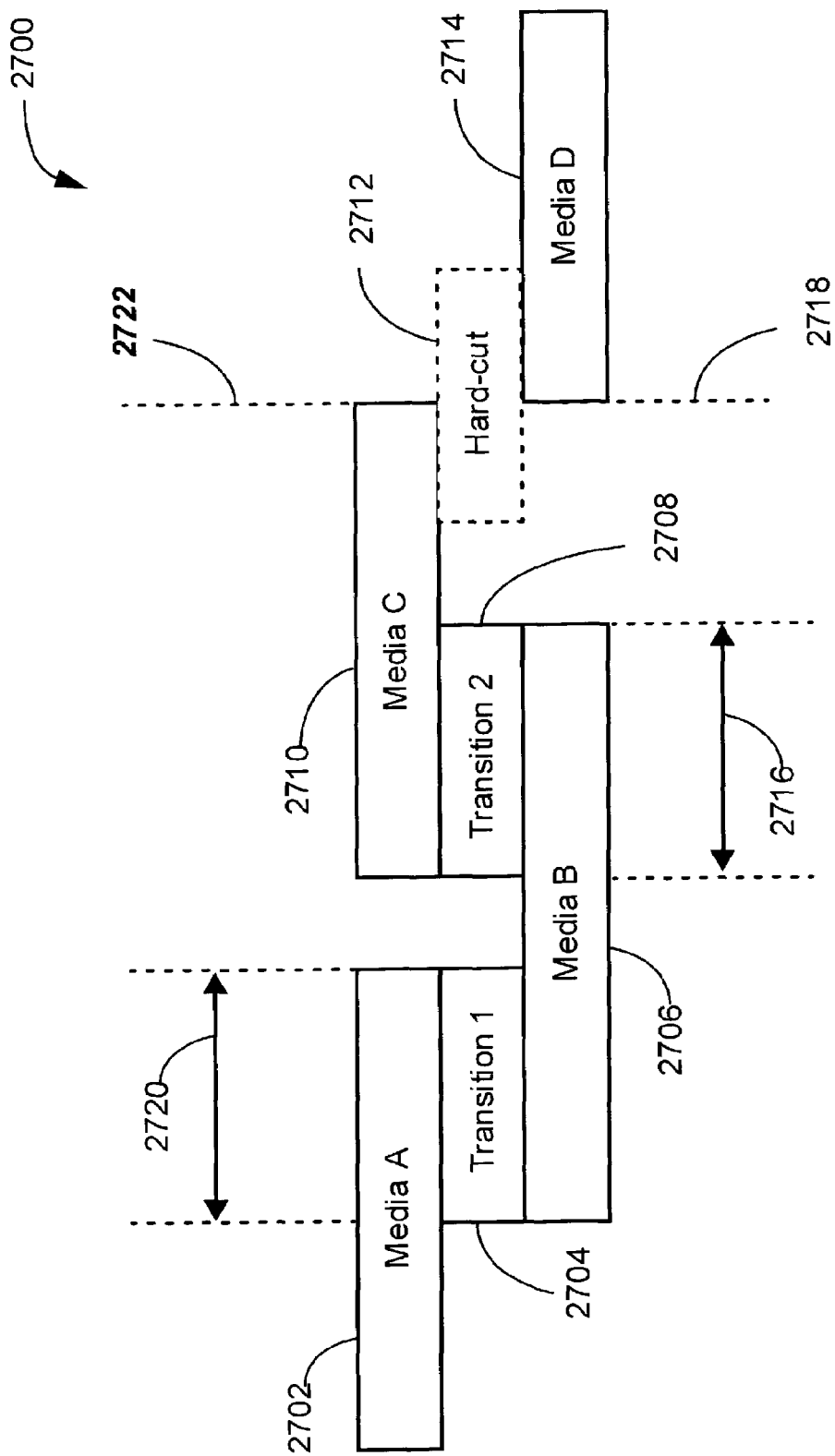
FIG. 27 shows time relationships of transition objects and associated media objects.

FIG. 27 shows the time relationship of a transition-object with neighbouring media-objects when the engine 610 (see FIG. 6) parses the time-line 606 (see FIG. 6). In the FIG. 27 a media object 2702 transitions, at a trailing segment 2720, to a media object 2706 at a leading segment thereof, which overlaps with the aforementioned trailing segment, through the medium of a transition object 2704. The media object 2706 transitions, at a trailing segment 2716, to a media object 2710 at a leading segment thereof, which overlaps with the aforementioned trailing segment, through the medium of a transition object 2708. The media object 2710 transitions, at a trailing edge 2722, which is substantially coincident with a leading edge of a segment 2714, through the medium of a transition object 2712. The transition object 2712 is a null element, and thus the transition is a "hard-cut". The transition objects 2704 and 2708 impart desired transitions on the transitioning media object pairs 2702/2706 and 2706/2710 respectively. Whichever editor is being used, either the manual editor 228 or the auto editor 240 (see FIG. 2), ensures that durations of the media and transition objects are reasonably matched.

5.8 Time Line File Structure

Figure 28:
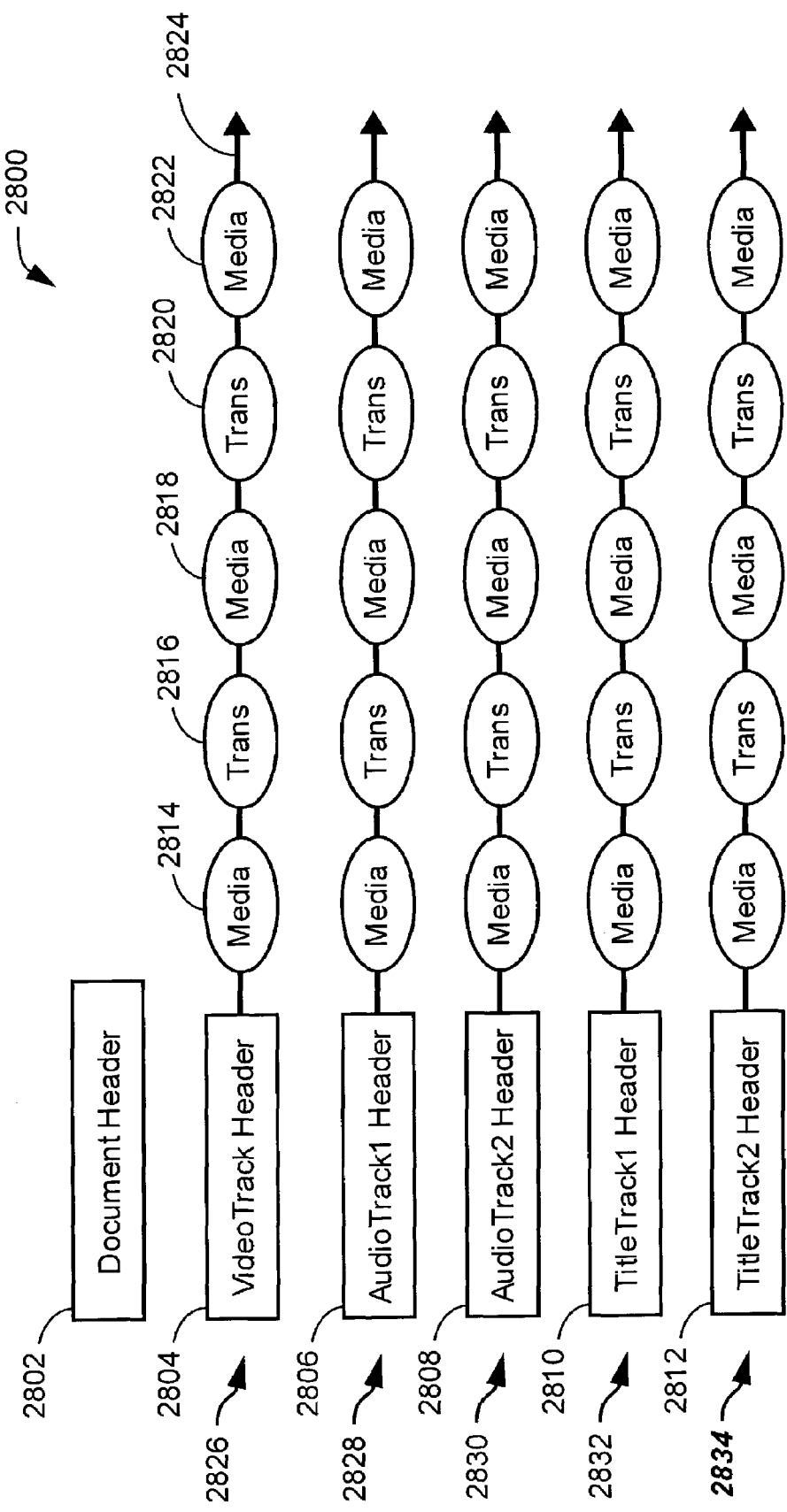
FIG. 28 depicts a file structure into which a time line can be saved.

FIG. 28 shows a structure of a file into which the time-line can be saved. The time-line file 2800 comprises a document header 2802, a video track 2826, and a number of audio & title tracks 2828-2834. The video, title and audio tracks 2826-2834 have respective headers 2804-2812. The video track 2826 comprises a sequence of alternating media and transition objects 2814-2822. The audio tracks 2828-2830 are similarly constructed. The title tracks 2832-2834 are similarly constructed.

5.9 Trajectory, Track and Clip Structures

FIG. 25 shows an exemplary Metadatabase structure 2902 and an associated exemplary disk structure 2904, these corresponding to the equivalent Metadatabase structure 1434 and disk structure 1430 in FIG. 14. The Metadatabase 2902 and disk 2904 contain information that is determined and/or used in the feature tracking and sprite animation processes.

The disk 2904 contains a trajectory list file 2920 in an associated trajectory directory, where the trajectory list file 2920 contains spatial and temporal coordinate sets <x, y, f> 2922, 2924 . . . and so on. The trajectory directory is stored on a disk in the DDC/PC system 200 of FIG. 2 (namely 512 or 416 in FIGS. 5 and 4 respectively), possibly together with other trajectory list files which are derived by performing feature tracking for the same or other video clips.

The Metadatabase 2902 stores a clip list 2926 which contains a number of video clip items 2928 and 2930. The clip item 2930 is seen to contain a hierarchical data structure. The uppermost structural element "media" 2932 contains a sub-structure "Metadata" 2934, which in turn contains a sub-structure "feature tracking" 2936. The feature tracking list 2936 comprises a list of feature tracks associated with the clip 2930, and the list 2936 includes tracks 2938 and 2940, each of which is a pointer to a track object (such as a track object D 2910 as depicted by a dashed arrow 2942), the track object 2910 being contained within a track object list 2906 which is also stored in the Metadatabase 2902.

The track object 2010 contains a hierarchical data structure. A clip Pathname (or URL) 2912 is a backward link which allows identification of the associated video clip (this being clip Y, ie., 2930 in the present example) from which the track object 2910 was derived. A sprite animation Pathname 2914 identifies a user-selected sprite animation data set or file which is to be transformed by the trajectory list 2920 of coordinates 2922, 2924, for subsequent compositing over the video clip 2930. A tracking start pointer 2916 identifies the trajectory file (2920 in the present instance as depicted by a dashed arrow 2944) where the trajectory file 2920 was derived from the feature tracking process being applied to the video clip 2930, the trajectory file 2920 being stored within the trajectory directory on the disk 2904. A tracking interval 2918 contains frame number parameters "start", "selected" and "stop" which respectively identify the start frame number, selected frame number, and end frame number of the trajectory 2920.

The "history" portion of the trajectory list can be interpreted as that portion of the trajectory lying between the start frame number and the selected frame number, and similarly the "future" portion of the trajectory list can be interpreted as that portion of the trajectory lying between the selected frame number and the end frame number. If trajectory spatial coordinates 2922, 2924, . . . are recorded in the trajectory list file 2920 for every frame of a corresponding feature track (namely the track object D 2910 in the present instance), then redundant frame number information will be contained in either the trajectory list file 2920, or the tracking interval item 2918 of the track object 2910. Accordingly, the information in the trajectory list file 2920 can be reduced to merely a spatial coordinate list <x, y> 2922, 2924, . . . , these spatial coordinates being understood to belong to consecutive contiguous frames, commencing from a start frame number stored in the tracking interval item 2918. A similar reduction in information storage requirements can be gained if the frame interval between spatial coordinate samples in the trajectory list 2920 is some other constant value.

6. Player Process

Figure 30:
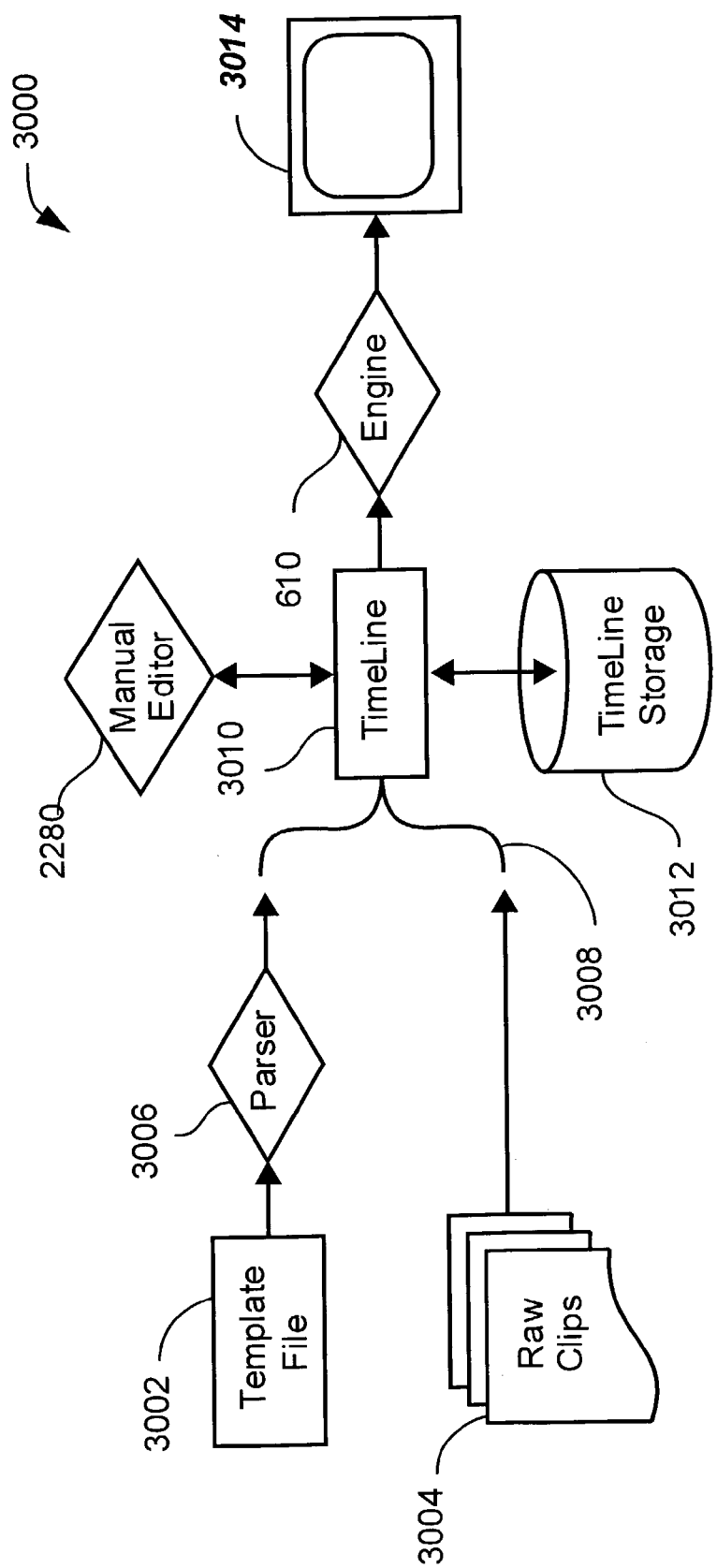
FIG. 30 shows a process flow-chart for parsing a file in accordance with a template.

FIG. 30 shows that after a template has been physically written in a file, the file is parsed by the GUI system 300 (see FIG. 3) when the template is applied. The instructions are then used to arrange user selected or template-selected clips and transitions/effects specified by the template into a timeline. All templates can, but need not, be written in the same structure. The template contains some basic elements such as global settings, clip settings, transition settings, effects settings and background audio settings. A template file 3002 is provided to a parser 3006, whose output is provided, along with raw clip data 3004, to a time-line 3010. The time-line 3010 is stored in a time-line storage 3012, and also, is available to the manual editor 228 (see FIG. 2). The time-line 3010 can be played by the engine 610 (see FIG. 6), on the displays 402, 502 (see FIGS. 4, 5 respectively).

The basic idea of automatically applying trimming and effects settings to a changeable number of clips is to apply editing techniques and cutting timing used by those skilled in the art. The most basic example is that of applying a rhythmic cutting pattern to the users raw content, keeping 8 seconds for example of video content and then discarding the next 4 seconds. A cycle can be generated over the entire selection, thereby breaking down long tedious clips into an engaging presentation. This tempo management technique reflects the general audience attention span, and is commonly used by television program producers to maintain the audiences attention.

Some television advertising genres employ a similar technique of cutting video to short quick bursts of vision. Removing portions of the users content, adding effects and adjusting the playspeed are examples of the template functions that can actually change the meaning of the content. This process is directly related to the intent contained within any template chosen by the user. The result is that of an explicit desire to modify content in some way, for better or worse, but in general to produce an engaging presentation suitable in particular for human viewing preferences. Templates alter and add to media such functions as setting the production duration, placement and selection of transitions, cutting tempo, cutting structure, playback speed, application of effects, transitions, audio, sound effects, media selection, titles, graphics and also target playback device settings such as rendering format, playback format, resolution. Placement and duration setting of effects and animations in some cases are specified by the media meta-data.

In the case of a template expecting Object detection meta-data, an animation is provided that is triggered by the event of an object being detected in the stream of media. Should an object not be detected, the animation will not occur. The object detection meta-data can be included in the media meta-data by either an algorithm or user specification. A template may expect interaction with zoom detection meta-data in order to trigger a response in the set of rules such as playing an animation to be composited with the video or a cutting structure rule maybe triggered such as the alteration of an out point signalling the clip to cut at a point overriding the clips default out point or the templates cutting rules.

7. Templates

7.1 Overview

The template text file contains a series of sections, each section contains a series of entries, and all the instructions/settings are put into the entries. Meta-data can be used to assist users to both search media and to apply auto editing to the media.

Auto edit templates use varying combinations of meta-data to control both cutting sequences and the application of graphics and audio.

7.2 EXAMPLES

The following terminology is used in defining and describing the template examples provided.

Strike through text indicates the duration of clip segment to be removed. Accordingly, indicates that a 1.00 minute of clip is to be deleted.

A number followed by another in brackets indicates the new duration after time remapping. Accordingly, 10:00 [10:00] indicates that a 10.00 minute segment has been time remapped without any change in duration.

Example 1

Games templates combine video games interfaces with users video, producing a hybrid interactive experience. The novel results are produced using a combination of user and automatically derived meta-data.

The Cyborg template (see 1100 in FIG. 11) for example has a game-like interface and is reminiscent of a Cyborg eyepiece concept. Using an object seeking target, characters in the game are sought out and identified. The characters are the actual people captured in the video content. Advanced object detection drives the interaction.

The Cyborg template uses advanced usage of meta-data to control animations and effects applied to the video. An auto edit template is provided to edit the users footage. The scene-clustering algorithm is applied to identify locations for new graphics and sound effects. Audio level detection is used and graphically indicated on the screen.

A feature of the Cyborg template is the automatic mode conversion of the game interface graphics. With the detection of meta-data such as variation in light and dark, sound levels and timecode, the interface is modified to demonstrate an analysis mode.

This complicated template produces a hybrid video experience to marvel users. The following description defines the Cyborg template.

| | |
|---|---|
| Meta data usage: | Object Detection |
| (In order of priority) | Ambient Motion |
| | Video highlights, |
| | Zoom end, |
| | Pan, |
| | Record On-Off, |
| | Audio levels |
| Order: | Maintain chronological order |
| Transitions: | 12 frame inclusive fade to 50% black between highlight frame and next clip |
| | Default: 6-frame crossfade between each new clip |

-continued

| | | |
|---|---|---|
| Titles: | 1. Start: c2_doors.swf | |
| | 2. End: game_score.swf | |
| | 3. Credits: credits.swf | |
| States: | Default | 1. gui.swf + blu_startup.swf |
| | Ambient motion | 2. gui.swf + ambient_motion.swf |
| | Mode | 3. A. mode_seeking.swf |
| | | B. mode_detected.swf |
| | | C. mode_analysis.swf |
| | Object detected 4. gui.swf + object_radar_df.swf | |
| | Position 01 object_radar_df_01.swf | |
| | Position 02 object_radar_df_02.swf | |
| | Position 03 object_radar_df_03.swf | |
| | Position 04 object_radar_df_04.swf | |
| | Position 05 object_radar_df_05.swf | |
| | Position 06 object_radar_df_06.swf | |
| | Position 07 object_radar_df_07.swf | |
| | Position 08 object_radar_df_08.swf | |
| | Position 09 object_radar_df_09.swf | |
| | Position 10 object_radar_df_10.swf | |
| | Position 11 object_radar_df_11.swf | |
| | Position 12 object_radar_df_12.swf | |
| | Position 13 object_radar_df_13.swf | |

Figure 31:
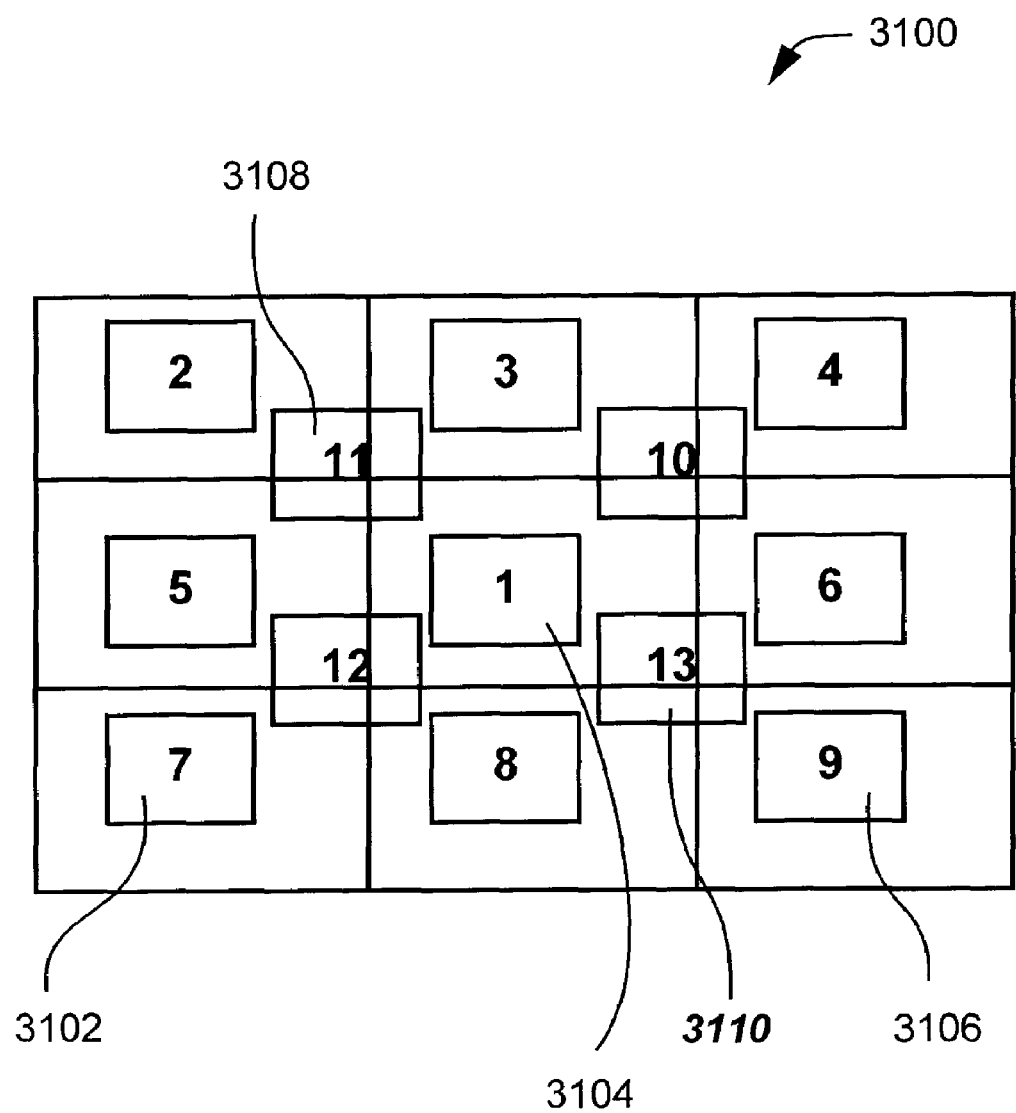
FIG. 31 depicts a meta-data scheme relating to object detection.

Turning to FIG. 31, the total screen space 3100 is divided into thirteen numbered regions, eg region "7" which is designated by the reference numeral 3102. Regions "1" (ie 3104) to "9" (ie 3106) define a 3×3 grid. Regions "11" (ie 3108) to "13" (ie 3110) consist of a 2×2 overlapping, and overriding grid. The aforementioned regions 3104 to 3110 comprise boundaries and a center point that map to an object detection meta-data scheme. A detected object expects to trigger an animation, where a location of the animation on the screen 3100 is guided by the meta-data scheme. The center point 3110 of the region 3100 acts as an anchor for the center point of the animation. The overlapping regions 3108 to 3110 are used to ensure that the animations are centrally located in their centers, ensuring a graphically balanced result, while also providing additional anchor points for further animations. Following detection of an object within one of the regions 3104 to 3110, an animation is triggered directly, or in accordance with a rule that states the timing and/or the duration of the animation in relation to the objects behaviour.

| | |
|---|---|
| Object identified | 4. gui.swf + object_analysis_1.swf |
| [Five in total] | 5. gui.swf + object_analysis_2.swf |
| | 6. gui.swf + object_analysis_3.swf |
| | 7. gui.swf + object_analysis_4.swf |
| | 8. gui.swf + object_analysis_5.swf |
| Zoom detected | 4. gui.swf + object_radar_zm.swf |
| Pan detected | 5. gui.swf + object_radar_pn.swf |
| Dark shot | 6. gui.swf + object_radar_[state?].swf + nightvision_green.qfx [to video only] |
| Base Frame Rate: | 25 frames per second |
| Audio | normal |
| Sync audio: | |
| Backing Audio: | \\vaccai\projects\vp_dc\templates \games\cyborg\ audio\Street_Garms_02_06.wav |
| Rules | "HZP" meta-data cutting rules |
| | Cut highlight clips first: |
| | Detect Video Highlight frames, establish clips 05:00 sec. [referred to as a highlight clip] with highlight frame at 2nd second of duration. |
| | Speed the highlight clip 80% or so that the 5 second clip has a new duration of 4 seconds |
| | {Contingent: Speed the highlight clip 65% or so that the 5 second clip has a new duration of 3.25 seconds} |
| | Zoom end clips |
| | Detect any zoom end frames in presented clips; from the end frame create a new clip section 5 seconds long with the zoom end frame located at the first frame of the segment. |
| | Speed the highlight clip 80% or so that the 5 second clip has a new duration of 4 seconds |
| | {Contingent: Speed the highlight clip 65% or so that the 5 second clip has a new duration of 3.25 seconds} |

-continued

<u>Pan usage</u>

Detect pan start and pan end, over the duration of the pan, extract 2-second cuts separated by 12-second intervals. Where the total duration of the pan is shorter than 14 seconds, take only the first and last 2 seconds.

Apply to each new 2-second pan clip a 12-frame crossfade.
{Contingent: Pan usage: extend the 12-second interval to 20 seconds}

<u>Overlaps</u>

If any of the highlight/zoom/pan clips overlap, apply meta-data detection, priority order of:
1. highlight frame
2. zoom end
3. pan

Example 2

Review templates produce video summaries for users to quickly observe their collections of video and media. Attractive presentation titles, audio and television advertising style editing embellish the presentations. Users can vary the duration of the presentations with the 30 second "Quick Look" and the "Two Minute Trailer".

The following description defines the Quick Look template.

| | |
|---|---|
| Meta data usage: | Video highlights, Zoom end, Pan, Record On-Off, Audio levels (In order of priority) |
| Order: | Maintain chronological order |
| Transitions: | 4 frame inclusive fade to 50% black between highlight frame and next clip |
| | Default: 4-frame crossfade between each new clip |
| Titles: | \\vaccai\d\projects\vp_dc\templates\trailers\quick_look\zero_source\ql_title.swf |
| Base Frame Rate: | 25 frames per second |
| Audio: | \\vaccai\d\projects\vp_dc\templates\trailers\quick_look\audio\PretAPorter_2_11. |
| Sync audio: | mute |
| Rules | "HZP" meta-data cutting rules |
| | <u>Cut highlight clips first:</u> |
| | Detect Video Highlight frames, establish clips 05:00 sec. [referred to as a highlight clip] with highlight frame at 2nd second of duration. |
| | Speed the highlight clip 50% or so that the 5 second clip has a new duration of 2.5 seconds |
| | *{Contingent: Speed the highlight clip 65% or so that the 5 second clip has a new duration of 3.25 seconds} |
| | <u>Zoom end clips</u> |
| | Detect any zoom end frames in presented clips; from the end frame create a new clip section 5 seconds long with the zoom end frame located at the 2$^{nd}$ second point of the segment. |
| | Speed the highlight clip 50% or so that the 5 second clip has a new duration of 2.5 seconds |
| | *{Contingent: Speed the highlight clip 65% or so that the 5 second clip has a new duration of 3.25 seconds} |
| | <u>Pan usage</u> |
| | Detect pan start and pan end, calculate the duration of the pan extract 2 second cuts separated by 12 second intervals. Where the total duration of the pan is shorter than, 14 seconds, take only the first and last 2 seconds. |
| | Apply to each new 2-second pan clip a 12-frame crossfade. |
| | Speed the montage up 50% |
| | {Contingent: Pan usage: extend the 12-second interval to 20 seconds} |
| | <u>Overlaps</u> |
| | If any of the highlight/zoom/pan clips overlap, apply meta-data detection in priority order of: |
| | 4. highlight frame |
| | 5. zoom end |
| | 6. pan |

-continued

Cutting rules

1. Calculate "ORIGINAL RAWTIME" duration (total duration of presented clips.)
2. Apply "HZP" meta-data cutting rules producing "M1CLIPSET"
3. Calculate "M1 RAWTIME" to determine total duration of "M1CLIPSET" resulting from "HZP" meta-data cutting rules
4. 30 seconds − "M1 RAWTIME" = "M2TIME"
5. "M2TIME" divided by 12 frames = "M2CUT"
6. Calculate "M2RAWTIME",
"ORIGINAL RAWTIME" − "M1 RAWTIME" = "M2RAWTIME",
7. Evenly divide "M2RAWTIME" using "M2CUT" value
8. Extract 12 frame duration clips "M2CLIPSET" from "M2RAWTIME" and place them chronologically with "M1CLIPSET"
9. 9. Result: M3CLIPSET Contingent:

10. If "M1 RAWTIME" < 2 minutes insert chronologically from the set of 12 frame clips "M2CLIPSET"
11. If "M1 RAWTIME" > 2 minutes,
Apply contingent cutting in order of priority:
Pan, Zoom, Highlight
The process will result in "M1RAWTIME_2"
12. If "M1 RAWTIME_2" > 2 minutes,
Apply contingent cutting in order of priority:
Remove alternately every second Pan and Zoom until only Highlight clips remain
The process will result in "M1RAWTIME_3"
13. If "M1 RAWTIME_3" > 2 minutes,
Apply contingent cutting in order of priority:
Remove every second highlight clip until "M1 RAWTIME_3" ranges between 01:59:12 or 02:03:12
14. If M3CLIPSET < 30 SECONDS, time-stretch the results to equal 30 seconds The following description defines the Two Minute Trailer template.

| | |
|---|---|
| Meta data usage: | Video highlights, Zoom end, Pan, Record On-Off, Audio levels (In order of priority) |
| Order: | Maintain chronological order |
| Transitions: | 12 frame inclusive fade to 50% black between highlight frame and next clip |
| | Default: 6-frame crossfade between each new clip |
| Titles: | \\vaccai\d\projects\vp_dc\templates\trailers\2minutetrailer\zero_source\title.swf |
| Base Frame Rate: | 25 frames per second |
| Audio: | \\vaccai\d\projects\vp_dc\templates\trailers\2minutetrailer\audio\Freeze_Frame_2_38.wav |
| Sync audio: | mute |
| Rules | "HZP" meta-data cutting rules |
| | Cut highlight clips first: |
| | Detect Video Highlight frames, establish clips 05:00 sec. [referred to as a highlight clip] with highlight frame at 2nd second of duration. |
| | Speed the highlight clip 80% or so that the 5 second clip has a new duration of 4 seconds |
| | {Contingent: Speed the highlight clip 65% or so that the 5 second clip has a new duration of 3.25 seconds} |
| | Zoom end clips |
| | Detect any zoom end frames in presented clips; from the end frame create a new clip section 5 seconds long with the zoom end frame located at the first frame of the segment. |
| | Speed the highlight clip 80% or so that the 5 second clip has a new duration of 4 seconds |
| | {Contingent: Speed the highlight clip 65% or so that the 5 second clip has a new duration of 3.25 seconds} |

-continued

Pan usage

Detect pan start and pan end, over the duration of the pan, extract 2-second cuts separated by 12-second intervals. Where the total duration of the pan is shorter than 14 seconds, take only the first and last 2 seconds.

Apply to each new 2-second pan clip a 12-frame crossfade.
{Contingent: Pan usage: extend the 12-second interval to 20 seconds}

Overlaps

If any of the highlight/zoom/pan clips overlap, apply meta-data detection, priority order:

7. highlight frame
    8. zoom end
    9. pan

Cutting rules

15. Remove 1 second from the from the start of each clip
16. Calculate "ORIGINAL RAWTIME" duration (total duration of presented clips minus 1 second from each.)
17. Apply "HZP" meta-data cutting rules producing "M1 CLIPSET"
18. Calculate "M1 RAWTIME" to determine new total duration of "M1CLIPSET" resulting from "HZP" meta-data cutting rules
19. 2 minutes − "M1 RAWTIME" = "M2TIME"
20. "M2TIME" divided by 22 frames = "M2CUT"
21. Calculate "M2RAWTIME",
"ORIGINAL RAWTIME" - "M1 RAWTIME" = "M2RAWTIME",
22. Evenly divide "M2RAWTIME" using "M2CUT" value
23. Extract 22 frame duration clips "M2CLIPSET" from "M2RAWTIME" and place them chronologically with "M1CLIPSET"

Contingent:

24. If "M1 RAWTIME" < 2 minutes insert chronologically from the set of 22 frame clips "M2CLIPSET"
25. If "M1 RAWTIME" > 2 minutes,
Apply contingent cutting in order of priority:
Pan, Zoom, Highlight
The process will result in "M1RAWTIME_2"
26. If "M1 RAWTIME_2" > 2 minutes,
Apply contingent cutting in order of priority:
Remove alternately every second Pan and Zoom until only Highlight clips remain
The process will result in "M1RAWTIME_3"
27. If "M1 RAWTIME_3" > 2 minutes,
Apply contingent cutting in order of priority:
Remove every second highlight clip until "M1 RAWTIME_3" ranges between 01:59:12 or 02:03:12

Example 3

The Retrospective styled movie has become a popular choice for many filmmakers and advertisers wanting to recreate cultural ages of the past. Typographical style, colour palettes, special effects even faking aged film add to this genre that evokes a nostalgic almost humorous appeal. One retro styles is a 50's retro kitsch called Blue Bayou.

The following description defines the Blue Bayou template.

| | |
|---|---|
| Order | Maintain chronological order |
| Cutting sequence: [standard] | ~~01:00 [start only]~~<br>08:00 [09:00]<br>~~04:00~~ |
| Cutting Sequence [For C2000 demo] | ~~01:00 [start only]~~<br>06:00 [07:00]<br>~~04:00~~ |
| Structure | repeat sequence for each original clip |
| Time remapping | (slow) |
| Base Frame rate: | 15 frames per second |
| Video highlights | Detect user entered video highlight frames and yield priority over default cutting sequence. [See Rules below] |
| Audio | |
| Sync audio: | Mute |
| Title audio: | Normal Levels |

-continued

Soundtrack:

After cutting sequence, start and end titles have been place audio tracks
Start first track, 4 sec in from the end of start title track:
Play each track in succession until video sequence is complete, freeze
last frame of video title until audio is complete.
\\vaccai\d\vpdc\retro\blue_bayou\audio\highlife_2_00.wav
\\vaccai\d\vpdc\retro\blue_bayou\audio\my_cougar_2_22.wav
\\vaccai\d\vpdc\retro\blue_bayou\audio\clav_jam_2_03.wav
Zero-Source Effects Alpha Fog Filter
\\vaccai\d\vpdc\retro\blue_bayou \zero_source\fogfilter_01.tif
Titles
Start
\\vaccai\d\vpdc\retro\blue_bayou\zero_source\titles\start_title_anim.swf
End
\\vaccai\d\vpdc\retro\blue_bayou\zero_source\titles\end_title_anim.swf
Scene start
\\vaccai\d\vpdc\retro\blue_bayou\zero_source\titles\scenematte_02.swf
\\vaccai\d\vpdc\retro\blue_bayou\zero_source\titles\scenematte_03.swf
One Source Effects Apply to complete duration once cut
Aged Film
\\vaccai\d\vpdc\retro\blue_bayou\one_source\Film Noise5.qfx
RGB Balance Filter
\\vaccai\d\vpdc\retro\blue_bayou\one_source\Film Noise5.qfx
Two Source Effects

| | |
|---|---|
| Transitions: | 01:00 inclusive cross-fades for all clips |
| | Last clip 02:00 inclusive fade to white |
| Rules | Cut highlight clips first: |
| | Detect Video Highlight frames, crop clips to 08:00 sec. [referred to as a highlight clip] with highlight frame at $2^{nd}$ second of duration. Divide remaining portions of clip into "new" clips; apply the same cutting/time re-mapping sequence 8-sec clips with a 4-sec gap between each. |
| | "New" clip portion following a highlight clip |
| | A new clip portion created following a highlight clip should have the first four seconds removed rather than the default 1 second. |
| | "New" clip portion before a highlight clip |
| | A new clip portion located chronologically before a highlight clip should have the last four seconds [and first second] removed before applying cutting sequence |
| | Overlaps |
| | If highlights clips overlap, group to create an extended clip. |

7.3 Feature Tracking and Auto-Edit Templates

Figure 32:
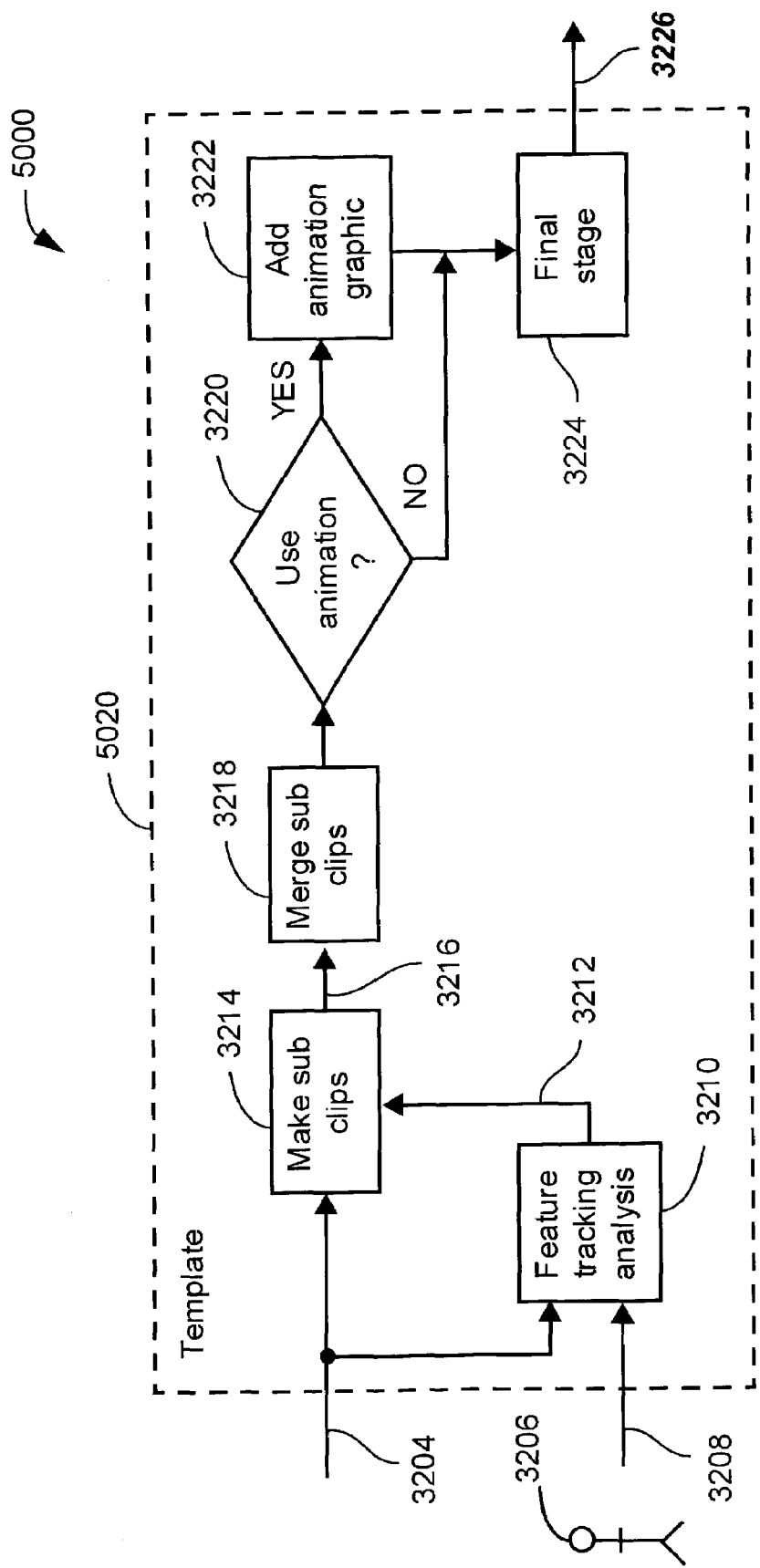
FIG. 32 shows an auto-edit template process using feature tracking metadata.

FIG. 32 shows a flowchart of a process 3200 for using an auto edit template 3202 to create a video production using feature tracking data. FIG. 32 shows the template 3202 into which a list of source video and still media is input at 3204, and with which a user 3206 can interact, in particular in regard to a feature tracking analysis process 3210. The flowchart 3200 should be read in conjunction with a pseudo code fragment set out in Example 4, these two elements describing a movie auto-edit template process for using event bounding Metadata derived from a feature tracking operation in order to create a video production, where the Metadata derived from the feature tracking operation is performed as part of the integrated video production process 3200.

The input at 3204 is a list of source video and still media items, and the list is in an order selected by the user 3206. Metadata is associated with each, or at least most pieces of source video or still media items, and in some cases, this Metadata includes feature tracking information from previously performed analysis. Alternatively, the feature tracking can be performed in the step 3210 as part of the execution of the template 3202. As previously noted, the user 3206 can interact with the feature tracking step 3210 as depicted by an arrow 3208. The feature tracking step 3210 outputs feature tracking Metadata at 3212 which typically includes information about event bounds and trajectories for a tracked feature. Event bounds are the "begin" and "end" points in frame-number terms, or in units of time, relating to the particular feature which has been designated for tracking.

The interaction 3208 between the user 3206 and the feature tracking step 3210 allows the user 3206 to designate one or more features for tracking at the beginning of the video production process 3200. Alternatively, the template 3202 can make enquiries of the user 3206 during the production process, as to whether feature tracking is desired for any particular video clip. The results at 3212 of the feature tracking step 3210 are stored as Metadata, and this Metadata is associated with the video clips from which it has been derived.

In a step 3214, each piece of source media input at 3204 is checked for feature tracking information. If feature tracking Metadata is detected, then this Metadata is inspected for event bounds, and for each event bound that is identified and that can be associated with an available piece of input source media from the input at 3204, a new sub-clip is created in the step 3214. This new production sub-clip is made to reference the associated source media item, and "in" and "out" points are calculated for the new sub-clip from the associated feature-tracking event bounds. If, in the step 3214, no feature-tracking Metadata information is found to be associated with an input clip from 3204, then the new sub-clip is created based on "in" and "out" points calculated using other information or methods, noting that the new sub-clip still correctly references the associated source media item(s) at 3204. The "other information or methods" can include appropriate spacing of the in and out points around, for example, a highlight flag which has been previously inserted into the source media item. If no specific Metadata is available for a particular source media item, then an arbitrary method can be used in the step 3214 to create a sub-clip. The arbitrary method can, for example, be to define in and out point positions based on rhythmic editing techniques, or alternatively, the sub-clip duration can be set at a length which is consistent with (eg. is less than) a pre-defined overall video production play length.

Once all input media items from 3204 are processed in the step 3214, all sub-clips that reference the same source media items and that have overlapping segments between in and out points are iteratively considered, and merged into single sub-clips in a step 3218. Accordingly, the resulting set of sub-clips output by the step 3218 does not contain any repeated sections.

Once all relevant sub-clips have been merged in the step 3218, the process 3200 is directed to a testing step 3220 which tests if the template 3202 specifies use of feature tracking for animation. If this is specified, then the process 3200 is directed in accordance with a "yes" arrow to a step 3222 which adds an animation for each instance of feature tracking in each sub-clip according to the path and other details held in the feature tracking information set (see FIG. 29). If, on the other hand, no animation is defined, then the process 3200 is directed in accordance with a "no" arrow to a step 3224 at which point any other additions can be made to the movie, including addition of title clips from pre-defined media items, incorporation of background music tracks and so on. Returning to the step 3222, once the animations are added to the relevant sub-clips, the process is also directed from the step 3222 to the step 3224. Once all final additions have been made in the step 3224, the complete movie production is output as depicted by an arrow 3226.

Example 4

```
/* Template using Event Bounds */
TemplateEventBounds(source_clips_list)
begin
    for all (source_clips in source_clips_list)
    begin
        for all (feature_tracking_event in source_clip)
        begin
            make new_clip copy of source_clip
            set new_clip inpoint = feature_tracking_event
            start - 1.0 seconds
            set new_clip outpoint = feature_tracking_event
            start + 1.0 seconds
            append new_clip to timeline.video_track
        end
        if (source_clip has feature_tracking_event)
        begin
            make new_clip copy of source_clip
            set new_clip inpoint = 1.0 seconds
            set new_clip outpoint = 5.0 seconds
            append new_clip to timeline.video_track
        end
        merge overlapped clips in timeline.video_track
    end
    if (template supports feature tracking)
    begin
```

-continued

```
        for all clips in timline.video_track
        begin
            for all feature_tracking_event in clip
            begin
                add animation
            end
        end
    end
    insert begin title to start of timeline.video_track
    append end title to end of timeline.video_track
    add background music to timeline.audio_track of length of
    timeline.video_track
    return timeline
end
```

7.4 Print Summarisation of a Video Production

Figure 33:
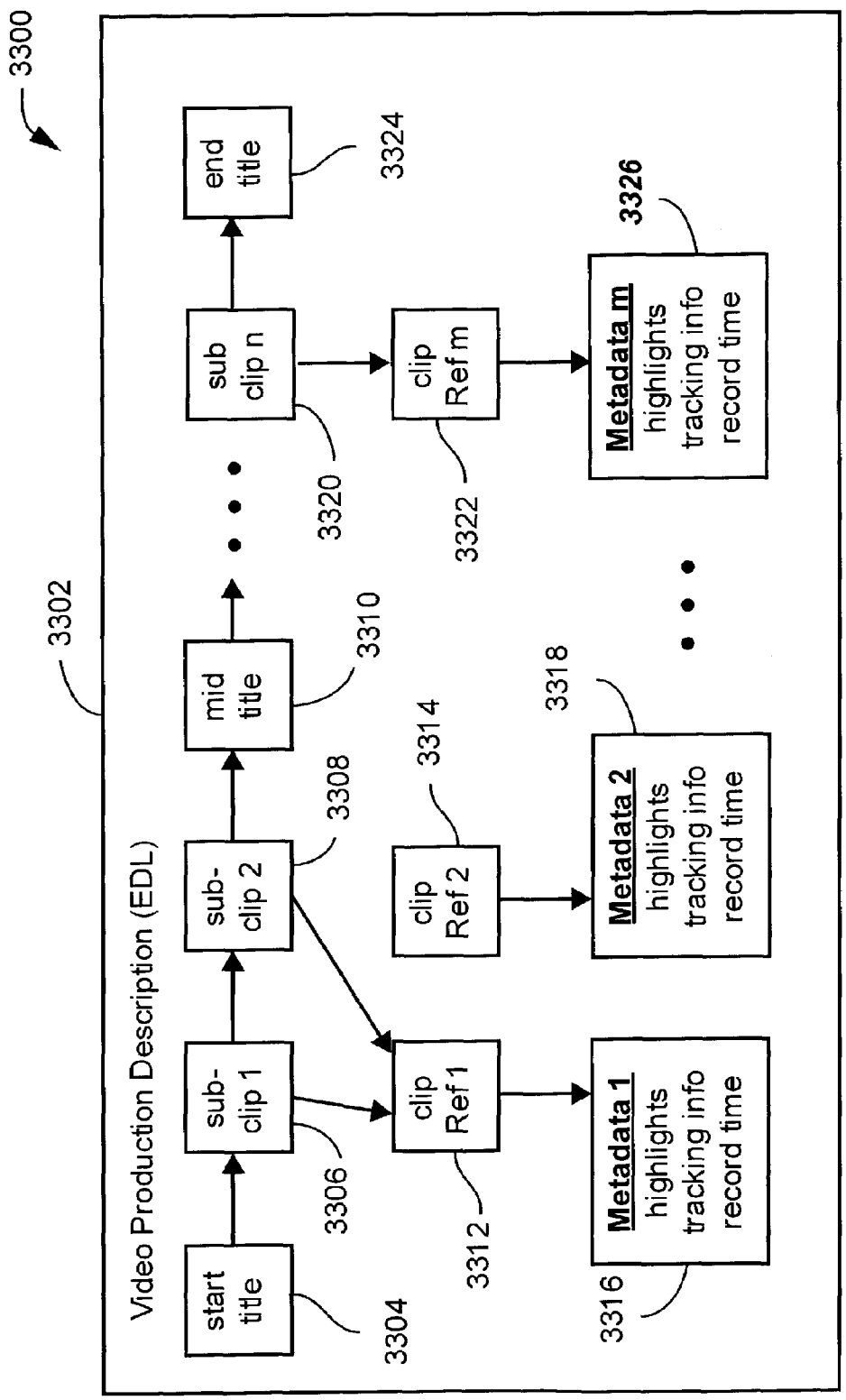
FIG. 33 shows a video production data description.

FIG. 33 shows an example of a Video Production Data Structure 3300. This diagram describes data structures used to hold a video production description including associated data and metadata. The video production description 3302 consists of an ordered list of video items including start titles 3304, sub clips 3306, 3308, ..., 3320, mid titles 3310 and end titles 3324. The sub clips contain settings describing how each sub clip is played in the video production. These settings may include in points and out points, play speed and effects and transitions. The sub clips 3306, 3308, ..., 3320 are associated with clip references 3312, 3314, ..., 3322 respectively. One or more of the sub clips may reference the same source clip. Each clip reference 3312, 3314, ..., 3322 references a metadata structure 3316, 3318, ..., 3326 respectively that stores various information relating to or extracted from the original source media including highlight points, feature tracking information, and record time/date. Typically, some or all of this metadata information relating to the original source material may be created during the execution of the video production process. This metadata information is typically useful in the automatic or manual decision-making sub-processes of the video production process.

Thus the video production description contains complete access information about the components of the video production and their use in the video production.

Figure 34:
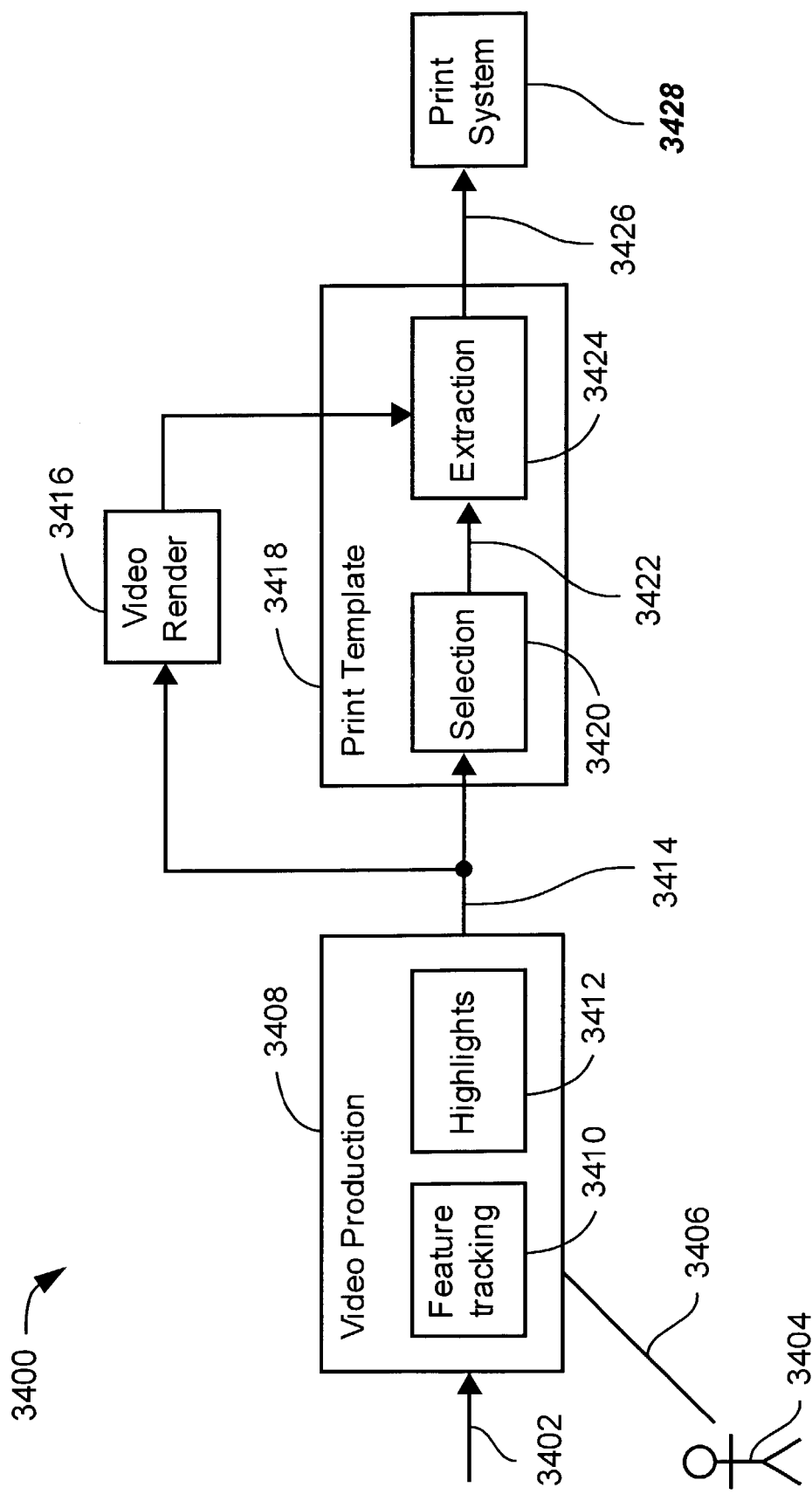
FIG. 34 shows a process for creating a print summary based on a video production.

FIG. 34 shows an exemplary process 3400 for providing print summarisation from a video production. Source video material is input at 3402 to a video production step 3408, the step 3408 being either a manual editing process 228, or an automatic editing process 240 (see FIG. 2). Interaction by a user 3404 can also be input at 3406 to the video production step 3408. A feature tracking sub-process 3410 and a highlight incorporation process 3412 can be included in the video production step 3408 in order to add Metadata to the resultant video production that is output at 3414. The output at 3414 from the video production step 3408 is a video production description (EDL) as represented by the reference numeral 3300 in FIG. 33. The EDL includes Metadata about the source media at 3402, and also typically includes a complete description of how to render the video production including information on in and out points, play speed and so on.

The video production at 3414 is fed to a print template 3418 which uses information in the EDL at 3414 in order to create a print summarisation of the video production. A selection block 3420 in the print template 3418 uses the EDL to select printable images from the video production. In the selection process in the step 3420 video production information including in and out points, highlights, tracking information, play speed, effect selection and so on are used in combination in order to select suitable images for printing. The selection step 3420 creates a print summary description at 3422 that is passed to an extraction block 3424. The extraction block 3424 captures still images from a rendered video production that is produced by a video renderer 3416 based upon the EDL at 3414 which is also supplied to the video renderer 3416. The extraction block 3424 outputs a print summary description at 3426, including images for printing. The output at 3426 is a print summary description which is suitable for controlling how a print system 3428 formats and produces the final output prints.

As noted in the description relating to FIG. 2, the specifics of the GUI system are dependent upon the distribution of functionality between the DDC 204 and the PC 208.

INDUSTRIAL APPLICABILITY

It is apparent from the above that the embodiment(s) of the invention are applicable to the multi-media recording and entertainment industries.

The foregoing describes only some embodiments of the present invention, and modifications and/or changes can be made thereto without departing from the scope and spirit of the invention, the embodiments being illustrative and not restrictive. For example, although FIG. 8 shows an example implementation of metadata driven GUI controls relating to the 'Browse on Pan' control, clearly this can be applied to other GUI controls.

The invention claimed is:

1. An apparatus for extracting frames for printing from a production represented by a production description, said production comprising video frames which include an animation layer, said production having been formed using a means for animating a sprite in the animation layer of said video frames, the apparatus comprising:

means for determining printing suitability measures for the frames to be extracted dependent upon meta-data in said production description, said meta-data being associated with an animated sprite in said animation layer of said video production; and means for extracting said frames for printing from the production dependent upon said printing suitability measures;

wherein the means for animating the sprite in the video production comprises:

means for selecting a sprite and a feature in a video frame of the video production in relation to which the sprite is to be animated;

means for applying a feature tracking process to the video production to thereby output a trajectory for the feature; and means for compositing instantiations of the sprite with the video production depending upon the trajectory to thereby form a first animated production; said apparatus further comprising:

means for selecting another feature in a video frame of one of the video production and the first animation production to which the sprite is to be animated;

means for applying the feature tracking process to said one of the video production and the first animated production to thereby output another trajectory for said other selected feature; and means for compositing instantiations of the sprite with the first animated production depending on the other trajectory to thereby form a second animated production;

wherein the animated sprite in the first animated production has an associated animation time, and the other trajectory for the other selected feature has an associated trajectory time;

and wherein, if the associated animation time differs from the associated trajectory time for the other trajectory, then the compositing depending on the other trajectory is performed by:

means for scaling the other trajectory so that the associated trajectory time conforms to the associated animation time; and means for compositing instantiations for the sprite with the first animated production depending on the scaled other trajectory to thereby form a second animated production.

2. A method of extracting frames for printing from a production represented by a production description, said production comprising video frames which include an animation layer, said production having been formed by a process of animating a sprite in the animation layer of said video frames, the method comprising the steps of:

determining printing suitability measures for the frames to be extracted dependent upon meta-data in said production description, said meta-data being associated with an animated sprite in said animation layer of said video production; and extracting said frames for printing from the production dependent upon said printing suitability measures;

wherein the animation of the sprite in the video production comprises the steps of:

selecting a sprite and a feature in a video frame of the video production in relation to which the sprite is to be animated;

applying a feature tracking process to the video production to thereby output a trajectory for the feature; and compositing instantiations of the sprite with the video production depending upon the trajectory to thereby form a first animated production;

said method comprising the further steps of:

selecting another feature in a video frame of one of the video production and the first animated production to which the sprite is to be animated;

applying the feature tracking process to said one of the video production and the first animated production to thereby output another trajectory for said other selected feature; and compositing instantiations of the sprite with the first animated production depending on the other trajectory to thereby form a second animated production;

wherein the animated sprite in the first animated production has an associated animation time, and the other trajectory for the other selected feature has an associated trajectory time;

and wherein, if the associated animation time differs from the associated trajectory time for the other trajectory, then the compositing depending on the other trajectory comprises the steps of:

scaling the other trajectory so that the associated trajectory time conforms to the associated animation time; and compositing instantiations of the sprite with the first animated production depending on the scaled other trajectory to thereby form a second animated production.

3. A method according to claim 2, wherein:

the trajectory end points are defined by event bounds comprising a begin frame and an end frame; and the compositing step is performed in relation to a video frame of the video production falling between said begin and said end frames.

4. A method according to claim 2, wherein:

the trajectory end points are defined by event bounds comprising a begin frame and an end frame; and the compositing step is performed in relation to a video frame of the video production falling in the neighborhood of at least one of said begin and said end frames.

5. A method according to claim 2, wherein said printing suitability measures are determined dependent upon a production template used to form said production.

* * * * *